(12) United States Patent
Fujikura et al.

(10) Patent No.: US 10,656,399 B2
(45) Date of Patent: May 19, 2020

(54) VARIABLE MAGNIFICATION OPTICAL SYSTEM AND IMAGE PICKUP APPARATUS USING THE SAME

(71) Applicant: OLYMPUS CORPORATION, Hachioji-shi, Tokyo (JP)

(72) Inventors: Takashi Fujikura, Fussa (JP); Yuki Zen, Hino (JP); Tomoyuki Satori, Kawagoe (JP); Tetsuya Yanai, Akiruno (JP)

(73) Assignee: OLYMPUS CORPORATION, Tokyo (JP)

( * ) Notice: Subject to any disclaimer, the term of this patent is extended or adjusted under 35 U.S.C. 154(b) by 148 days.

(21) Appl. No.: 15/853,235

(22) Filed: Dec. 22, 2017

(65) Prior Publication Data

US 2018/0267279 A1 Sep. 20, 2018

(30) Foreign Application Priority Data

Mar. 15, 2017 (JP) .................................. 2017-050651

(51) Int. Cl.
*G02B 15/14* (2006.01)
*G02B 15/167* (2006.01)
*G02B 15/20* (2006.01)
*G02B 15/173* (2006.01)

(52) U.S. Cl.
CPC ......... *G02B 15/167* (2013.01); *G02B 15/173* (2013.01); *G02B 15/20* (2013.01)

(58) Field of Classification Search
CPC .... G02B 15/167; G02B 15/173; G02B 15/20; G02B 15/77; G02B 15/14; G02B 15/16; G02B 27/646; G02B 7/10
See application file for complete search history.

(56) References Cited

U.S. PATENT DOCUMENTS

| 7,672,061 | B2 | 3/2010 | Tsutsumi |
| 8,614,855 | B2 | 12/2013 | Mizuma |
| 8,760,773 | B2 | 6/2014 | Wei |
| 2016/0259155 | A1* | 9/2016 | Shimada .............. G02B 15/173 |

FOREIGN PATENT DOCUMENTS

| JP | 5006076 B2 | 8/2012 |
| JP | 5426653 B2 | 2/2014 |
| JP | 5893959 B2 | 3/2016 |

* cited by examiner

*Primary Examiner* — Alicia M Harrington
(74) *Attorney, Agent, or Firm* — Holtz, Holtz & Volek PC

(57) ABSTRACT

A variable magnification optical system includes a plurality of lens element, and includes in order from an object side, a first lens unit having a positive refractive power, a second lens unit having a negative refractive power, a third lens unit having a positive refractive power, and at least one lens unit. An aperture stop is either positioned between the second lens unit and the third lens unit, or positioned in the third lens unit. At the time of zooming from a wide angle end to a telephoto end, the first lens unit is fixed, the second lens unit moves from the object side to an image-plane side, and at least one of lens units positioned on an image side of the aperture stop moves. The first lens unit includes at least four positive lens elements and at least two negative lens elements.

68 Claims, 20 Drawing Sheets

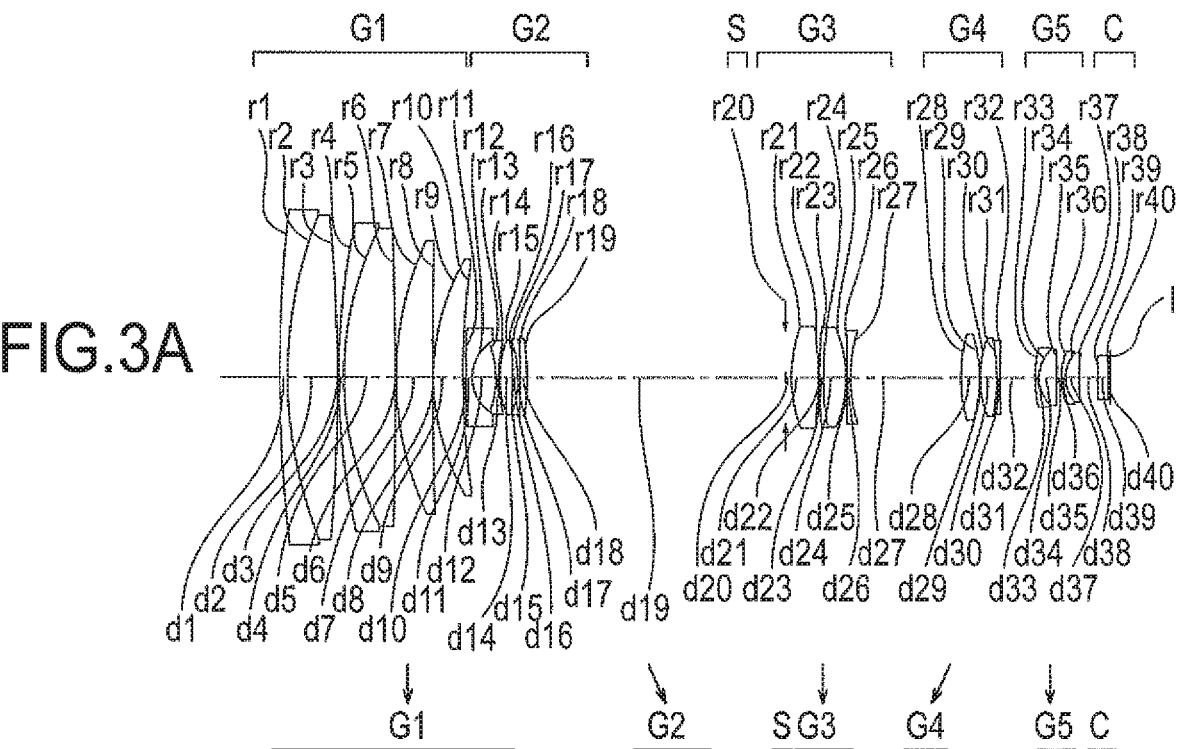
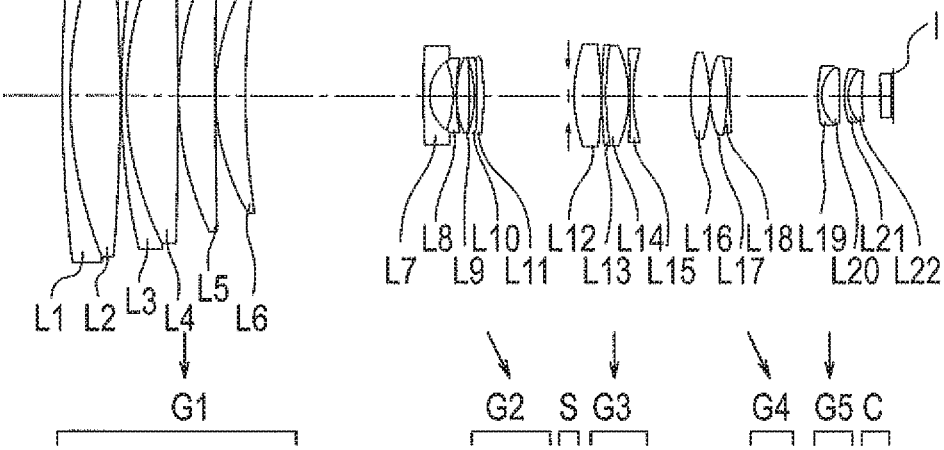
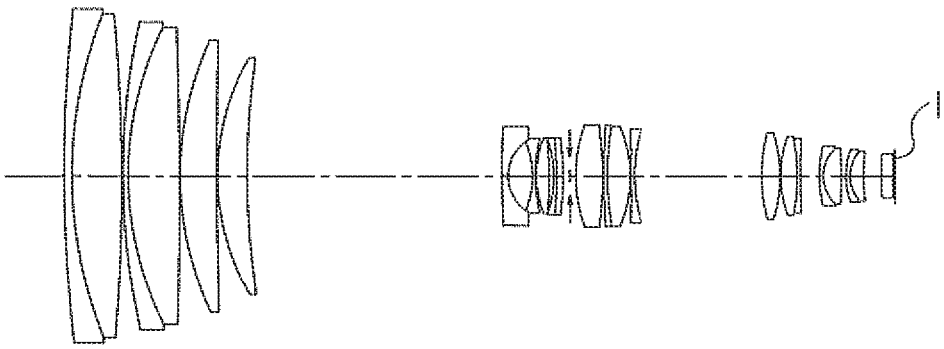

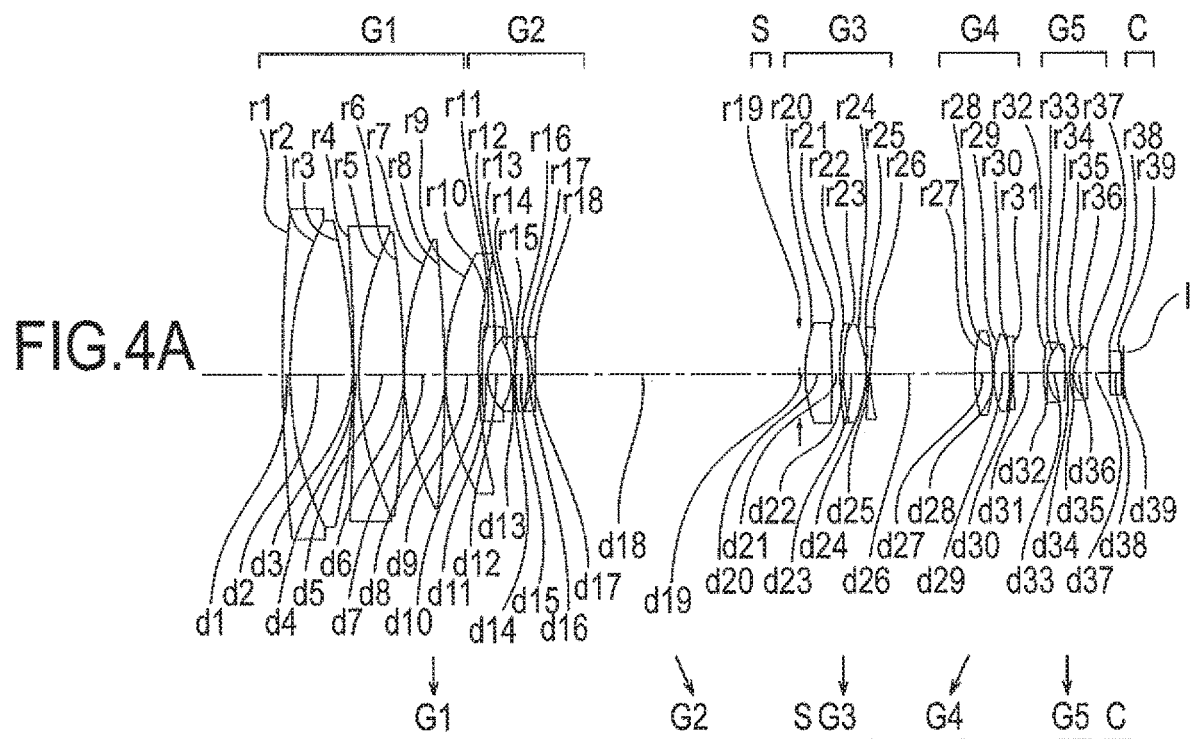
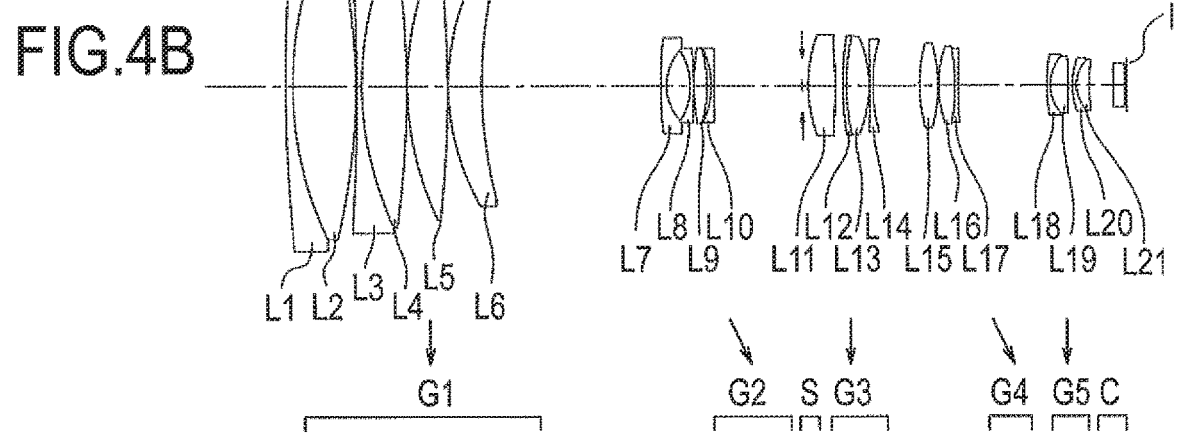
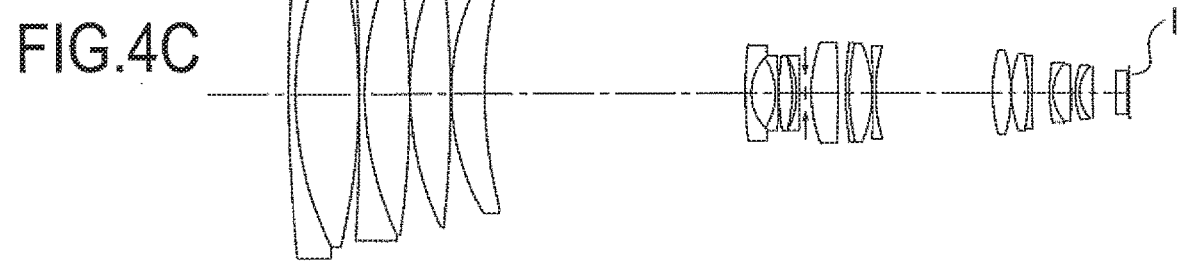

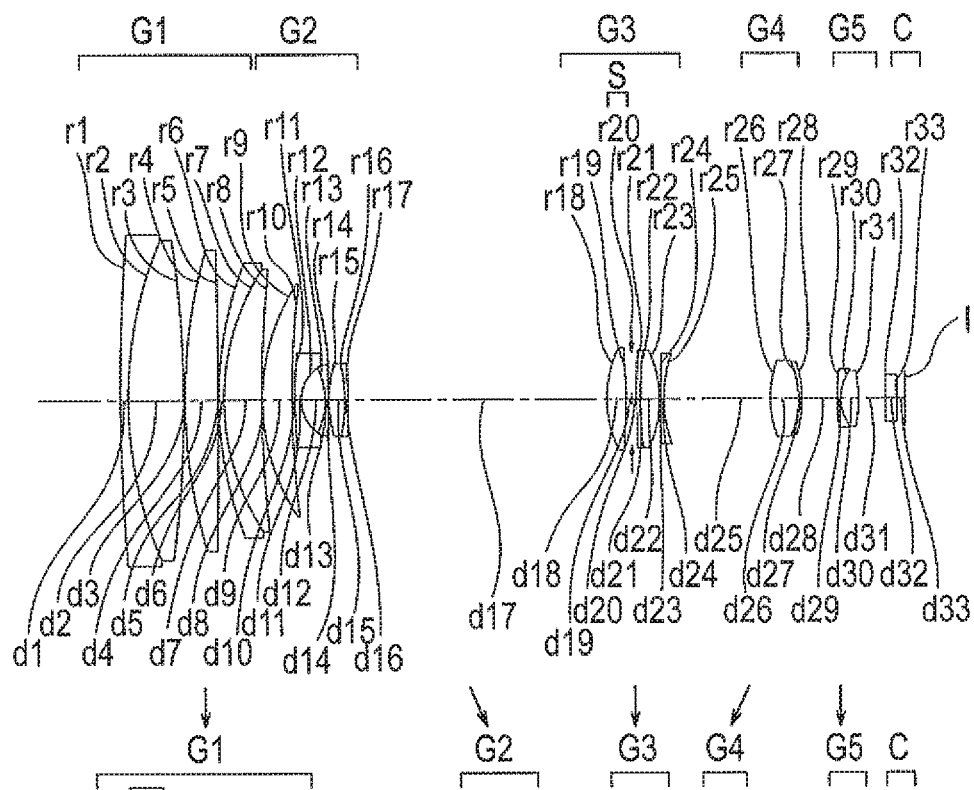
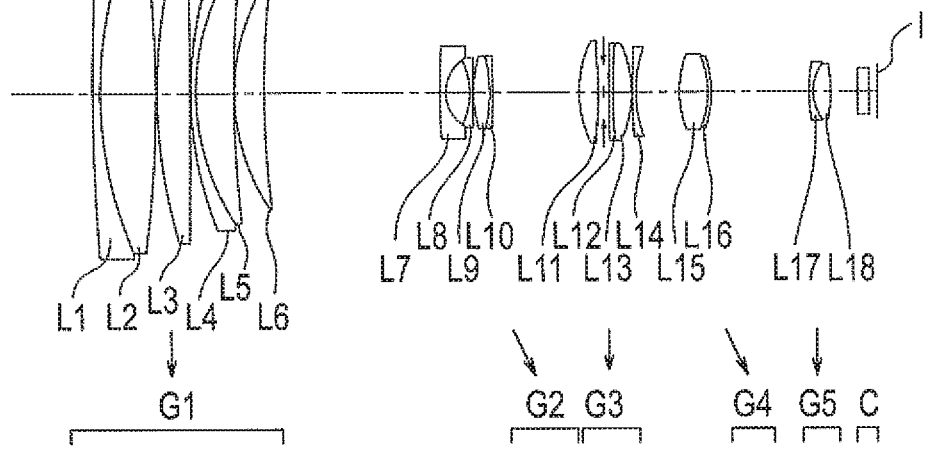
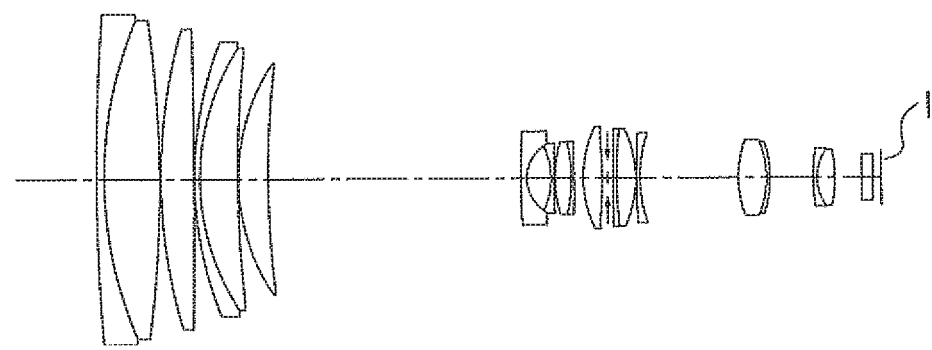
FIG.6A
FIG.6B
FIG.6C

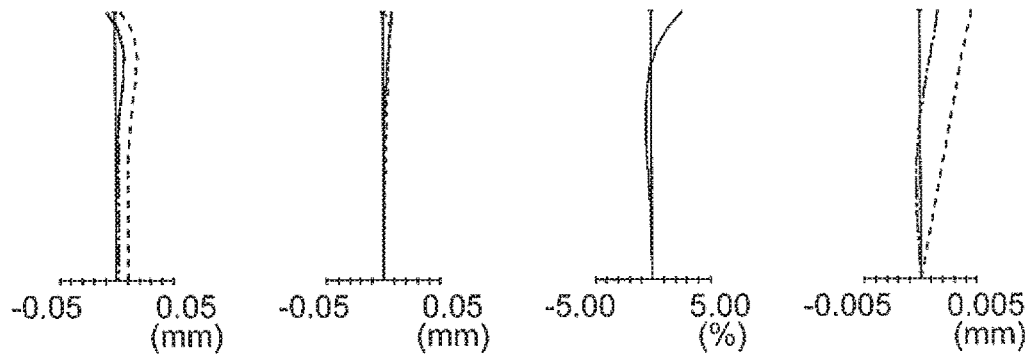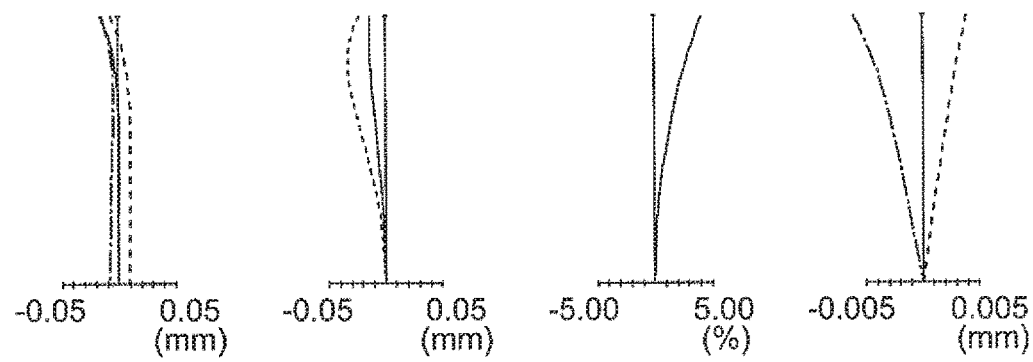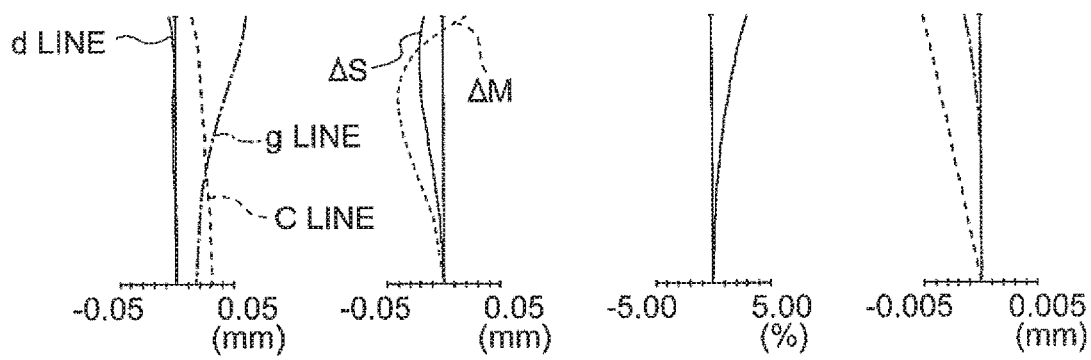

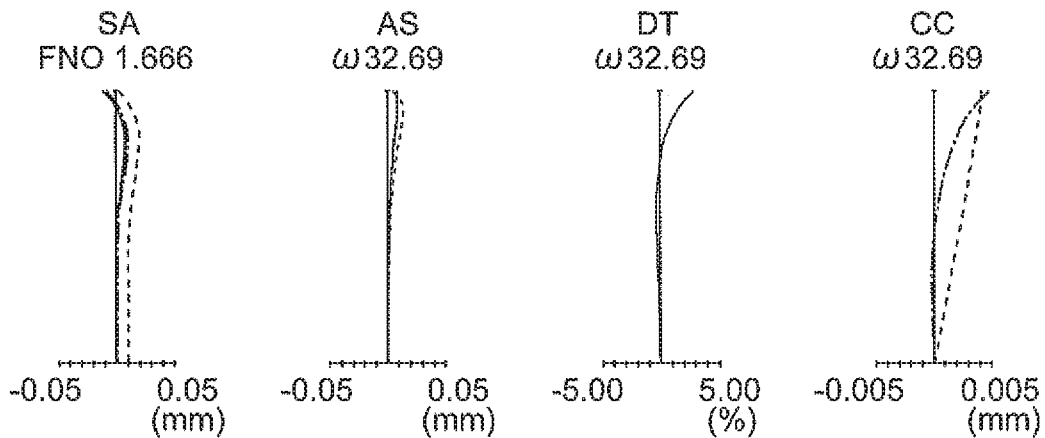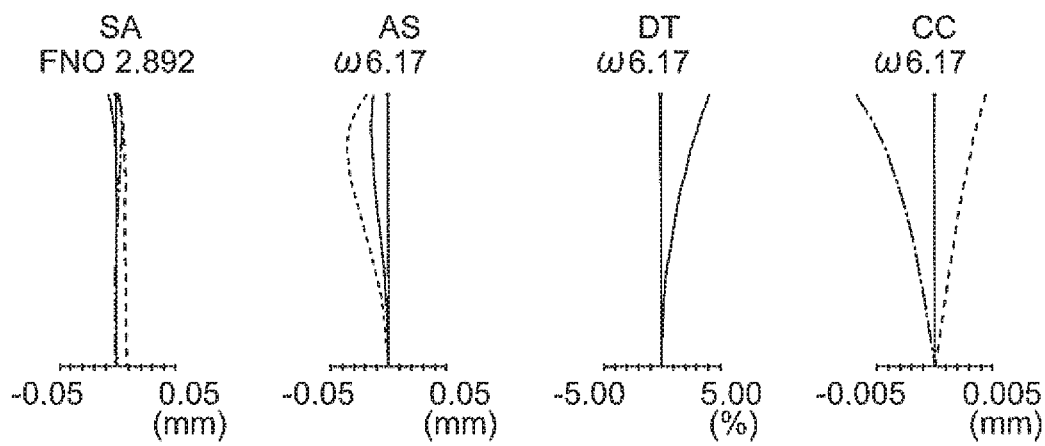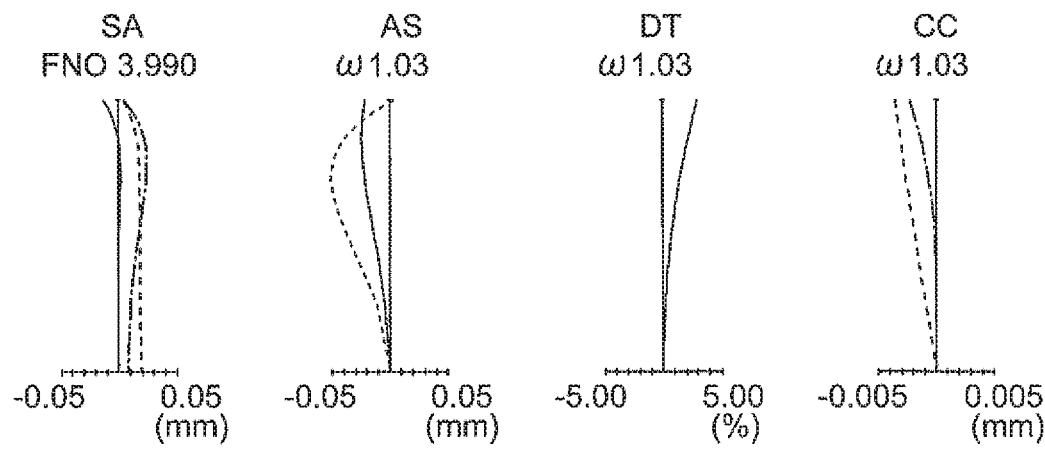

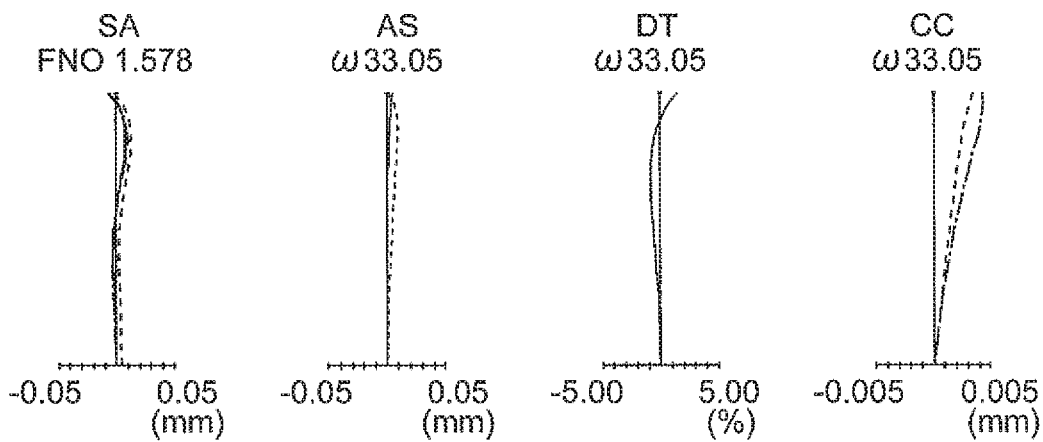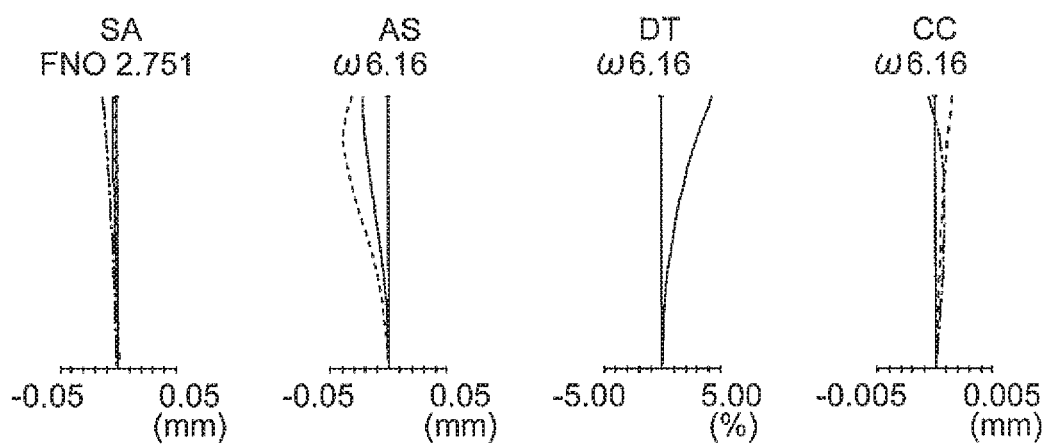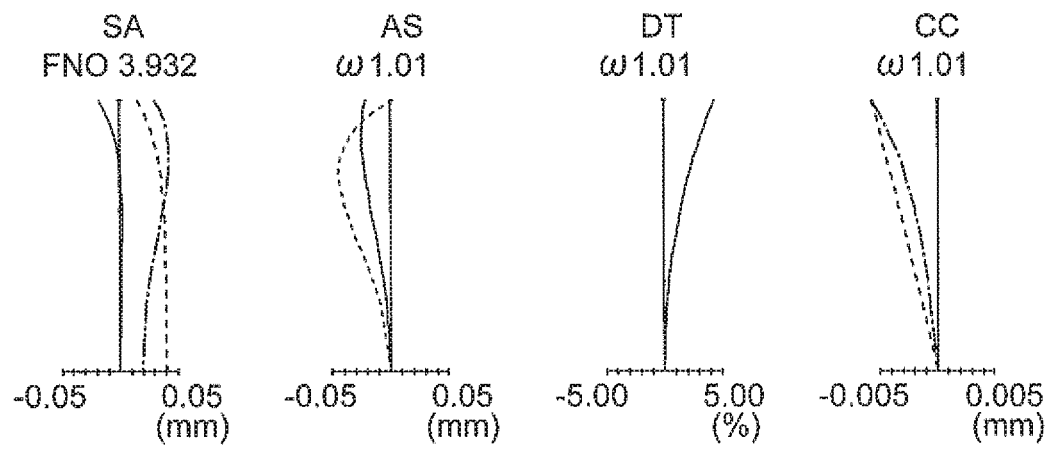

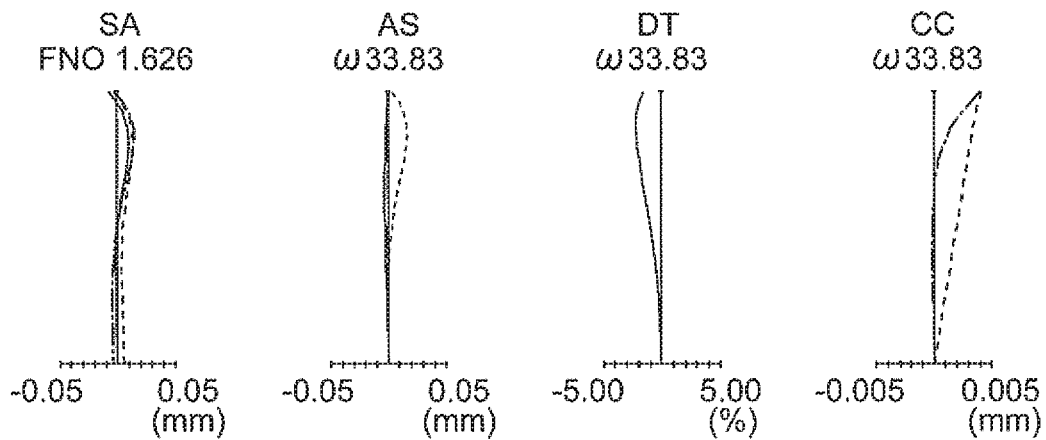
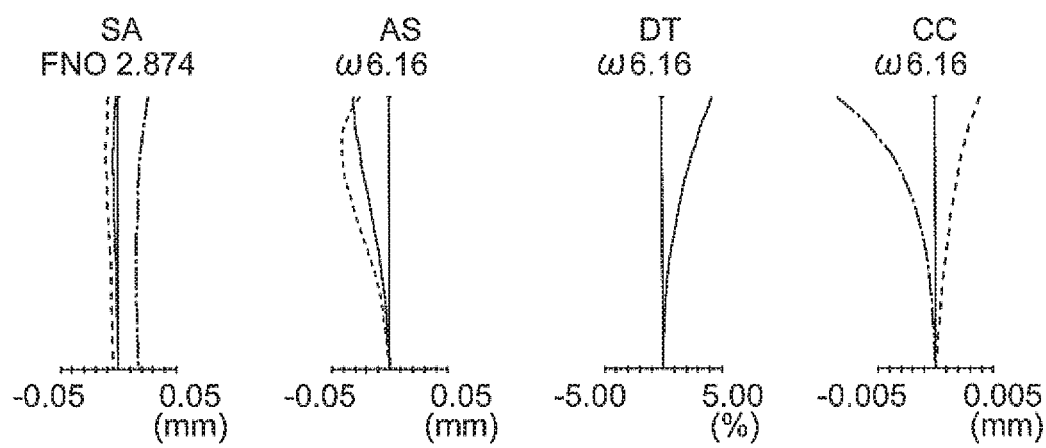
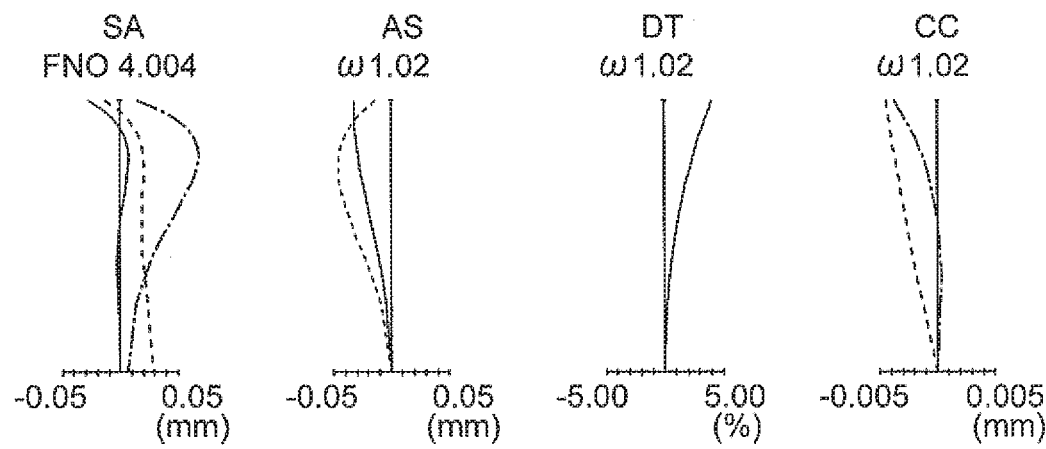

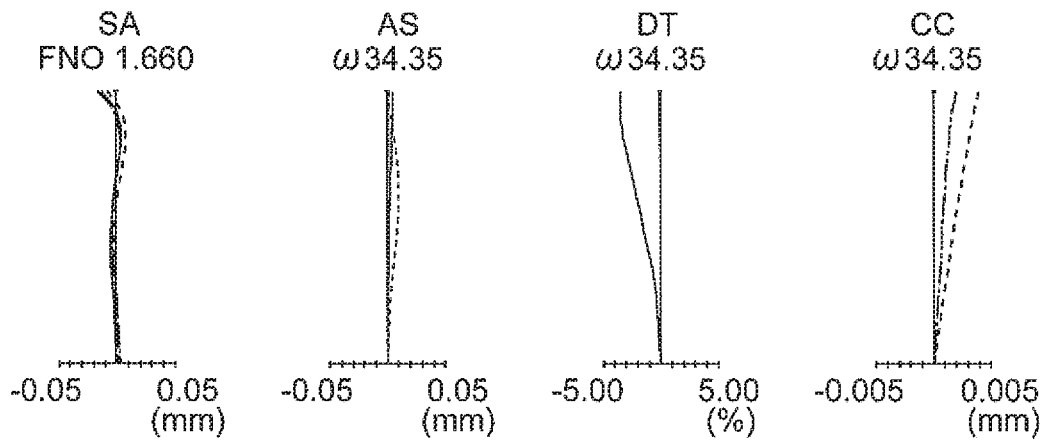
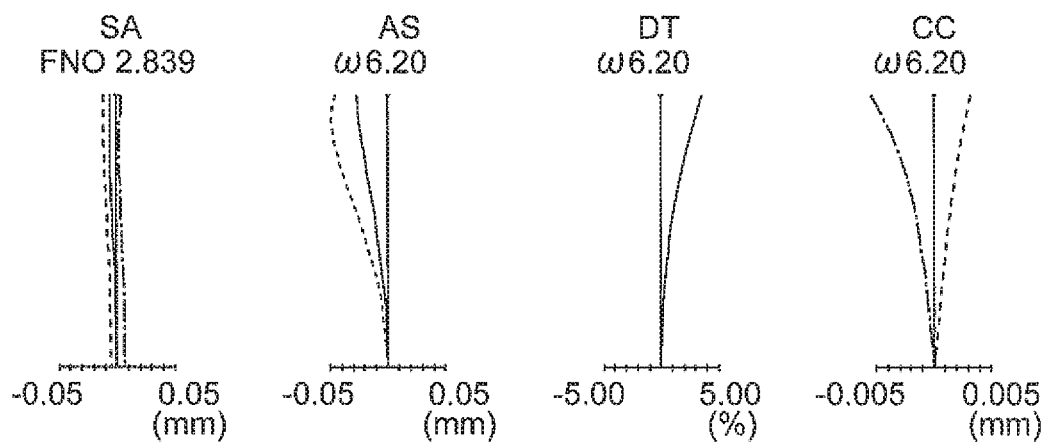
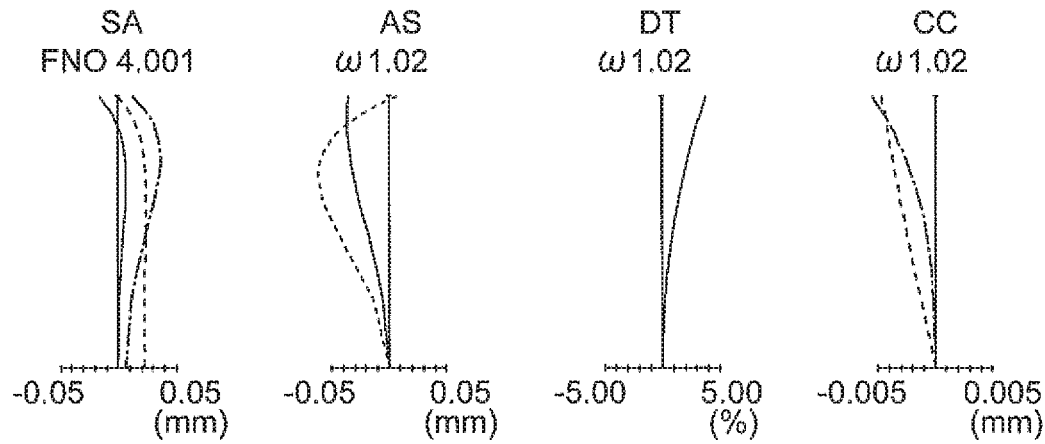

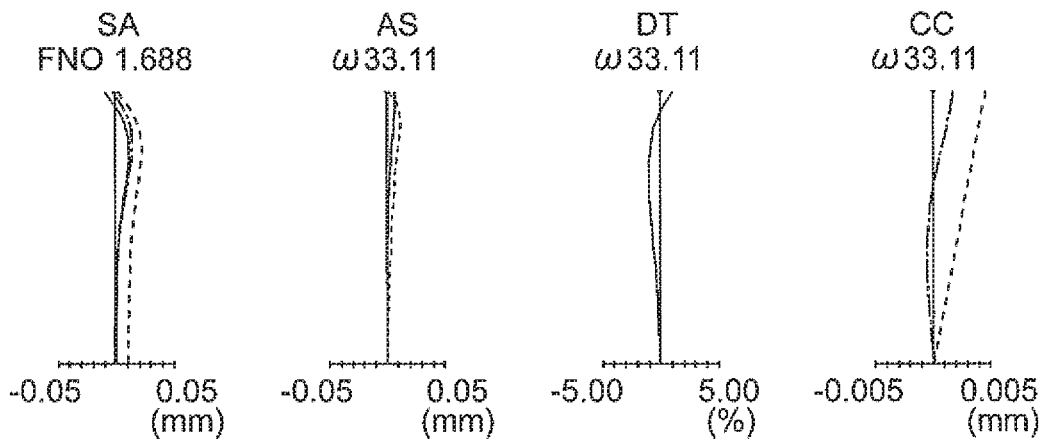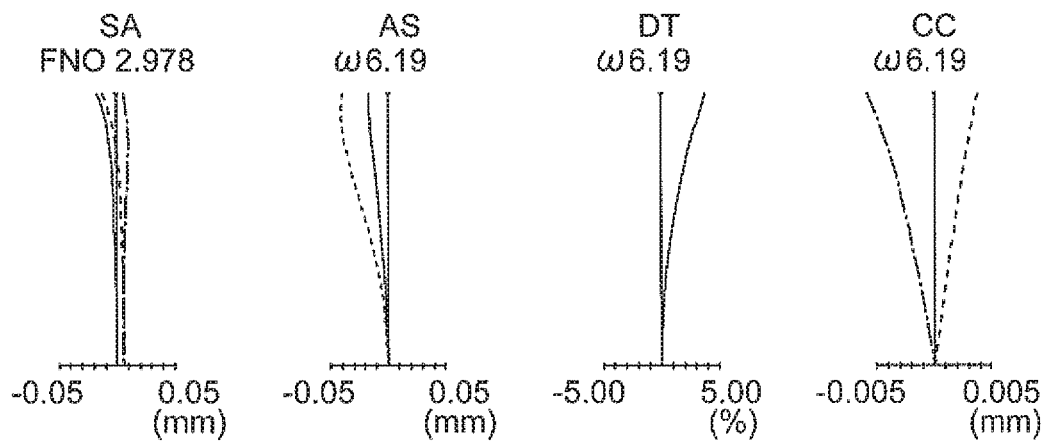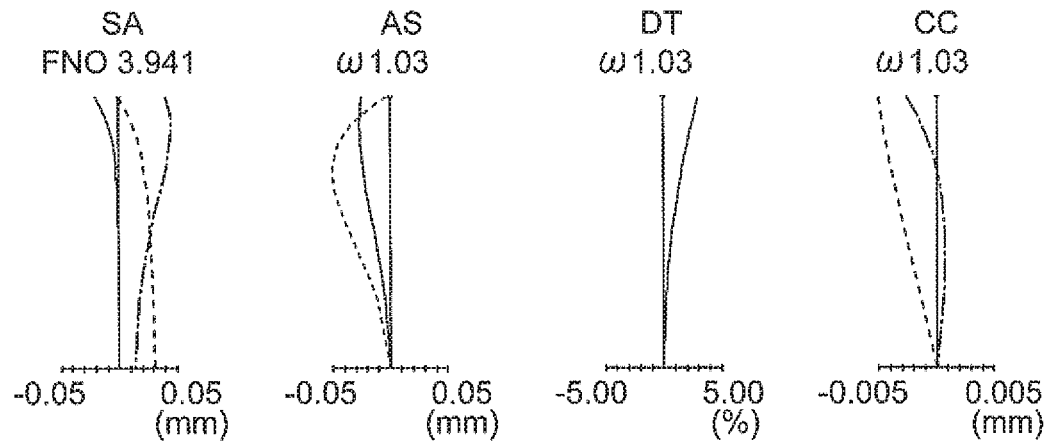

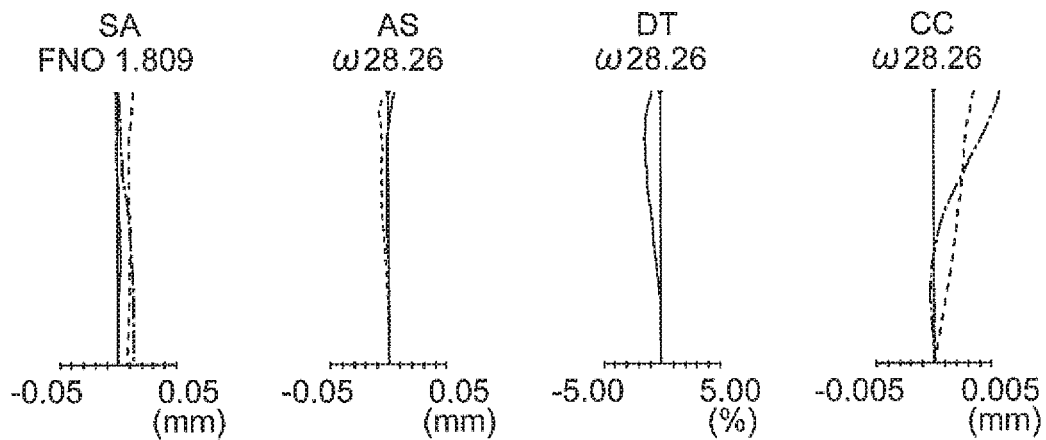
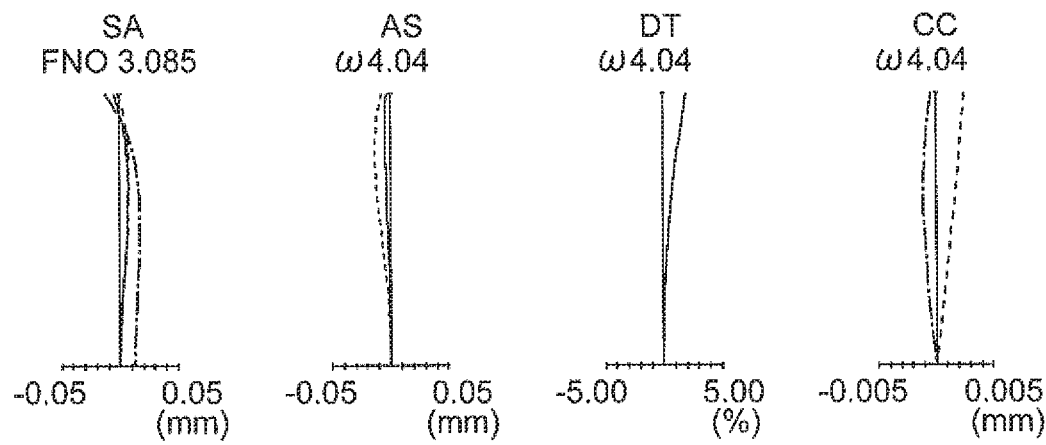
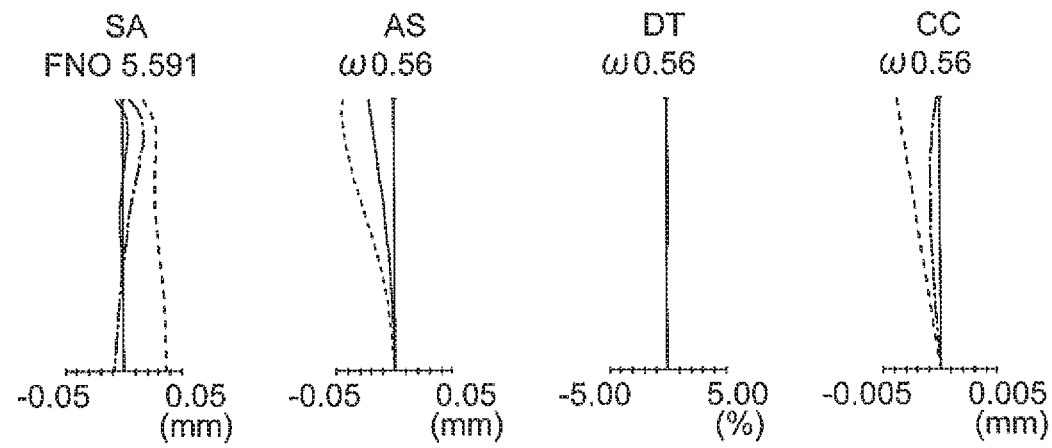

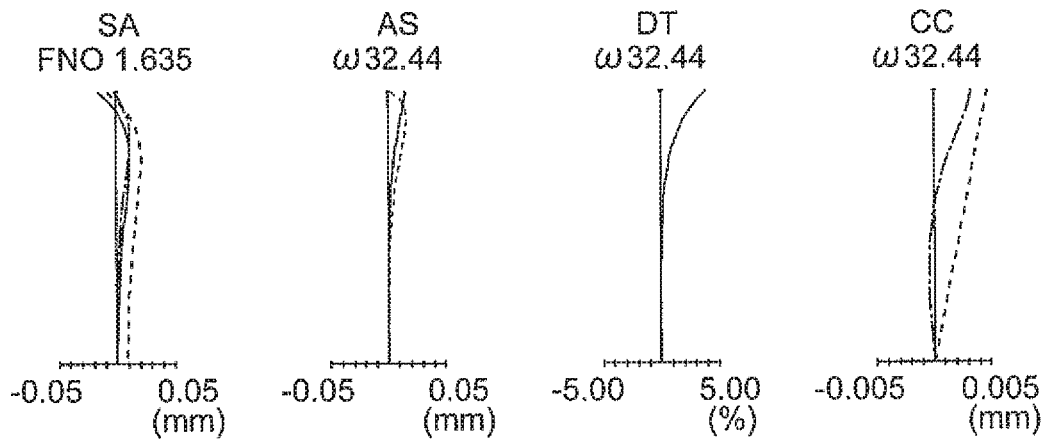
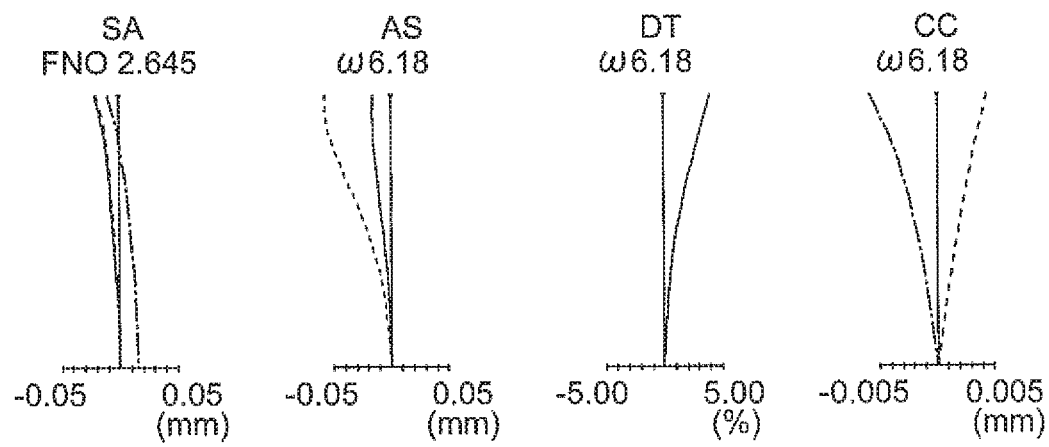
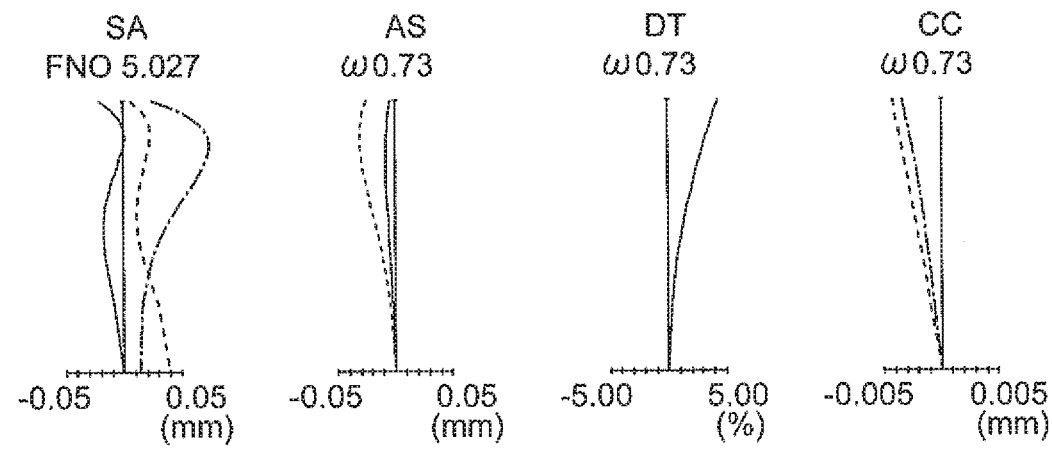

VARIABLE MAGNIFICATION OPTICAL SYSTEM AND IMAGE PICKUP APPARATUS USING THE SAME

CROSS-REFERENCE TO RELATED APPLICATION

The present application is based upon and claims the benefit of priority from the prior Japanese Patent Application No. 2017-050651 filed on Mar. 15, 2017; the entire contents of which are incorporated herein by reference.

BACKGROUND OF THE INVENTION

Field of the Invention

The present invention relates to a variable magnification optical system and an image pickup apparatus using the same.

Description of the Related Art

As a variable magnification optical system, a variable magnification optical system which includes four lens units, or a variable magnification optical system which includes five lens units, has been known.

In Japanese Patent No. 5893959 Publication (first example), a variable magnification optical system which includes five lens unit has been disclosed. This variable magnification optical system includes a first lens unit having a positive refractive power, a second lens unit having a negative refractive power, a third lens unit having a positive refractive power, a fourth lens unit having a positive refractive power, and a fifth lens unit having a negative refractive power.

In Japanese Patent No. 5006076 Publication (second example), a variable magnification optical system which includes four lens units has been disclosed. This variable magnification optical system includes a first unit which is fixed at the time of zooming, a second unit having a negative refractive power, a third unit having either a positive refractive power or a negative refractive power, a fourth unit which includes an aperture stop and which is fixed at the time of zooming.

In Japanese Patent No. 5426653 Publication (fourth example), a variable magnification optical system which includes five lens units has been disclosed. This variable magnification optical system includes a first lens unit having a positive refractive power, a second lens unit having a negative refractive power, a third lens unit having a positive refractive power, a fourth lens unit having a negative refractive power, and a fifth lens unit having a positive refractive power.

SUMMARY OF THE INVENTION

A variable magnification optical system according to at least some of the embodiments of the present invention, which includes a plurality of lens elements, comprises in order from an object side,
a first lens unit having a positive refractive power,
a second lens unit having a negative refractive power,
a third lens unit having a positive refractive power, and
at least one lens unit, wherein
an aperture stop is either positioned between the second lens unit and the third lens unit, or positioned in the third lens unit, and
at the time of zooming from a wide angle end to a telephoto end,
the first lens unit is fixed,
the second lens unit moves from the object side to an image-plane side, and
at least one of lens units positioned on an image side of the aperture stop moves, and
the first lens unit includes at least four positive lens elements and at least two negative lens elements.

Here, the lens element is a lens having a medium of a refractive index higher than 1 filled between an object-side surface and an image-side surface, and not having a refracting surface between the object-side surface and the image-side surface.

An image pickup apparatus according to at least some of the embodiments of the present invention comprises,
an optical system, and
an image pickup element which has an image pickup surface, and which converts an image formed on the image pickup surface by the optical system, to an electric signal, wherein
the optical system is the abovementioned variable magnification optical system.

BRIEF DESCRIPTION OF THE DRAWINGS

FIG. 3A, FIG. 3B, an FIG. 3C are lens cross-sectional views at the time of infinite object point focusing of a variable magnification optical system according to an example 3;

FIG. 4A, FIG. 4B, and FIG. 4C are lens cross-sectional views at the time of infinite object point focusing of a variable magnification optical system according to an example 4;

FIG. 6A, FIG. 6B, and FIG. 6C are lens cross-sectional views at the time of infinite object point focusing of a variable magnification optical system according to an example 6;

FIG. 9A, FIG. 9B, FIG. 9C, FIG. 9D, FIG. 9E, FIG. 9F, FIG. 9G, FIG. 9H, FIG. 9I, FIG. 9J, FIG. 9K, and FIG. 9L are aberration diagrams at the time of infinite object point focusing of the variable magnification optical system according to the example 1;

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L are aberration diagrams at the time of infinite object point focusing of the variable magnification optical system according to the example 2;

FIG. 11A, FIG. 11B, FIG. 11C, FIG. 11D, FIG. 11E, FIG. 11F, FIG. 11G, FIG. 11H, FIG. 11I, FIG. 11J, FIG. 11K, and FIG. 11L are aberration diagrams at the time of infinite object point focusing of the variable magnification optical system according to the example 3;

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L are aberration diagrams at the time of infinite object point focusing of the variable magnification optical system according to the example 4;

FIG. 13A, FIG. 13B, FIG. 13C, FIG. 13D, FIG. 13E, FIG. 13F, FIG. 13G, FIG. 13H, FIG. 13I, FIG. 13J, FIG. 13K, and FIG. 13L are aberration diagrams at the time of infinite object point focusing of the variable magnification optical system according to the example 5;

FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L are aberration diagrams at the time of infinite object point focusing of the variable magnification optical system according to the example 6;

FIG. 15A, FIG. 15B, FIG. 15C, FIG. 15D, FIG. 15E, FIG. 15F, FIG. 15G, FIG. 15H, FIG. 15I, FIG. 15J, FIG. 15K, and FIG. 15L are aberration diagram at the time of infinite object point focusing of the variable magnification optical system according to the example 7;

FIG. 16A, FIG. 16B, FIG. 16C, FIG. 16D, FIG. 16E, FIG. 16F, FIG. 16G, FIG. 16H, FIG. 16I, FIG. 16J, FIG. 16K, and FIG. 16L are aberration diagrams at the time of infinite object point focusing of the variable magnification optical system according to the example 8;

DETAILED DESCRIPTION OF THE INVENTION

Figure 1A:
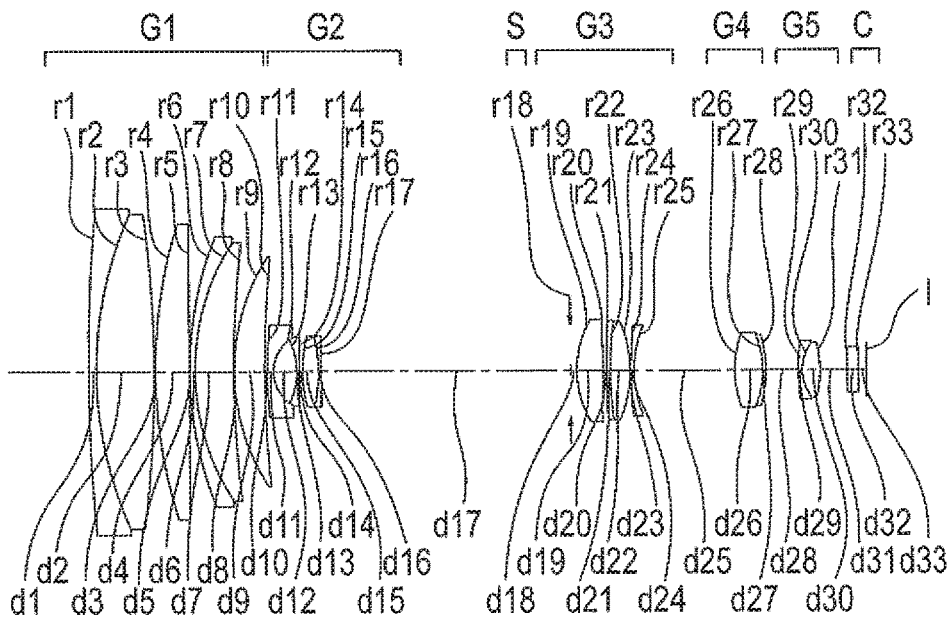
FIG. 1A, FIG. 1B, and FIG. 1C are lens cross-sectional views at the time of infinite object point focusing of a variable magnification optical system according to an example 1.
Figure 1B:
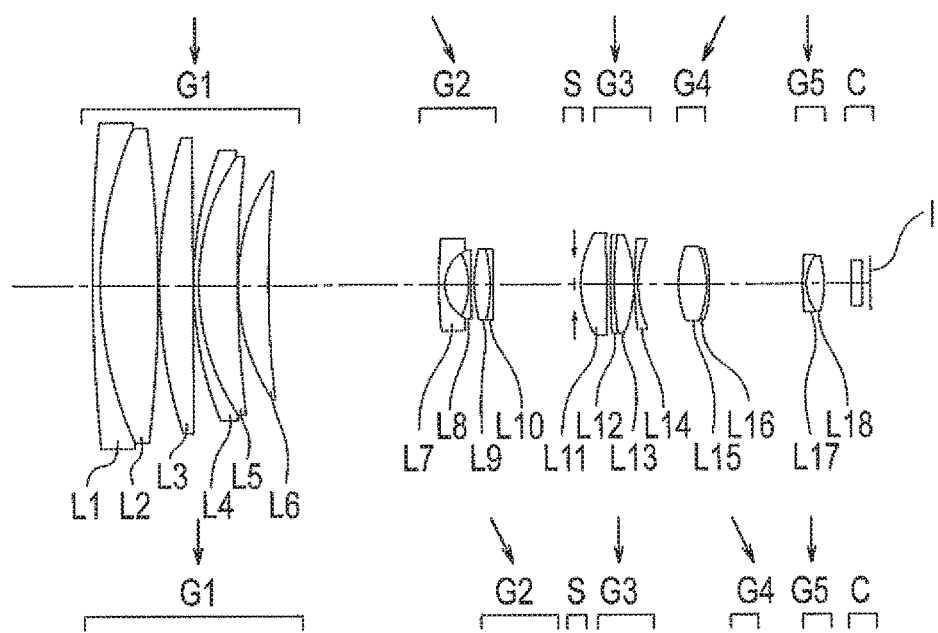
Figure 1C:
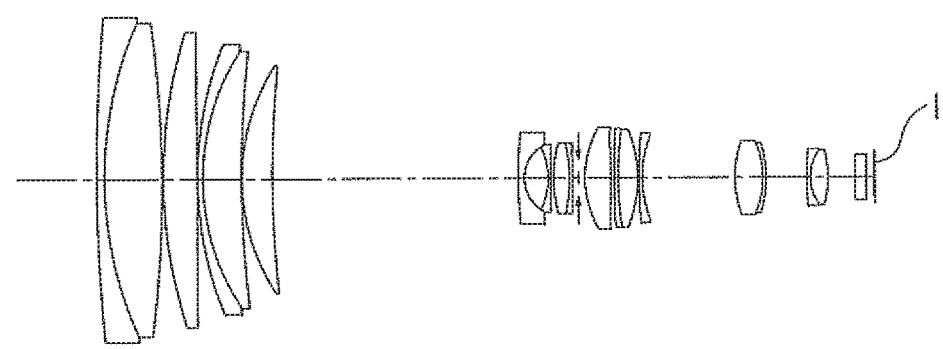
Figure 2A:
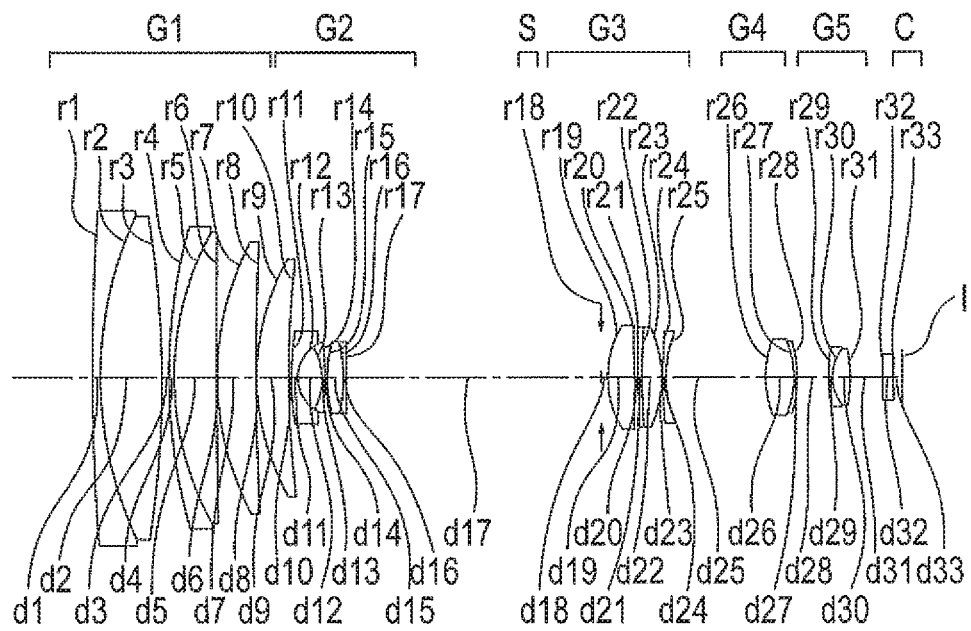
FIG. 2A, FIG. 2B, and FIG. 2C are lens cross-sectional views at the time of infinite object point focusing of a variable magnification optical system according to an example 2.
Figure 2B:
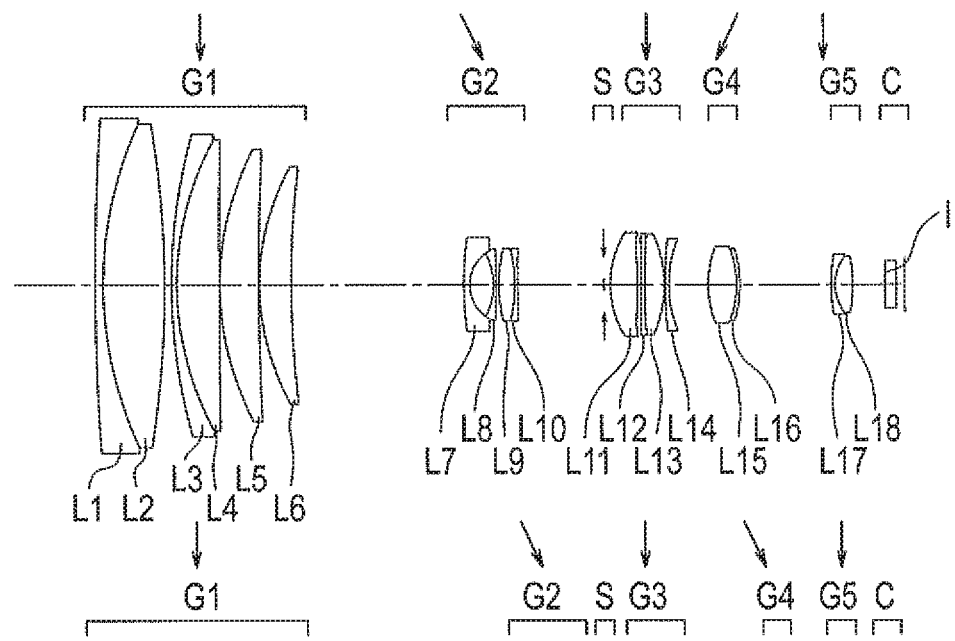
Figure 2C:
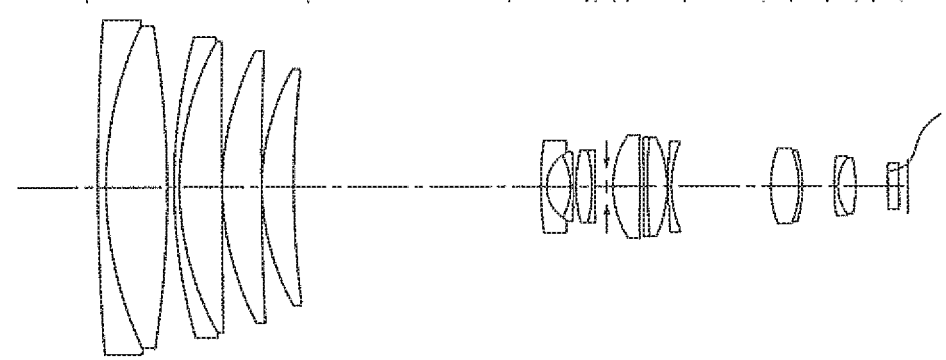
Figure 5A:
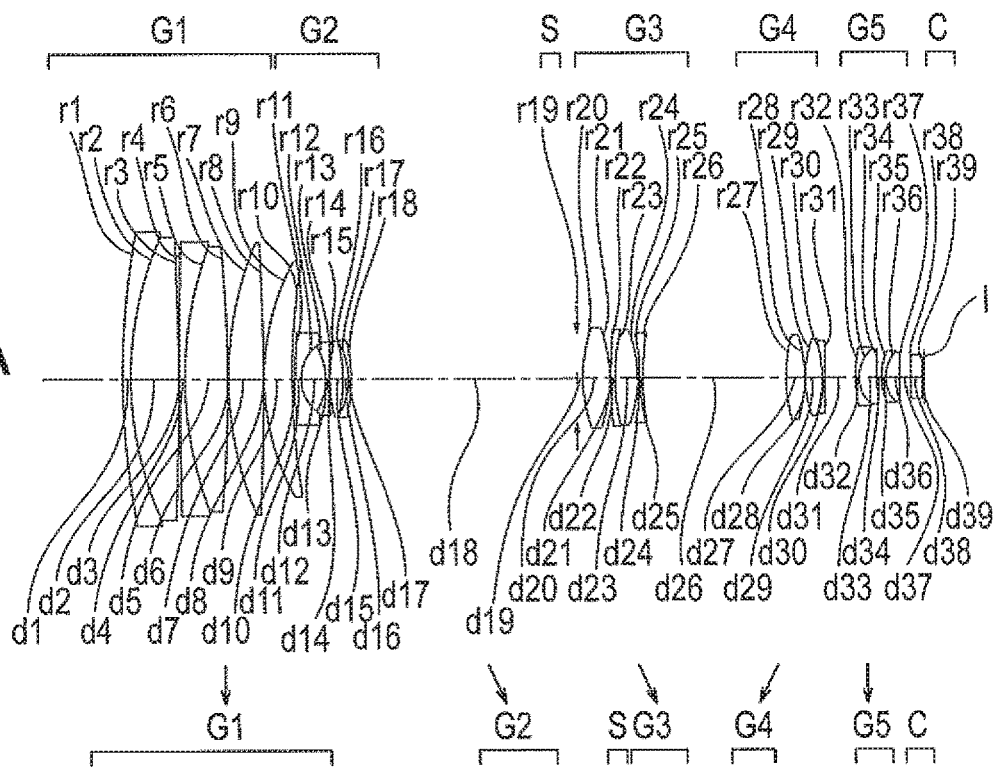
FIG. 5A, FIG. 5B, and FIG. 5C are lens cross-sectional views at the time of infinite object point focusing of a variable magnification optical system according to an example 5.
Figure 5B:
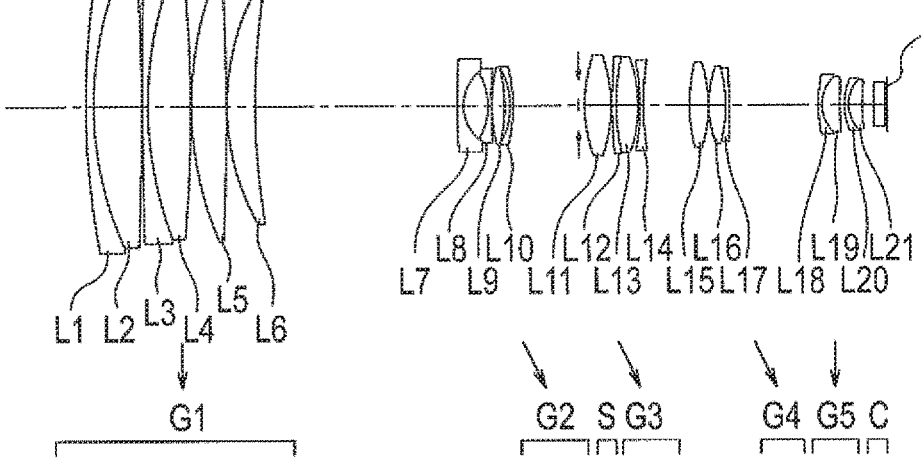
Figure 5C:
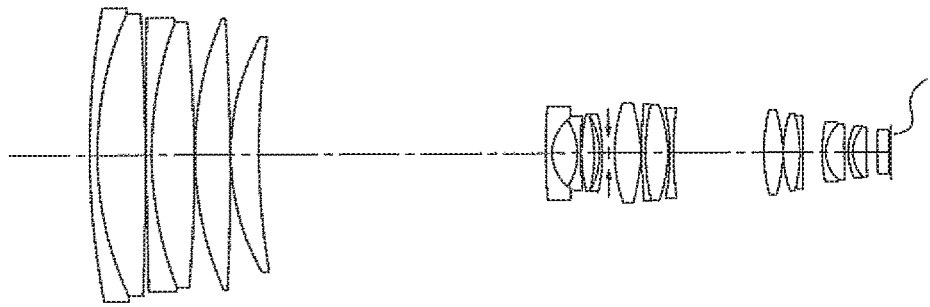
Figure 7A:
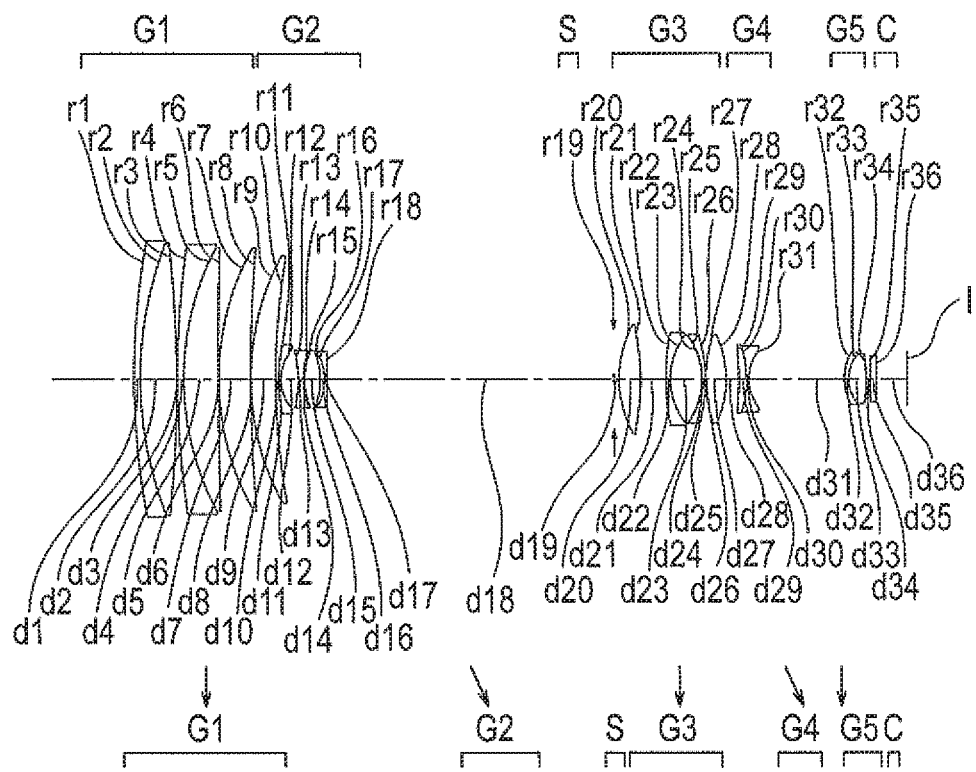
FIG. 7A, FIG. 7B, and FIG. 7C are lens cross-sectional views at the time of infinite object point focusing of a variable magnification optical system according to an example 7.
Figure 7B:
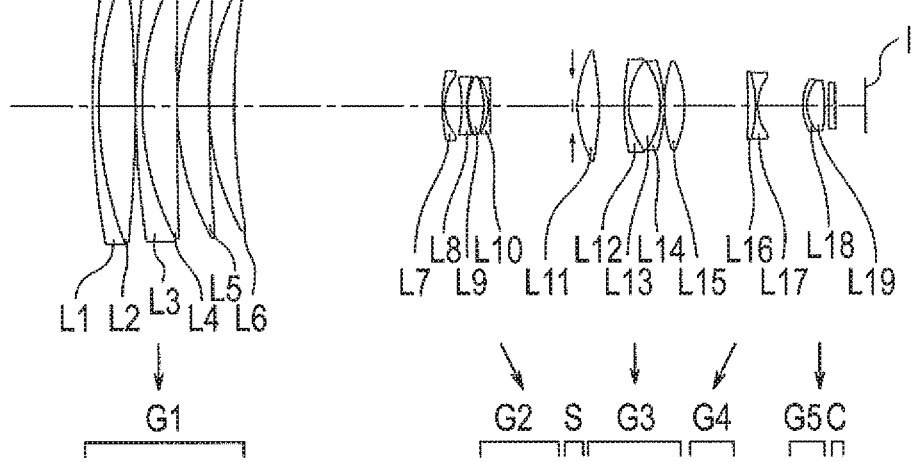
Figure 7C:
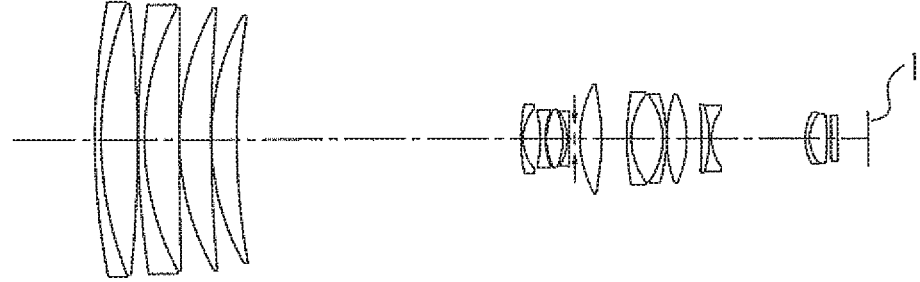
Figure 8A:
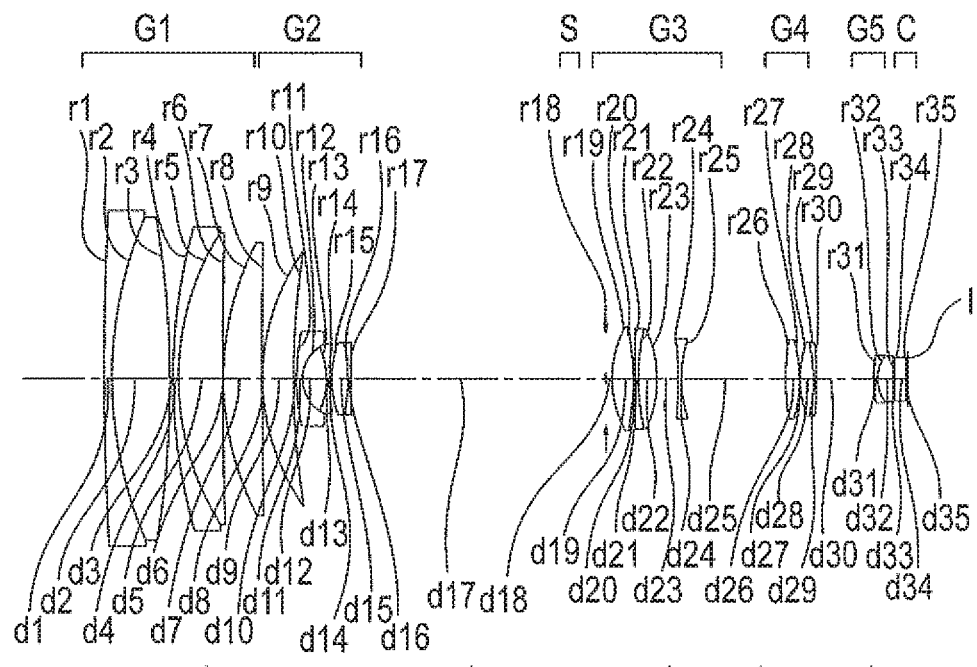
FIG. 8A, FIG. 8B, and FIG. 8C are lens cross-sectional views at the time of infinite object point focusing of a variable magnification optical system according to an example 8.
Figure 8B:
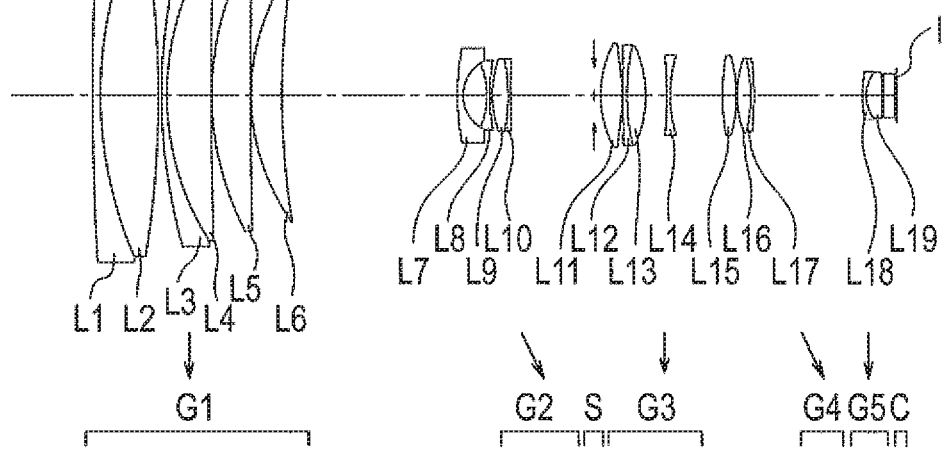
Figure 8C:
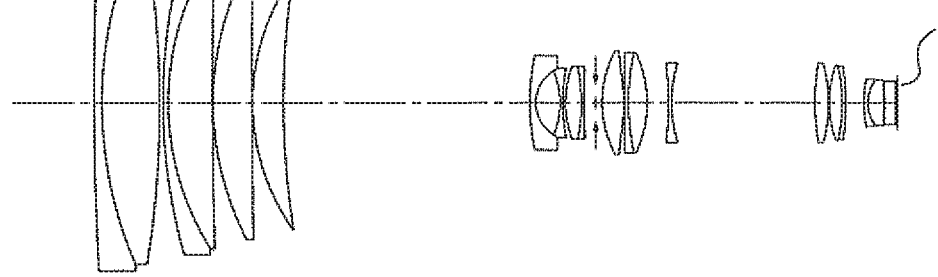

Prior to the explanation of examples, action and effect of embodiments according to certain aspects of the present invention will be described below. In the explanation of the action and effect of the embodiments concretely, the explanation will be made by citing concrete examples. However, similar to a case of the examples to be described later, aspects exemplified thereof are only some of the aspects included in the present invention, and there exists a large number of variations in these aspects. Consequently, the present invention is not restricted to the aspects that will be exemplified.

A basic arrangement of a variable magnification optical system of the present embodiment will be described below. The basic arrangement of the variable magnification optical system of the present embodiment includes a plurality of lens elements, and includes in order from an object side, a first lens unit having a positive refractive power, a second lens unit having a negative refractive power, a third lens unit having a positive refractive power, and at least one lens unit, wherein an aperture stop is either positioned between the second lens unit and the third lens unit, or positioned in the third lens unit, and at the time of zooming from a wide angle end to a telephoto end, the first lens unit is fixed, the second lens unit moves from the object side to an image-plane side, and at least one of lens units positioned on an image side of the aperture stop moves, and the first lens unit includes at least four positive lens elements and at least two negative lens elements. The lens element is a lens having a medium of a refractive index higher than 1 filled between an object-side surface and an image-side surface, and not having a refracting surface between the object-side surface and the image-side surface.

The basic arrangement includes in order form the object side, the first lens unit having a positive refractive power, the second lens unit having a negative refractive power, and the third lens unit having the positive refractive power. In the basic arrangement, the lens unit having a positive refractive power is positioned nearest to object. Therefore, the variable magnification optical system of the present embodiment is an optical system of a positive-lead type.

An optical system of the positive-lead type is advantageous for securing a high zoom ratio and a fast F-number from the wide angle end up to the telephoto end. Consequently, even in the variable magnification optical system of the present embodiment, it is possible to secure a high zoom ratio as well as a fast F-number from the wide angle end up to the telephoto end.

By disposing the second lens unit having a negative refractive power and the third lens unit having a positive refractive power, it is possible to make the lens unit positioned on the image side of the third lens unit small-sized.

At the wide angle end, an off-axis aberration, particularly, an astigmatism and a chromatic aberration of magnification occur due to the first lens unit and the second lens unit. By disposing at least one lens unit on the image side of the third lens unit, it is possible correct these aberrations favorably.

The aperture stop is disposed either between the second lens unit and the third lens unit, or in the third lens unit. By making such arrangement, by the third lens unit and a lens unit positioned on the image side of the third lens unit (hereinafter, referred to as 'image-side lens unit'), it is possible to suppress an increase in an axial-beam diameter.

At the time of zooming, the first lens unit is fixed. By letting the first lens unit to be fixed all the time, with respect to an image plane, it is possible to reduce a manufacturing error and to simplify a mechanical arrangement.

At the time of zooming, the second lens unit moves from the object side to the image-plane side, and a lens unit positioned on the image side of the second lens unit (hereinafter, referred to as 'first predetermined lens unit') moves. In the variable magnification optical system of the present embodiment, the major zooming is carried out by the second lens unit, and correction of an image-plane fluctuation due to zooming is carried out by the first predetermined lens unit.

The first predetermined lens unit is a lens unit such as the third lens unit. Or, as the first predetermined lens unit, a lens unit positioned on the image side of the third lens unit (hereinafter, referred to as 'second predetermined lens unit') is available. As mentioned above, the increase in the axial-beam diameter is suppressed on the image side of the third lens unit. Therefore, by moving the second predetermined lens unit, it is possible to carry out correction of a fluctuation in an image plane while suppressing a fluctuation in a spherical aberration and a fluctuation in the chromatic aberration magnification at the time of zooming.

The first lens unit includes at least four positive lens elements and two negative lens elements. By making such arrangement, it is possible to shorten a focal length of the first lens unit while suppressing an occurrence of various aberrations on a telephoto-end side.

Moreover, it is possible to shorten the overall length of the optical system, and to make small a front-lens diameter. Examples of various aberrations are the spherical aberration, the astigmatism, a longitudinal chromatic aberration, and the chromatic aberration of magnification. Suppressing the occurrence of the spherical aberration and the occurrence of the longitudinal chromatic aberration at the telephoto end is advantageous for securing a fast F-number at the telephoto end.

A variable magnification optical system of a first embodiment has the abovementioned basic arrangement, and the first lens unit includes a first positive lens element, a second positive lens element, a third positive lens element, an image-side positive lens element, and at least N number of negative lens elements, and all the negative lens elements in the first lens unit satisfy the following conditional expression (1A), and the first positive lens element, among all the positive lens elements in the first lens unit, is positioned nearest to object, and satisfies the following conditional expression (2A), and the second positive lens element is positioned nearest to the first positive lens element, and satisfies the following conditional expression (2B), and the third positive lens element is positioned nearest to the second positive lens element, and satisfies the following conditional expression (2C), and the image-side positive lens element, among all the positive lens elements in the first lens unit, is positioned nearest to image, and satisfies the following conditional expression (3):

$$0.5200 < (\theta g, F)ni < 0.5640 \quad (1A),$$

$$0.5200 < (\theta g, F)p1 < 0.5460 \quad (2A),$$

$$0.5200 < (\theta g, F)p2 < 0.5460 \quad (2B),$$

$$0.5200 < (\theta g, F)p3 < 0.5460 \quad (2C),$$

and $$0.5200 < (\theta g, F)pL < 0.5600 \quad (3)$$

where,
$2 \leq N$
$(\theta g, F)ni$ denotes a partial dispersion ratio of an $i^{th}$ negative lens element (i=1~N),
$(\theta g, F)p1$ denotes a partial dispersion ratio of the first positive lens element,
$(\theta g, F)p2$ denotes a partial dispersion ratio of the second positive lens element,
$(\theta g, F)p3$ denotes a partial dispersion ratio of the third positive lens element,
$(\theta g, F)pL$ denotes a partial dispersion ratio of the image-side positive lens element, $$(\theta g, F) = (ng - nF)/(nF - nC)$$

ng denotes a refractive index for a g-line,
nF denotes a refractive index for an F-line, and
nC denotes a refractive index for a C-line.

In the variable magnification optical system of the first embodiment, the first lens unit includes the first positive lens element, the second positive lens element, the third positive lens element, the image-side positive lens element, and at least N number of negative lens elements. Since $2 \leq N$, at least four positive lens elements and at least two negative lens elements are used in the first lens unit.

Conditional expression (1A) is a conditional expression related to a partial dispersion ratio of a glass material to be used in the negative lens element in the first lens unit. Conditional expressions (2A), (2B), (2C), and (3) are conditional expressions related to a partial dispersion ratio of a glass material to be used in the positive lens element in the first lens unit.

By using a glass material which satisfies conditional expression (1A), in the negative lens element in the first lens unit, and using a glass material which satisfies conditional expressions (2A), (2B), (2C), and (3), in the negative lens element in the first lens unit and the positive lens element in the first lens unit, it is possible to suppress an occurrence of an aberration for the g-line with respect to the F-line at the telephoto end, particularly, the longitudinal chromatic aberration and the chromatic aberration of magnification. As a result, it is possible improve an imaging performance at the telephoto end while securing a high zoom ratio.

The aberration for the g-line with respect to the F-line refers to an aberration for the g-line which remains when achromatized for the F-line and the C-line.

It is preferable that the following conditional expression (1A') be satisfied instead of conditional expression (1A).

$$0.5250 < (\theta g, F)ni < 0.5600 \quad (1A')$$

Moreover, it is more preferable that the following conditional expression (1A") be satisfied instead of conditional expression (1A).

$$0.5300 < (\theta g, F)ni < 0.5570 \quad (1A")$$

It is preferable that the following conditional expression (2A') be satisfied instead of conditional expression (2A).

$$0.5250 < (\theta g, F)p1 < 0.5410 \quad (2A')$$

Moreover, it is more preferable that the following conditional expression (2A") be satisfied instead of conditional expression (2A).

$$0.5300 < (\theta g, F)p1 < 0.5390 \quad (2A")$$

It is preferable that the following conditional expression (2B') be satisfied instead of conditional expression (2B).

$$0.5250 < (\theta g, F)p2 < 0.5410 \quad (2B')$$

Moreover, it is more preferable that the following conditional expression (2B") be satisfied instead of conditional expression (2B).

$$0.5300 < (\theta g, F)p2 < 0.5390 \quad (2B")$$

It is preferable that the following conditional expression (2C') be satisfied instead of conditional expression (2C).

$$0.5250 < (\theta g, F)p3 < 0.5410 \quad (2C')$$

Moreover, it is more preferable that the following conditional expression (2C") be satisfied instead of conditional expression (2C).

$$0.5300 < (\theta g, F)p3 < 0.5390 \quad (2C")$$

It is preferable that the following conditional expression (3') be satisfied instead of conditional expression (3).

$$0.5250 < (\theta g, F)pL < 0.5500 \quad (3')$$

Moreover, it is more preferable that the following conditional expression (3") be satisfied instead of conditional expression (3).

$$0.5300 < (\theta g, F)pL < 0.5390 \quad (3")$$

A variable magnification optical system of a second embodiment has the abovementioned basic arrangement, and the first lens unit includes a first sub lens unit and a second sub lens unit, and the first sub lens unit includes the negative lens element and the positive lens element, and the second sub lens unit includes the negative lens element and the positive lens element, and the following conditional expressions (4) and (5) are satisfied:

$$35 < vds1pmax - vds1nmin < 52 \quad (4),$$

and $$35 < vds2pmax - vds2nmin < 52 \quad (5)$$

where, vds1nmin denotes a minimum Abbe number from among Abbe numbers for all the negative lens elements in the first sub lens unit, vds1pmax denotes a maximum Abbe number from among Abbe numbers for all the positive lens elements in the first sub lens unit, vds2nmin denotes a minimum Abbe number from among Abbe numbers for all the negative lens elements in the second sub lens unit, vds2pmax denotes a maximum Abbe number from among Abbe numbers for all the positive lens elements in the second sub lens unit, and the lens element is a lens having a medium of a refractive index higher than 1 filled between an object-side surface and an image-side surface, and not having a refractive surface between the object-side surface and the image-side surface.

By the first lens unit including the first sub lens unit and the second sub lens unit, it is possible to let the refractive power of the first lens unit to be shared by the two sub lens units. By making such arrangement, it is possible to make small both a refractive power of the first sub lens unit and a refractive power of the second sub lens unit. Consequently, it is possible to suppress an occurrence of the spherical aberration at the telephoto end in both of the first sub lens unit and the second sub lens unit.

Conditional expression (4) and conditional expression (5) are conditional expressions related to a difference in Abbe number for the positive lens element and Abbe number for the negative lens element (hereinafter, referred to as 'difference in Abbe number').

By exceeding a lower limit value of conditional expression (4), it is possible to make an arrangement such that the difference in Abbe number does not become excessively small. In this case, it is possible to improve an achromatic effect for the F-line and the C-line. Consequently, it is possible to correct favorably the longitudinal chromatic aberration and the chromatic aberration of magnification at the telephoto end. As a result, it is possible to maintain a favorable imaging performance at the telephoto end.

By falling below an upper limit value of conditional expression (4), it is possible to make an arrangement such that the difference in Abbe number does not become excessively large. In other words, it is possible to suppress a dispersion of the negative lens element from becoming large with respect to a dispersion of the positive lens element. In this case, since it is possible impart a refractive power of an appropriate magnitude to the negative lens element, it is possible to correct favorably the longitudinal chromatic aberration at the telephoto end. Moreover, by the negative lens element having the refractive power of appropriate magnitude, it is possible to correct the spherical aberration and the astigmatism.

Technical significance of conditional expression (5) is same as the technical significance of conditional expression (4).

It is preferable that the following conditional expression (4') be satisfied instead of conditional expression (4).

$$40 < vds1pmax - vds1nmin < 51.5 \quad (4')$$

Moreover, it is more preferable that the following conditional expression (4") be satisfied instead of conditional expression (4).

$$45 < vds1pmax - vds1nmin < 51 \quad (4")$$

It is preferable that the following conditional expression (5') be satisfied instead of conditional expression (5).

$$38 < vds2pmax - vds2nmin < 48 \quad (5')$$

Moreover, it is more preferable that the following conditional expression (5") be satisfied instead of conditional expression (5).

$$40 < vds2pmax - vds2nmin < 44 \quad (5")$$

A variable magnification optical system of a third embodiment has the abovementioned basic arrangement, and the first lens unit includes a first sub lens unit and a second sub lens unit, and the first sub unit includes the negative lens element and the positive lens element, and the second sub lens unit includes the negative lens element and the positive lens element, and the following conditional expressions (6) and (7) are satisfied:

$$-0.0300 < (\theta g, F)s1pmin - (\theta g, F)s1nmax < -0.0060 \quad (6),$$

and $$-0.0300 < (\theta g, F)s2pmin - (\theta g, F)s2nmax < -0.0060 \quad (7)$$

where, $(\theta g, F)$ s1nmax denotes a maximum partial dispersion ratio from among the partial dispersion ratio for all the negative lens elements in the first sub lens unit, $(\theta g, F)$ s1pmin denotes a minimum partial dispersion ratio from among the partial dispersion ratio for all the positive lens elements in the first sub lens unit, $(\theta g, F)$s2nmax denotes a maximum partial dispersion ratio from among the partial dispersion ratio for all the negative lens elements in the second sub lens unit, $(\theta g, F)$s2pmin denotes a minimum partial dispersion ratio from among the partial dispersion ratio for all the positive lens elements in the second sub lens unit, $$(\theta g, F) = (ng - nF)/(nF - nC),$$

here, ng denotes a refractive index for a g-line,
nF denotes a refractive index for an F-line, and
nC denotes a refractive index for a C-line.

Conditional expression (6) and conditional expression (7) are conditional expressions related to a difference in the partial dispersion ratio of the positive lens element and the partial dispersion ratio of the negative lens element (hereinafter, referred to as 'difference in partial dispersion ratio').

By exceeding a lower limit value of conditional expression (6), it is possible to make an arrangement such that the difference in partial dispersion ratio does not become excessively small. In this case, since a difference in Abbe number also becomes large, it is possible to suppress an occurrence of the longitudinal chromatic aberration and the chromatic aberration of magnification for the g-line while improving the achromatic effect for the F-line and the c-line.

At the telephoto end, the longitudinal chromatic aberration and the chromatic aberration of magnification for the g-line are susceptible to occur. By falling below an upper limit value of conditional expression (6), it is possible to make an arrangement such that the difference in the partial dispersion ratio does not become excessively large. As a result, it is possible to suppress the occurrence of the longitudinal chromatic aberration and the chromatic aberration of magnification for the g-line.

Technical significance of conditional expression (7) is same as the technical significance of conditional expression (6).

It is preferable that the following conditional expression (6') be satisfied instead of conditional expression (6).

$$-0.0295 < (\theta g, F) s1p\text{min} - (\theta g, F) s1n\text{max} < -0.0100 \qquad (6')$$

Moreover, it is more preferable that the following conditional expression (6") be satisfied instead of conditional expression (6).

$$-0.0291 < (\theta g, F) s1p\text{min} - (\theta g, F) s1n\text{max} < -0.0170 \qquad (6")$$

It is preferable that the following conditional expression (7') be satisfied instead of conditional expression (7).

$$-0.0200 < (\theta g, F) s2p\text{min} - (\theta g, F) s2n\text{max} < -0.0080 \qquad (7')$$

Moreover, it is more preferable that the following conditional expression (7") be satisfied instead of conditional expression (7).

$$-0.0150 < (\theta g, F) s2p\text{min} - (\theta g, F) s2n\text{max} < -0.0090 \qquad (7")$$

In the variable magnification optical system of the first embodiment, it is preferable that the following conditional expression (8) be satisfied:

$$SFpL < (SFp2 + SFp3) \times 0.5 < SFp1 < 0 \qquad (8)$$

where,
$SFp1 = (Rp1o + Rp1i)/(Rp1o - Rp1i)$,
$SFp2 = (Rp2o + Rp2i)/(Rp2o - Rp2i)$,
$SFp3 = (Rp3o + Rp3i)/(Rp3o - Rp3i)$,
$SFpL = (RpLo + RpLi)/(RpLo - RpLi)$,
Rp1o denotes a radius of curvature of an object-side surface of the first positive lens element,
Rp1i denotes a radius of curvature of an image-side surface of the first positive lens element,
Rp2o denotes a radius of curvature of an object-side surface of the second positive lens element,
Rp2i denotes a radius of curvature of an image-side surface of the second positive lens element,
Rp3o denotes a radius of curvature of an object-side surface of the third positive lens element,
Rp3i denotes a radius of curvature of an image-side surface of the third positive lens element,
RpLo denotes a radius of curvature of an object-side surface of the image-side positive lens element, and
RpLi denotes a radius of curvature of an image-side surface of the image-side positive lens element.

Here, SFp1 is a shape factor of the first positive lens element, SFp2 is a shape factor of the second positive lens element, SFp3 is a shape factor of the third positive lens element, and SFpL is shape factor of the image-side positive lens element.

In such manner, conditional expression (8) is a conditional expression related to the shape factors of the positive lens elements in the first lens unit.

By satisfying conditional expression (8), the shape factor of the positive lens component becomes smaller gradually from the object side to the image-plane side. By making such arrangement, it is possible to refract axial marginal light rays at the telephoto end gradually. As a result, it is possible suppress an occurrence of the spherical aberration at the telephoto end.

Moreover, it is possible to make the refractive power large while suppressing the occurrence of the spherical aberration and maintaining a balance of the refractive power of the positive lens elements. Consequently, it is possible to make the refractive power of the first lens unit large while maintaining a high imaging performance. As a result, it is possible to shorten the overall length of the optical system while maintaining a high imaging performance.

It is more preferable that the following conditional expression (8') be satisfied instead of conditional expression (8).

$$SFpL \times 0.8 < (SFp2 + SFp3) \times 0.4 < SFp1 < 0 \qquad (8')$$

Moreover, it is even more preferable that the following conditional expression (8") be satisfied instead of conditional expression (8).

$$SFpL \times 0.7 < (SFp2 + SFp3) \times 0.35 < SFp1 < 0 \qquad (8")$$

In the variable magnification optical system of the first embodiment, it is preferable that the following conditional expressions (9), (10), and (11) be satisfied:

$$SFp1 < 0 \qquad (9),$$

$$SFpL < 0 \qquad (10),$$

and $$0.05 < |SFp1/SFpL| < 0.60 \qquad (11)$$

where,
$SFp1 = (Rp1o + Rp1i)/(Rp1o - Rp1i)$,
$SFpL = (RpLo + RpLi)/(RpLo - RpLi)$,
Rp1o denotes the radius of curvature of an object-side surface of the first positive lens element,
Rp1i denotes the radius of curvature of an image-side surface of the first positive lens element,
RpLo denotes the radius of curvature of an object-side surface of the image-side positive lens element, and
RpLi denotes the radius of curvature of an image-side surface of the image-side positive lens element.

Conditional expression (9) is a conditional expression related to the shape factor of the first positive lens element. Conditional expression (10) is a conditional expression related to the shape factor of the image-side positive lens element. Conditional expression (11) is a conditional expression related to a ratio of the shape factor of the first positive lens element and the image-side positive lens element.

When a value of the shape factor is zero, a shape of the positive lens element is such that a refractive power of an object-side surface and a refractive power of an image-side surface are equal. When the value of the shape factor becomes a negative value, the shape of the positive lens element is such that the refractive power of the object-side surface is larger than the refractive power of the image-side surface. Such shape is advantageous for suppressing an occurrence of the spherical aberration and an occurrence of the astigmatism.

By satisfying conditional expression (9), it is possible to let the shape of the first positive lens element to be such that the refractive power of the object-side surface is larger than the refractive power of the image-side surface. Moreover, by satisfying conditional expression (10), it is possible to let a shape of the image-side positive lens element to be such that a refractive power of the object-side surface is larger than a refractive power of the image-side surface. By satisfying conditional expression (9) and conditional expression (10), it is possible to suppress an occurrence of the spherical aberration and an occurrence of the astigmatism at the telephoto end.

By exceeding a lower limit value of conditional expression (11), it is possible to make an absolute value of the shape factor of the image-side positive lens element small with respect to an absolute value of the shape factor of the first positive lens element. In this case, in the image-side positive lens element, it is possible to suppress a curvature of the object-side surface with respect a curvature of the image-side surface. As a result, it is possible to let the shape of the image-side positive lens element to be a shape which is advantageous for securing an edge-thickness difference adequately, or in other words, a shape which is easy to manufacture.

By falling below an upper limit value of conditional expression (11), it is possible to make the absolute value of the shape factor of the image-side positive lens element large with respect to the absolute value of the shape factor of the first positive lens element. In this case, the shape of the image-side positive lens element becomes a shape which is advantageous for correction of the spherical aberration and correction of the astigmatism. Consequently, it is possible to make large the refractive power of the first lens unit while maintaining a high imaging performance. As a result, it is possible to shorten the overall length of the optical system while maintaining a high imaging performance.

It is more preferable that the following conditional expression (11') be satisfied instead of conditional expression (11).

$$0.08<|SFp1/SFpL1|<0.50 \qquad (11')$$

Moreover, it is more preferable that the following conditional expression (11") be satisfied instead of conditional expression (11).

$$0.20<|SFp1/SFpL|<0.40 \qquad (11")$$

In the variable magnification optical system of the first embodiment, it is preferable that the following conditional expressions (10), (12), and (13) be satisfied:

$$SFpL<0 \qquad (10),$$

$$SFp2<0 \qquad (12),$$

and $$0.05<|SFp2/SFpL|<0.95 \qquad (13)$$

where,
SFp2=(Rp2o+Rp2i)/(Rp2o−Rp2i),
SFpL=(RpLo+RpLi)/(RpLo−RpLi),
Rp2o denotes the radius of curvature of an object-side surface of the second positive lens element,
Rp2i denotes the radius of curvature of an image-side surface of the second positive lens element,
RpLo denotes the radius of curvature of an object-side surface of the image-side positive lens element, and
RpLi denotes the radius of curvature of an image-side surface of the image-side positive lens element.

Conditional expression (12) is a conditional expression related to the shape factor of the second positive lens element. Conditional expression (13) is a conditional expression related to a ratio of the shape factor of the second positive lens element and the shape factor of the image-side positive lens element.

When a value of the shape factor is zero, a shape of the positive lens element is such that a refractive power of an object-side surface and a refractive power of an image-side surface are equal. When the value of the shape factor becomes a negative value, the shape of the positive lens element is such that the refractive power of the object-side surface is larger than the refractive power of the image-side surface. Such shape is advantageous for suppressing an occurrence of the spherical aberration and an occurrence of the astigmatism.

By satisfying conditional expression (10), it is possible to let the shape of the image-side positive lens element to be such that the refractive power of the object-side surface is larger than the refractive power of the image-side surface. Moreover, by satisfying conditional expression (12), it is possible to let a shape of the second positive lens element to be such that a refractive power of the object-side surface is larger than a refractive power of the image-side surface. By satisfying conditional expression (10) and conditional expression (12), it is possible to suppress an occurrence of the spherical aberration and an occurrence of the astigmatism at the telephoto end.

By exceeding a lower limit value of conditional expression (13), it is possible to make an absolute value of the shape factor of the image-side positive lens element small with respect to an absolute value of the shape factor of the second positive lens element. In this case, in the image-side positive lens element, it is possible to suppress a curvature of the object-side surface with respect a curvature of the image-side surface. As a result, it is possible to let the shape of the image-side positive lens element to be a shape which is advantageous for securing an edge-thickness difference adequately, or in other words, a shape which is easy to manufacture.

By falling below an upper limit value of conditional expression (13), it is possible to make the absolute value of the shape factor of the image-side positive lens element large with respect to the absolute value of the shape factor of the second positive lens element. In this case, the shape of the image-side positive lens element becomes a shape which is advantageous for correction of the spherical aberration and correction of the astigmatism. Consequently, it is possible to make large the refractive power of the first lens unit while maintaining a high imaging performance. As a result, it is possible to shorten the overall length of the optical system while maintaining a high imaging performance.

It is more preferable that the following conditional expression (13') be satisfied instead of conditional expression (13).

$$0.10<|SFp2/SFpL|<0.80 \qquad (13')$$

Moreover, it is even more preferable that the following conditional expression (13") be satisfied instead of conditional expression (13).

$$0.20<|SFp2/SFpL|<0.70 \qquad (13")$$

In the variable magnification optical system of the first embodiment, it is preferable that the following conditional expressions (10), (14), and (15) be satisfied:

$$SFpL<0 \qquad (10),$$

$$SFp3<0 \qquad (14),$$

and $$0.05<|SFp3/SFpL|<1.4 \qquad (15)$$

where,
SFp3=(Rp3o+Rp3i)/(Rp3o−Rp3i),
SFpL=(RpLo+RpLi)/(RpLo−RpLi),
Rp3o denotes the radius of curvature of an object-side surface of the third positive lens element,
Rp3i denotes the radius of curvature of an image-side surface of the third positive lens element, RpLo denotes the radius of curvature of an object-side surface of the image-side positive lens element, and RpLi denotes the radius of curvature of an image-side surface of the image-side positive lens element.

Conditional expression (14) is a conditional expression related to the shape factor of the third positive lens element. Conditional expression (15) is a conditional expression related to a ratio of the shape factor of the third positive lens element and the shape factor of the image-side positive lens element.

When a value of the shape factor is zero, a shape of the positive lens element is such that a refractive power of an object-side surface and a refractive power of an image-side surface are equal. When the value of the shape factor becomes a negative value, the shape of the positive lens element is such that the refractive power of the object-side surface is larger than the refractive power of the image-side surface. Such shape is advantageous for suppressing an occurrence of the spherical aberration and an occurrence of the astigmatism.

By satisfying conditional expression (10), it is possible to let the shape of the image-side positive lens element to be such that the refractive power of the object-side surface is larger than the refractive power of the image-side surface. Moreover, by satisfying conditional expression (14), it is possible to let a shape of the third positive lens element to be such that a refractive power of the object-side surface is larger than a refractive power of the image-side surface. By satisfying conditional expression (10) and conditional expression (14), it is possible to suppress an occurrence of the spherical aberration and an occurrence of the astigmatism at the telephoto end.

By exceeding a lower limit value of conditional expression (15), it is possible to make an absolute value of the shape factor of the image-side positive lens element small with respect to an absolute value of the shape factor of the third positive lens element. In this case, in the image-side positive lens element, it is possible to suppress a curvature of the object-side surface with respect a curvature of the image-side surface. As a result, it is possible to let the shape of the image-side positive lens element to be a shape which is advantageous for securing an edge-thickness difference adequately, or in other words, a shape which is easy to manufacture.

By falling below an upper limit value of conditional expression (15), it is possible to make the absolute value of the shape factor of the image-side positive lens element large with respect to the absolute value of the shape factor of the third positive lens element. In this case, the shape of the image-side positive lens element becomes a shape which is advantageous for correction of the spherical aberration and correction of the astigmatism. Consequently, it is possible to make large the refractive power of the first lens unit while maintaining a high imaging performance. As a result, it is possible to shorten the overall length of the optical system while maintaining a high imaging performance.

It is more preferable that the following conditional expression (15') ibe satisfied instead of conditional expression (15).

$$0.15 < |SFp3/SFpL| < 1.2 \quad (15')$$

Moreover, it is even more preferable that the following conditional expression (15") be satisfied instead of conditional expression (15).

$$0.30 < |SFp3/SFpL| < 1.1 \quad (15'')$$

In the variable magnification optical system of the first embodiment, it is preferable that the first lens unit include a first negative lens element and an image-side negative lens element, and the first negative lens element be positioned nearest to object, among all the negative lens elements in the first lens unit, and the image-side negative lens element be positioned nearest to image, among all the negative lens elements in the first lens unit, and the following conditional expressions (16), (17), and (18) be satisfied:

$$0 < SFn1 \quad (16),$$

$$0 < SFnL \quad (17),$$

and $$0.2 < SFn1/SFnL < 2.5 \quad (18)$$

where,
SFn1=(Rn1o+Rn1i)/(Rn1o−Rn1i),
SFnL=(RnLo+RnLi)/(RnLo−RnLi),
Rp1o denotes a radius of curvature of an object-side surface of the first negative lens element,
Rn1i denotes a radius of curvature of an image-side surface of the first negative lens element,
RnLo denotes a radius of curvature of an object-side surface of the image-side negative lens element, and
RnLi denotes a radius of curvature of an image-side surface of the image-side negative lens element.

Conditional expression (16) is a conditional expression related to a shape factor of the first negative lens element. Conditional expression (17) is a conditional expression related to a ratio of the shape factor of the first negative lens element and a shape factor of the image-side negative lens element.

When a value of the shape factor is zero, a shape of the negative lens element is such that a refractive power of an object-side surface and a refractive power of an image-side surface are equal. When the value of the shape factor becomes a positive value, the shape of the negative lens element is such that the refractive power of the image-side surface is larger than the refractive power of the object-side surface. Such shape is advantageous for suppressing an occurrence of the spherical aberration and an occurrence of the astigmatism.

By satisfying conditional expression (16), it is possible to let the shape of the first negative lens element to be such that the refractive power of the image-side surface is larger than the refractive power of the object-side surface. Moreover, by satisfying conditional expression (17), it is possible to let a shape of the image-side negative lens element to be such that a refractive power of the image-side surface is larger than a refractive power of the object-side surface. By satisfying conditional expression (16) and conditional expression (17), it is possible to suppress an occurrence of the spherical aberration and an occurrence of the astigmatism at the telephoto end.

By exceeding a lower limit value of conditional expression (18), it is possible to make an absolute value of the shape factor of the image-side negative lens element small with respect to an absolute value of the shape factor of the first negative lens element. In this case, in the image-side negative lens element, it is possible to suppress a curvature of the image-side surface from becoming large with respect to a curvature of the object-side surface. As a result, it is possible to let a shape of the image-side negative lens element to be a concave shape with a small sag, or in other words, to be a shape that is easy to manufacture.

By falling below an upper limit value of conditional expression (18), it is possible to make the absolute value of the shape factor of the image-side negative lens element large with respect to the absolute value of the shape factor of the first negative lens element. By making such arrangement, in the image-side negative lens element, it is possible to correct the spherical aberration, the astigmatism, and the longitudinal chromatic aberration.

It is more preferable that the following conditional expression (18') be satisfied instead of conditional expression (18).

$$0.25 < SFn1/SFnL < 2.3 \tag{18'}$$

Moreover, it is even more preferable that the following conditional expression (18") be satisfied instead of conditional expression (18).

$$0.30 < SFn1/SFnL < 0.75 \tag{18"}$$

In the variable magnification optical system of the first embodiment, it is preferable that the first lens unit include a plurality of lens components, and include in order from the object side, a first lens component, a second lens component, a third lens component, and a fourth lens component, and the first lens component include the negative lens element and the first positive lens element, and second lens component either include the second positive lens element or include the negative lens element and the second positive lens element, and the third lens component either include the third positive lens element or include the negative lens element and the third positive lens element, and the fourth lens component include the image-side positive lens element, and the following conditional expression (19) be satisfied:

$$-0.5 < SFc1/SFc4 < 0.4 \tag{19}$$

where,
SFc1=(Rc1o+Rc1i)/(Rc1o−Rc1i),
SFc4=(Rc4o+Rc4i)/(Rc4o−Rc4i),
Rc1o denotes a radius of curvature of an object-side surface of the first lens component,
Rc1i denotes a radius of curvature of an image-side surface of the first lens component,
Rc4o denotes a radius of curvature of an object-side surface of the fourth lens component,
Rc4i denotes a radius of curvature of an image-side surface of the fourth lens component, and
the lens component is one of a single lens and a cemented lens.

Conditional expression (19) is a conditional expression related to a ratio of a shape factor of the first lens component and a shape factor of the fourth lens component.

By exceeding a lower limit value of conditional expression (19), it is possible to make an absolute value of the shape factor of the fourth lens component small with respect to an absolute value of the shape factor of the first lens component. In this case, in the fourth lens component, it is possible to suppress a curvature of the object-side surface with respect to a curvature of the image-side surface. As a result, it is possible to suppress the spherical aberration that occurs at the object-side surface of the fourth lens component.

By falling below an upper limit value of conditional expression (19), it is possible to make an absolute value of the shape factor of the fourth lens component large with respect to the absolute value of the shape factor of the first lens component. In this case, a shape of the fourth lens component is a shape which is advantageous for correction of the spherical aberration and for correction of the astigmatism. Consequently, it is possible to make a refractive power of the fourth lens component large while maintaining a high imaging performance. As a result, it is possible to shorten the overall length of the optical system while maintaining a high imaging performance.

It is more preferable that the following conditional expression (19') be satisfied instead of conditional expression (19).

$$-0.40 < SFc1/SFc4 < 0.3 \tag{19'}$$

Moreover, it is even more preferable that the following conditional expression (19") be satisfied instead of conditional expression (19).

$$-0.30 < SFc1/SFc4 < 0.15 \tag{19"}$$

In the variable magnification optical system of the first embodiment, it is preferable that the first lens unit include a plurality of lens components, and include in order from the object side, a first lens component, a second lens component, a third lens component, and a fourth lens component, and the first lens component include the negative lens element and the first positive lens element, and the second lens component either include the second positive lens element or include the negative lens element and the second positive lens element, and the third lens component either include the third positive lens element or include the negative lens element and the third positive lens element, and the fourth lens component include the image-side positive lens element, and the following conditional expression (20) be satisfied:

$$-0.90 < SFc2/SFc4 < 0.95 \tag{20}$$

where,
SFc2=(Rc2o+Rc2i)/(Rc2o−Rc2i),
SFc4=(Rc4o+Rc4i)/(Rc4o−Rc4i),
Rc2o denotes a radius of curvature of an object-side surface of the second lens component,
Rc2i denotes a radius of curvature of an image-side surface of the second lens component,
Rc4o denotes the radius of curvature of an object-side surface of the fourth lens component,
Rc4i denotes the radius of curvature of an image-side surface of the fourth lens component, and
the lens component is one of a single lens and a cemented lens.

Conditional expression (20) is a conditional expression related to a ratio of a shape factor of the second lens component and a shape factor of the fourth lens component.

By exceeding a lower limit value of conditional expression (20), it is possible to make an absolute value of the shape factor of the fourth lens component small with respect to an absolute value of the shape factor of the second lens component. In this case, in the fourth lens component, it is possible to suppress a curvature of the object-side surface with respect to a curvature of the image-side surface. As a result, it is possible to suppress the spherical aberration that occurs at the object-side surface of the fourth lens component.

By falling below an upper limit value of conditional expression (20), it is possible to make an absolute value of the shape factor of the fourth lens component large with respect to the absolute value of the shape factor of the second lens component. In this case, a shape of the fourth lens component is a shape which is advantageous for correction of the spherical aberration and for correction of the astigmatism. Consequently, it is possible to make a refractive power of the fourth lens component large while maintaining a high imaging performance. As a result, it is possible to shorten the overall length of the optical system while maintaining a high imaging performance.

It is more preferable that the following conditional expression (20') be satisfied instead of conditional expression (20).

$$-0.85<SFc2/SFc4<0.90 \quad (20')$$

Moreover, it is even more preferable that the following conditional expression (20") be satisfied instead of conditional expression (20).

$$0.20<SFc2/SFc4<0.80 \quad (20")$$

In the variable magnification optical system of the first embodiment, it is preferable that the first lens unit include a plurality of lens components, and include in order from the object side, a first lens component, a second lens component, a third lens component, and a fourth lens component, and the first lens component include the negative lens element and the first positive lens element, and the second lens component either include the second positive lens element or include the negative lens element and the second positive lens element, the third lens component either include the third positive lens element or includes the negative lens element and the third positive lens element, and the fourth lens component include the image-side positive lens element, and the following conditional expression (21) be satisfied.

$$0.10<SFc3/SFc4<1.60 \quad (21)$$

where,
SFc3=(Rc3o+Rc3i)/(Rc3o−Rc3i),
SFc4=(Rc4o+Rc4i)/(Rc4o−Rc4i),
Rc3o denotes a radius of curvature of an object-side surface of the third lens component,
Rc3i denotes a radius of curvature of an image-side surface of the third lens component,
Rc4o denotes the radius of curvature of an object-side surface of the fourth lens component,
Rc4i denotes the radius of curvature of an image-side surface of the fourth lens component, and
the lens component is one of a single lens and a cemented lens.

Conditional expression (21) is a conditional expression related to a ratio of a shape factor of the third lens component and the shape factor of the fourth lens component.

By exceeding a lower limit value of conditional expression (21), it is possible to make an absolute value of the shape factor of the fourth lens component small with respect to an absolute value of the shape factor of the third lens component. In this case, in the fourth lens component, it is possible to suppress a curvature of the object-side surface with respect to a curvature of the image-side surface. As a result, it is possible to suppress the spherical aberration that occurs at the object-side surface of the fourth lens component.

By falling below an upper limit value of conditional expression (21), it is possible to make an absolute value of the shape factor of the fourth lens component large with respect to the absolute value of the shape factor of the third lens component. In this case, a shape of the fourth lens component is a shape which is advantageous for correction of the spherical aberration and for correction of the astigmatism. Consequently, it is possible to make a refractive power of the fourth lens component large while maintaining a high imaging performance. As a result, it is possible to shorten the overall length of the optical system while maintaining a high imaging performance.

It is more preferable that the following conditional expression (21') be satisfied instead of conditional expression (21).

$$0.15<SFc3/SFc4<1.50 \quad (21')$$

Moreover, it is even more preferable that the following conditional expression (21") be satisfied instead of conditional expression (21).

$$0.40<SFc3/SFc4<1.40 \quad (21")$$

In the variable magnification optical system of the first embodiment, it is preferable that the first lens unit include a first sub lens unit and a second sub lens unit, and the first sub lens unit include a cemented lens of one negative lens element and one positive lens element, and the second sub lens unit include a cemented lens of one negative lens element and one positive lens element.

The first lens unit includes at least four positive lens elements and at least two negative lens elements. In this case, when one negative lens element and one positive lens element are cemented, it is possible to dispose at least two cemented lenses in the first lens unit.

By using the cemented lens, correction of the chromatic aberration of magnification is possible while correcting the longitudinal chromatic aberration at the telephoto end.

At a cemented surface, the spherical aberration is susceptible to occur at the telephoto end. By using two cemented lenses, it is possible to make a curvature of a cemented surface small in each cemented lens. As a result, it is possible to suppress an occurrence of the spherical aberration.

In the variable magnification optical system of the first embodiment, it is preferable that the first lens unit include a first cemented lens and a second cemented lens, and the first cemented lens includes the negative lens element and the positive lens element, and the second cemented lens includes the negative lens element and the positive lens element, and the following conditional expressions (22) and (23) are satisfied:

$$4.0<Rce1/dce1<9.5 \quad (22),$$

and $$4.0<Rce2/dce2<9.0 \quad (23)$$

where,
Rce1 denotes a radius of curvature of a cemented surface of the first cemented lens,
Rce2 denotes a radius of curvature of a cemented surface of the second cemented lens,
dce1 denotes an axial thickness of the first cemented lens, and
dce2 denotes an axial thickness of the second cemented lens.

Conditional expression (22) is a conditional expression related to a ratio of the radius of curvature of the cemented surface of the first cemented lens and the axial thickness of the first cemented lens. Conditional expression (23) is a conditional expression related to a ratio of the radius of curvature of the cemented surface of the second cemented lens and the axial thickness of the second cemented lens.

By exceeding a lower limit value of conditional expression (22), it is possible to make an arrangement such that the radius of curvature of the cemented surface does not become excessively small with respect to the axial thickness of the cemented lens. In this case, in the negative lens element, it is possible to suppress a curvature of a concave surface from becomes excessively large. As a result, it is possible to let a shape of the negative lens element to be a concave shape with a small sag, or in other words, to be a shape that is easy to manufacture.

Moreover, it is possible to let a shape of the positive lens element to be a shape which is advantageous for securing an edge-thickness difference adequately, or in other words, to be a shape which is easy to manufacture.

By falling below an upper limit value of conditional expression (22), it is possible to make the radius of curvature of the cemented surface small. In this case, since it is possible to let the cemented surface to have the refractive power of appropriate magnitude with respect to the axial thickness, it is possible to exert efficiently, an effect of correcting the longitudinal chromatic aberration and correcting the chromatic aberration of magnification of the cemented surface.

Technical significance of conditional expression (23) is same as the technical significance of conditional expression (22).

It is more preferable that the following conditional expression (22') be satisfied instead of conditional expression (22).

$$4.5 < Rce1/dce1 < 9.0 \tag{22'}$$

It is even more preferable that the following conditional expression (22") be satisfied instead of conditional expression (22).

$$5.0 < Rce1/dce1 < 8.00 \tag{22''}$$

It is more preferable that the following conditional expression (23') be satisfied instead of conditional expression (23).

$$4.5 < Rce2/dce2 < 8.5 \tag{23'}$$

Moreover, it is even more preferable that the following conditional expression (23") be satisfied instead of conditional expression (23).

$$5.4 < Rce2/dce2 < 7.90 \tag{23''}$$

In the variable magnification optical system of the first embodiment, it is preferable that the first lens unit include a first cemented lens and a second cemented lens, and the first cemented lens include the negative lens element and the positive lens element, and the second cemented lens include the negative lens element and the positive lens element, and the following conditional expressions (24) and (25) be satisfied:

$$0.000200 < |(\theta g, F)ce1p - (\theta g, F)ce1n|/(vdce1p - vdce1n) < 0.000700 \tag{24}$$

and $$0.000200 < |(\theta g, F)ce2p - (\theta g, F)ce2n|/(vdce2p - vdce2n) < 0.000700 \tag{25}$$

where, $(\theta g, F)ce1p$ denotes a partial dispersion ratio of the positive lens element in the first cemented lens, $(\theta g, F)ce1n$ denotes a partial dispersion ratio of the negative lens element in the first cemented lens, $vdce1p$ denotes Abbe number for the positive lens element in the first cemented lens, $vdce1n$ denotes Abbe number for the negative lens element in the first cemented lens, $(\theta g, F)ce2p$ denotes a partial dispersion ratio of the positive lens element in the second cemented lens, $(\theta g, F)ce2n$ denotes a partial dispersion ratio of the negative lens element in the second cemented lens, $vdce2p$ denotes Abbe number for the positive lens element in the second cemented lens, and $vdce2n$ denotes Abbe number for the negative lens element in the second cemented lens.

Conditional expression (24) is a conditional expression related to the partial dispersion ratio and Abbe number for the first cemented lens. Conditional expression (25) is a conditional expression related to the partial dispersion ratio and Abbe number for the second cemented lens.

By exceeding a lower limit value of conditional expression (24), it is possible to make large a difference in the partial dispersion ratio of the positive lens element and the partial dispersion ratio of the negative lens element. In this case, it is possible to make a refractive index of the negative lens element high with respect to a refractive index of the positive lens element. Consequently, correction of the spherical aberration in the negative lens element becomes easy.

Moreover, it is possible to make small a difference in Abbe number for the positive lens element and Abbe number for the negative lens element. In this case, at the time of carrying out the correction of the longitudinal chromatic aberration and the correction of the chromatic aberration of magnification, it is possible make a refractive power of the negative lens element large with respect to a refractive power of the positive lens element. Consequently, correction of the spherical aberration by the negative lens element becomes easy.

By falling below an upper limit value of conditional expression (24), it is possible to suppress an increase in the difference in the partial dispersion ratio of the positive lens element and the partial dispersion ratio of the negative lens element. Consequently, it is possible to carry out the correction of the longitudinal chromatic aberration and the chromatic aberration of magnification for the g-line with respect to the F-line.

Moreover, it is possible to make large the difference in Abbe number for the positive lens element and Abbe number for the negative lens element. In this case, at the time of carrying out the correction of the longitudinal chromatic aberration and the correction of the chromatic aberration of magnification, it is possible to make an arrangement such that the refractive power of the negative lens element does not become large with respect to the refractive power of the positive lens element. Consequently, it is possible to suppress an occurrence of the spherical aberration.

Technical significance of conditional expression (25) is same as the technical significance of conditional expression (24).

It is more preferable that the following conditional expression (24') be satisfied instead of conditional expression (24).

$$0.000370 < |(\theta g, F)ce1p - (\theta g, F)ce1n|/(vdce1p - vdce1n) < 0.000600 \tag{24'}$$

Moreover, it is even more preferable that the following conditional expression (24") be satisfied instead of conditional expression (24).

$$0.000390 < |(\theta g, F)ce1p - (\theta g, F)ce1n|/(vdce1p - vdce1n) < 0.000580 \tag{24''}$$

It is more preferable that the following conditional expression (25') be satisfied instead of conditional expression (25).

$$0.000230 < |(\theta g, F)ce2p - (\theta g, F)ce2n|/(vdce2p - vdce2n) < 0.000360 \tag{25'}$$

Moreover, it is even more preferable that the following conditional expression (25") be satisfied instead of conditional expression (25).

$$0.000250<|(\theta g,F)ce2p-(\theta g,F)ce2n1|/(vdce2p-vdce2n)<0.000340 \qquad (25")$$

In the variable magnification optical system of the first embodiment, it is preferable that the first lens unit include a first cemented lens and a second cemented lens, and the first cemented lens includes the negative lens element and the positive lens element, and the second cemented lens includes the negative lens element and the positive lens element, and the following conditional expressions (26) and (27) be satisfied:

$$-0.00030<1/(fce1p \times vdce1p)+1/(fce1n \times vdce1n)<-0.000010 \qquad (26),$$

and $$-0.00030<1/(fce2p \times vdce2p)+1/(fce2n \times vdce2n)<-0.000005 \qquad (27)$$

where, fce1p denotes a focal length of the positive lens element in the first cemented lens, fce1n denotes a focal length of the negative lens element in the first cemented lens, vdce1p denotes the Abbe number for the positive lens element in the first cemented lens, vdce1n denotes the Abbe number for the negative lens element in the first cemented lens, fce2p denotes a focal length of the positive lens element in the second cemented lens, fce2n denotes a focal length of the negative lens element in the second cemented lens, vdce2p denotes the Abbe number for the positive lens element in the second cemented lens, and vdce2n denotes the Abbe number for the negative lens element in the second cemented lens.

Conditional expression (26) is a conditional expression related to the focal length and Abbe number for the first cemented lens. Conditional expression (27) is a conditional expression related to the focal length and Abbe number for the second cemented lens. Both of conditional expression (26) and conditional expression (27) are conditional expressions for achromatism.

By exceeding a lower limit value of conditional expression (26), it is possible to make large a reciprocal of a product of the focal length and Abbe number in the positive lens element. In this case, in the positive lens element, it is possible to shorten appropriately the focal length with respect to Abbe number. In other words, it is possible to make the refractive power of positive lens element large appropriately. Accordingly, since it is possible to make the refractive power of the first lens unit large, it is possible to shorten the overall length of the optical system.

By falling below an upper limit value of conditional expression (26), it is possible to bring a reciprocal of a product of the focal length and Abbe number for the negative lens element closer to the reciprocal of the product of the focal length and Abbe number for the positive lens element. In this case, it is possible to correct the longitudinal chromatic aberration and the chromatic aberration of magnification occurred in the positive lens element at the telephoto end, in the negative lens element. Consequently, it becomes possible to maintain a favorable imaging performance at the telephoto end.

Technical significance of conditional expression (27) is same as the technical significance of conditional expression (26).

It is more preferable that the following conditional expression (26') be satisfied instead of conditional expression (26).

$$-0.00020<1/(fce1p \times vdce1p)+1/(fce1n \times vdce1n)<-0.000020 \qquad (26')$$

Moreover, it is even more preferable that the following conditional expression (26") be satisfied instead of conditional expression (26).

$$-0.00010<1/(fce1p \times vdce1p)+1/(fce1n \times vdce1n)<-0.000050 \qquad (26")$$

It is more preferable that the following conditional expression (27') be satisfied instead of conditional expression (27).

$$-0.00020<1/(fce2p \times vdce2p)+1/(fce2n \times vdce2n)<-0.000010 \qquad (27')$$

Moreover, it is even more preferable that the following conditional expression (27") be satisfied instead of conditional expression (27).

$$-0.00017<1/(fce2p \times vdce2p)+1/(fce2n \times vdce2n)<-0.000015 \qquad (27")$$

In the variable magnification optical system of the first embodiment, it is preferable that the first lens unit include a plurality of lens components, and include in order from the object side, a first lens component, a second lens component, a third lens component, and a fourth lens component, and the first lens component include the negative lens element and the first positive lens element, and the second lens component either include the second positive lens element or include the negative lens element and the second positive lens element, and the third lens component either include the third positive lens element or include the negative lens element and the third positive lens element, and the fourth lens component include the image-side positive lens element, and the following conditional expressions (28), (29), (30), and (31) be satisfied:

$$1.5<dc1/dc4<2.5 \qquad (28),$$

$$0.8<dc2/dc4<2.5 \qquad (29),$$

$$0.8<dc3/dc4<2.0 \qquad (30),$$

and $$0.10<dc4/dG1<0.22 \qquad (31)$$

where, dc1 denotes a thickness on an optical axis of the first lens component, dc2 denotes a thickness on the optical axis of the second lens component, dc3 denotes a thickness on the optical axis of the third lens component, dc4 denotes a thickness on the optical axis of the fourth lens component, dG1 denotes a thickness on the optical axis of the first lens unit, and the lens component is one of a single lens and a cemented lens.

Conditional expressions (28), (29), (30), and (31) are conditional expressions related to a thickness of each lens component when the first lens unit includes four lens components.

By exceeding a lower limit value of conditional expression (28), it is possible to keep the thickness on an optical axis of the first lens component thick with respect to the thickness on the optical axis of the fourth lens component. By exceeding a lower limit value of conditional expression (29), it is possible to keep the thickness on the optical axis of the second lens component thick with respect to the thickness on the optical axis of the fourth lens component. By exceeding a lower limit value of conditional expression (30), it is possible to keep the thickness on the optical axis of the third lens component thick with respect to the thickness on the optical axis of the fourth lens component.

In all cases, it is possible to make a shape of the positive lens element a shape which is advantageous for securing an adequate edge-thickness difference. Moreover, in a case of having the negative lens element, it is possible to secure adequately an on-axis lens thickness in the negative lens element. As a result, it is possible to make a shape of each lens component to be a shape that is easy to manufacture.

By falling below an upper limit value of conditional expression (28), it is possible to keep the thickness on the optical axis of the first lens component thin with respect to the thickness on the optical axis of the fourth lens component. By falling below an upper limit value of conditional expression (29), it is possible to keep the thickness on the optical axis of the second lens component thin with respect to the thickness on the optical axis of the fourth lens component. By falling below an upper limit value of conditional expression (30), it is possible to keep the thickness on the optical axis of the third lens component thin with respect to the thickness on the optical axis of the fourth lens component.

In all cases, it is possible to make the first lens unit small-sized.

By exceeding a lower limit value of conditional expression (31), it is possible to keep the thickness on the optical axis of the fourth lens component thin with respect to the thickness on the optical axis of the first lens component. Consequently, it is possible to make the first lens unit small-sized.

By falling below an upper limit value of conditional expression (31), it is possible to keep the thickness on the optical axis of the fourth lens component thick with respect to the thickness on the optical axis of the first lens component. As a result, it is possible to let a shape of the fourth lens component to be a lens shape that is easy to manufacture.

It is possible to let the thickness on the optical axis of the first lens component to be a distance from an object-side surface of the first lens component up to an image-side surface of the fourth lens component.

It is more preferable that the following conditional expression (28') be satisfied instead of conditional expression (28).

$$1.6 < dc1/dc4 < 2.3 \tag{28'}$$

Moreover, it is even more preferable that the following conditional expression (28") be satisfied instead of conditional expression (28).

$$1.7 < dc1/dc4 < 2.2 \tag{28"}$$

It is more preferable that the following conditional expression (29') be satisfied instead of conditional expression (29).

$$0.9 < dc2/dc4 < 2.2 \tag{29'}$$

Moreover, it is even more preferable that the following conditional expression (29") be satisfied instead of conditional expression (29).

$$1.0 < dc2/dc4 < 2.0 \tag{29"}$$

It is more preferable that the following conditional expression (30') be satisfied instead of conditional expression (30).

$$0.9 < dc3/dc4 < 1.70 \tag{30'}$$

Moreover, it is even more preferable that the following conditional expression (30") be satisfied instead of conditional expression (30).

$$1.0 < dc3/dc4 < 1.50 \tag{30"}$$

It is more preferable that the following conditional expression (31') be satisfied instead of conditional expression (31).

$$0.13 < dc4/dG1 < 0.20 \tag{31'}$$

Moreover, it is even more preferable that the following conditional expression (31") be satisfied instead of conditional expression (31).

$$0.15 < dc4/dG1 < 0.19 \tag{31"}$$

In the variable magnification optical system of the first embodiment, it is preferable that the following conditional expressions (32), (33), and (34) be satisfied:

$$0.60 < fp1/fpL < 1.60 \tag{32}$$

$$0.60 < fp2/fpL < 2.4 \tag{33}$$

and $$0.70 < fp3/fpL < 1.60 \tag{34}$$

where, fp1 denotes a focal length of the first positive lens element, fp2 denotes a focal length of the second positive lens element, fp3 denotes a focal length of the third positive lens element, and fpL denotes a focal length of the image-side positive lens element.

Each of conditional expressions (32), (33), and (34) is a conditional expression related to the focal length of the positive lens element in the first lens unit.

By exceeding a lower limit value of conditional expression (32), it is possible to make the focal length of the first positive lens element long with respect to the focal length of the image-side positive lens element. By exceeding a lower limit value of conditional expression (33), it is possible to make the focal length of the second positive lens element long with respect to the focal length of the image-side positive lens element. By exceeding a lower limit value of conditional expression (34), it is possible to make the focal length of the third positive lens element long with respect to the focal length of the image-side positive lens element.

In all cases, it is possible to suppress an occurrence of the astigmatism at the telephoto end.

By falling below an upper limit value of conditional expression (32), it is possible to make the focal length of the first positive lens element short with respect to the focal length of the image-side positive lens element. By falling below an upper limit value of conditional expression (33), it is possible to make the focal length of the second positive lens element short with respect to the focal length of the image-side positive lens element. By falling below an upper limit value of conditional expression (34), it is possible to make the focal length of the third positive lens element short with respect to the focal length of the image-side positive lens element.

In all cases, it is possible to let the refractive power of the first lens unit to be shared by the plurality of positive lens elements. In this case, it is possible to make the refractive power of the first lens unit large while suppressing an occurrence of the spherical aberration and an occurrence of the astigmatism in each positive lens element. As a result, it is possible to shorten the overall length of the optical system.

It is more preferable that the following conditional expression (32') be satisfied instead of conditional expression (32).

$$0.65 < fp1/fpL < 1.40 \quad (32')$$

Moreover, it is even more preferable that the following conditional expression (32") be satisfied instead of conditional expression (32).

$$0.70 < fp1/fpL < 1.20 \quad (32'')$$

It is more preferable that the following conditional expression (33') be satisfied instead of conditional expression (33).

$$0.65 < fp2/fpL < 2.2 \quad (33')$$

It is even more preferable that the following conditional expression (33") be satisfied instead of conditional expression (33).

$$0.70 < fp2/fpL < 2.0 \quad (33'')$$

It is more preferable that the following conditional expression (34') be satisfied instead of conditional expression (34).

$$0.75 < fp3/fpL < 1.40 \quad (34')$$

It is even more preferable that the following conditional expression (34") be satisfied instead of conditional expression (34).

$$0.80 < fp3/fpL < 1.20 \quad (34'')$$

In the variable magnification optical system of the first embodiment, it is preferable that the first lens unit include a first negative lens element and an image-side negative lens element, and the first negative lens element be positioned nearest to object, among all the negative lens elements in the first lens unit, and the image-side negative lens element be positioned nearest to image, among all the negative lens elements in the first lens unit, and the following conditional expression (35) be satisfied:

$$0.40 < |fn1/fnL| < 1.9 \quad (35)$$

where,
fn1 denotes a focal length of the first negative lens element, and
fnL denotes a focal length of the image-side negative lens element.

Conditional expression (35) is a conditional expression related to a ratio of the focal length of the first negative lens element and the focal length of the image-side negative lens element.

By exceeding a lower limit value of conditional expression (35), it is possible to let the image-side negative lens element have a refractive power of an appropriate magnitude with respect to the refractive power of the first negative lens element. Consequently, it is possible to suppress an occurrence of the spherical aberration and an occurrence of the longitudinal chromatic aberration at the telephoto end, even in the image-side negative lens element.

By falling below an upper limit value of conditional expression (35), it is possible to let the refractive power of the image-side negative lens element to be small with respect to the refractive power of the first negative lens element. In this case, since the refractive power of the first negative lens element becomes relatively larger, it is possible to position an entrance pupil farther on the object side. As a result, it is possible to make a lens diameter of the first lens unit small.

It is more preferable that the following conditional expression (35') be satisfied instead of conditional expression (35).

$$0.50 < |fn1/fnL| < 1.8 \quad (35')$$

It is even more preferable that the following conditional expression (35") be satisfied instead of conditional expression (35).

$$0.55 < |fn1/fnL| < 1.0 \quad (35'')$$

In the variable magnification optical system of the first embodiment, it is preferable that the first lens unit include a plurality of lens components, and include in order from the object side, a first lens component, a second lens component, a third lens component, and a fourth lens component, and the first lens component include the negative lens component and the first positive lens component, and the second lens component either include the second positive lens element or include the negative lens element and the second positive lens element, and the third lens component either include the third positive lens element or include the negative lens element and the third positive lens element, and the fourth lens component include the image-side positive lens element, and the following conditional expressions (36), (37), and (38) be satisfied:

$$-0.30 < fc4/fc1 < 0.40 \quad (36),$$

$$-0.70 < fc4/fc2 < 0.80 \quad (37),$$

and $$0.10 < |fc4/fc3| < 1.40 \quad (38)$$

where,
fc1 denotes a focal length of the first lens component,
fc2 denotes a focal length of the second lens component,
fc3 denotes a focal length of the third lens component,
fc4 denotes a focal length of the fourth lens component, and
the lens component is one of a single lens and a cemented lens.

Conditional expressions (36), (37), and (38) are conditional expressions related to a ratio of the focal lengths of the lens components, when the first lens unit includes four lens components.

By exceeding a lower limit value of conditional expression (36), it is possible to make the focal length of the fourth lens component short with respect to the focal length of the first lens component. BY exceeding a lower limit value of conditional expression (37), it is possible to make the focal length of the fourth lens component short with respect to the focal length of the second lens component. By exceeding a lower limit value of conditional expression (38), it is possible to make the focal length of the fourth lens component short with respect to the focal length of the third lens component.

In all cases, it is possible to make the positive refractive power large at a position where the diameter is the smallest in the first lens unit. In this case, it is possible to make the refractive power of the first lens unit large without making a diameter of the first lens unit large. As a result, it is possible to shorten the overall length of the optical system.

By falling below an upper limit value of conditional expression (36), it is possible to make the focal length of the fourth lens component long with respect to the focal length of the first lens component. By falling below an upper limit value of conditional expression (37), it is possible to make the focal length of the fourth lens component long with respect to the focal length of the second lens component. By falling below an upper limit value of conditional expression (38), it is possible to make the focal length of the fourth lens component long with respect to the focal length of the third lens component.

The spherical aberration and the longitudinal chromatic aberration occur in the first lens component, the second lens component, and the third lens component. In all cases, it is possible to suppress an occurrence of the spherical aberration and an occurrence of the longitudinal chromatic aberration in each lens component.

It is more preferable that the following conditional expression (36') be satisfied instead of conditional expression (36).

$$-0.20 < fc4/fc1 < 0.20 \tag{36'}$$

It is even more preferable that the following conditional expression (36") be satisfied instead of conditional expression (36).

$$-0.10 < fc4/fc1 < 0.05 \tag{36"}$$

It is more preferable that the following conditional expression (37') be satisfied instead of conditional expression (37).

$$-0.60 < fc4/fc2 < 0.70 \tag{37'}$$

Moreover, it is even more preferable that the following conditional expression (37") be satisfied instead of conditional expression (37).

$$0 < fc4/fc2 < 0.60 \tag{37"}$$

It is more preferable that the following conditional expression (38') be satisfied instead of conditional expression (38).

$$0.15 < |fc4/fc3| < 1.30 \tag{38'}$$

Moreover, it is even more preferable that the following conditional expression (38") be satisfied instead of conditional expression (38).

$$0.20 < |fc4/fc3| < 1.25 \tag{38"}$$

In the variable magnification optical system of the first embodiment, it is preferable that the following conditional expression (39) be satisfied:

$$5 < RpLo/dpL < 12 \tag{39}$$

where,

RpLo denotes the radius of curvature of an object-side surface of the image-side positive lens element, and dpL denotes a thickness on an optical axis of the image-side positive lens element.

Conditional expression (39) is a conditional expression related to the radius of curvature of the object-side surface of the image-side positive lens element and the thickness of the image-side positive lens element.

By exceeding a lower limit value of conditional expression (39), it is possible to make a diameter of the lens element small in a manufacturable range while shortening the focal length of the image-side positive lens element.

By falling below an upper limit value of conditional expression (39), it is possible to make small the radius of curvature of the object-side surface of the image-side positive lens element. In this case, it is possible make the refractive power of the image-side positive lens element large while suppressing the spherical aberration at the telephoto end. As a result, it is possible to shorten the overall length of the optical system.

It is preferable that the following conditional expression (39') be satisfied instead of conditional expression (39).

$$6.0 < RpLo/dpL < 11 \tag{39'}$$

Moreover, it is even more preferable that the following conditional expression (39") be satisfied instead of conditional expression (39).

$$6.5 < RpLo/dpL < 9.5 \tag{39"}$$

In the variable magnification optical system of the first embodiment, it is preferable that the first lens unit include at least M number of positive lens elements, and all the negative lens elements in the first lens unit satisfy the following conditional expressions (40) and (1B), and all the positive lens elements in the first lens unit satisfy the following conditional expressions (41) and (42):

$$43 < vdni < 65 \tag{40},$$

$$0.520 < (\theta g, F)ni < 0.580 \tag{1B},$$

$$50 < vdpj < 100 \tag{41},$$

and $$0.520 < (\theta g, F)pj < 0.5500 \tag{42}$$

where, $4 \leq M$, vdni denotes Abbe number for an $i^{th}$ negative lens element (i=1~N), $(\theta g, F)ni$ denotes a partial dispersion ratio of the $i^{th}$ negative lens element (i=1~N), vdpj denotes Abbe number for a $j^{th}$ positive lens element, and $(\theta g, F)pj$ denotes a partial dispersion ratio of the $j^{th}$ positive lens element (j=1~M).

Conditional expression (40) is a conditional expression related to Abbe number for a glass material to be used in the negative lens element in the first lens unit. Conditional expression (1B) is a conditional expression related to a partial dispersion ratio of the glass material to be used in the negative lens element in the first lens unit. Conditional expression (41) is a conditional expression related to Abbe number for a glass material to be used in the positive lens element in the first lens unit. Conditional expression (42) is a conditional expression related to a partial dispersion ratio of a glass material to be used in the positive lens element in the first lens unit.

By exceeding a lower limit value of conditional expression (40), it is possible to keep Abbe number for the negative lens element large. In this case, it is possible to use a lens with a small dispersion. As a result, in the first lens unit, it is possible to suppress an occurrence of a chromatic aberration for the F-line and an occurrence of a chromatic aberration for the C-line.

By falling below an upper limit value of conditional expression (40), it is possible to keep Abbe number for the negative lens element small. In this case, it is possible to make a refractive index of the negative lens element large. As a result, it is possible to correct the spherical aberration at the telephoto end that has occurred in the positive lens element.

By exceeding a lower limit value of conditional expression (1B), it is possible to keep the partial dispersion ratio of the negative lens element large. In this case, it is possible to make a refractive index of the negative lens element large. As a result, it is possible to correct the spherical aberration at the telephoto end.

By falling below an upper limit value of conditional expression (1B), it is possible to keep the partial dispersion ratio of the negative lens element small. As a result, it is possible to correct an aberration for the g-line with respect the F-line at the telephoto end, particularly, the longitudinal chromatic aberration and the chromatic aberration of magnification.

By exceeding a lower limit value of conditional expression (41), it is possible to keep Abbe number for the positive lens element large. In this case, in the first lens unit, it is possible to suppress an occurrence of the chromatic aberration for the F-line and the chromatic aberration for the C-line.

By falling below an upper limit value of conditional expression (41), it is possible to keep Abbe number for the positive lens element small. In this case, it is possible to make a refractive index of the positive lens element large. As a result, it is possible to suppress the spherical aberration at the telephoto end that occurs in the positive lens.

By exceeding a lower limit value of conditional expression (42), it is possible to keep the partial dispersion ratio of the positive lens element large. In this case, it is possible to select a glass material within a range of glass materials that really exist.

By falling below an upper limit value of conditional expression (42), it is possible to keep the partial dispersion ratio of the positive lens element small. In this case, it is possible to suppress an occurrence of an aberration for the g-line with respect to the F-line at the telephoto end, particularly, the longitudinal chromatic aberration and the chromatic aberration of magnification.

It is more preferable that the following conditional expression (40') be satisfied instead of conditional expression (40).

$$43.5 < vdni < 60 \qquad (40')$$

Moreover, it is even more preferable that the following conditional expression (40") be satisfied instead of conditional expression (40).

$$44 < vdni < 55 \qquad (40'')$$

It is more preferable that the following conditional expression (1B') be satisfied instead of conditional expression (1B).

$$0.540 < (\theta g, F)ni < 0.5700 \qquad (1B')$$

Moreover, it is more preferable that the following conditional expression (1B") be satisfied instead of conditional expression (1B).

$$0.5440 < (\theta g, F)ni < 0.5640 \qquad (1B'')$$

It is more preferable that the following conditional expression (41') be satisfied instead of conditional expression (41).

$$54 < vdpj < 98 \qquad (41')$$

Moreover, it is even more preferable that the following conditional expression (41") be satisfied instead of conditional expression (41).

$$75 < vdpj < 96 \qquad (41'')$$

It is more preferable that the following conditional expression (42') be satisfied instead of conditional expression (42).

$$0.5330 < (\theta g, F)pj < 0.5420 \qquad (42')$$

Moreover, it is even more preferable that the following conditional expression (42") be satisfied instead of conditional expression (42).

$$0.5300 < (\theta g, F)pj < 0.5450 \qquad (42'')$$

In the variable magnification optical system of the first embodiment, it is preferable that the following conditional expression (43) be satisfied:

$$11 < fG1/fw < 16 \qquad (43)$$

where, fG1 denotes a focal length of the first lens unit, and fw denotes a focal length of the overall variable magnification optical system at the wide angle end.

Conditional expression (43) is a conditional expression related to the focal length of the first lens unit with respect to the focal length of overall variable magnification optical system at the wide angle end.

By exceeding a lower limit value of conditional expression (43), it is possible to make the focal length of the first lens unit long. As a result, it is possible to suppress an occurrence of the astigmatism and an occurrence of the chromatic aberration of magnification in the first lens unit.

By falling below an upper limit value of conditional expression (43), it is possible to make the focal length of the first lens unit short. In this case, it is possible to suppress a height of an off-axis principal light ray on a wide-angle end side, incident on the second lens unit. Consequently, it is possible to suppress an aberration at the wide angle end that occurs in the second lens unit, such as a distortion, the chromatic aberration of magnification, and the astigmatism.

It is more preferable that the following conditional expression (43') be satisfied instead of conditional expression (43).

$$12.0 < fG1/fw < 15.5 \qquad (43')$$

Moreover, it is even more preferable that the following conditional expression (43") be satisfied instead of conditional expression (43).

$$12.5 < fG1/fw < 15.0 \qquad (43'')$$

In the variable magnification optical system of the first embodiment, it is preferable that the following conditional expression (44) be satisfied:

$$0.1 < fG1/ft < 0.6 \qquad (44)$$

where, fG1 denotes the focal length of the first lens unit, and ft denotes a focal length of the overall variable magnification optical system at the telephoto end.

Conditional expression (44) is a conditional expression related to the focal length of the first lens unit with respect to the focal length of the overall variable magnification optical system at the telephoto end.

By exceeding a lower limit value of conditional expression (44), it is possible to make the focal length of the first lens unit long. As a result, it is possible to suppress an aberration at the telephoto end that occurs in the first lens unit, particularly, the spherical aberration, the astigmatism, the longitudinal chromatic aberration, and the chromatic aberration of magnification.

By falling below an upper limit value of conditional expression (44), it is possible to make the focal length of the first lens unit short. As a result, it is possible to shorten the overall length of the optical system at the telephoto end.

It is preferable that the following conditional expression (44') be satisfied instead of conditional expression (44).

$$0.2 < fG1/ft < 0.5 \quad (44')$$

Moreover, it is even more preferable that the following conditional expression (44") be satisfied instead of conditional expression (44).

$$0.25 < fG1/ft < 0.45 \quad (44'')$$

In the variable magnification optical system of the first embodiment, it is preferable that the following conditional expression (45) be satisfied:

$$6.0 < |fG1/fG2| < 11 \quad (45)$$

where, fG1 denotes the focal length of the first lens unit, and fG2 denotes a focal length of the second lens unit.

Conditional expression (45) is a conditional expression related to a ratio of the focal length of the first lens unit with respect to the focal length of the second lens unit.

By exceeding a lower limit value of conditional expression (45), it is possible to make the focal length of the first lens unit long with respect to the focal length of the second lens unit. As a result, it is possible to suppress an aberration at the telephoto end that occurs in the first lens unit, particularly, the spherical aberration, the astigmatism, the longitudinal chromatic aberration, and the chromatic aberration of magnification.

By falling below an upper limit value of conditional expression (45), it is possible to make the focal length of the first lens unit short with respect to the focal length of the second lens unit. In this case, since it is possible to improve a zooming effect when the second lens unit moves, it is possible to reduce an amount of movement of the second lens unit. As a result, it is possible to shorten the overall length of the optical system.

It is more preferable that the following conditional expression (45') be satisfied instead of conditional expression (45).

$$6.5 < |fG1/fG2| < 10.5 \quad (45')$$

Moreover, it is even more preferable that the following conditional expression (45") be satisfied instead of conditional expression (45).

$$7 < |fG1/fG2| < 10 \quad (45'')$$

In the variable magnification optical system of the first embodiment, it is preferable that the first lens unit include in order from the object side, the first negative lens element, the first positive lens element, the image-side negative lens element, the second positive lens element, the third positive lens element, and the image-side positive lens element, and the first negative lens element be cemented to the first positive lens element, and the image-side negative lens element be cemented to the second positive lens element.

A lens diameter of a lens element positioned on the image side of the first negative lens element is determined by a light ray on a wide angle side. By disposing the negative lens element nearest to object, it is possible to position an entrance-pupil on the object side. As a result, it is possible to make the lens diameter of the lens element small.

On the image side of the first negative lens element, the first positive lens element is positioned immediately adjacent to the first negative lens element. By making such arrangement, it is possible to refract an axial marginal light ray at the telephoto end to become closer to the optical axis. As a result, it is possible make an F-number at the telephoto end small while small-sizing a lens diameter of a lens element positioned on the image side of the first positive lens element.

On the image side of the first positive lens element, the image-side negative lens element is disposed immediately adjacent to the first positive lens element. By making such arrangement, it is possible correct the spherical aberration and the astigmatism that cannot be corrected fully only by the first negative lens element.

Moreover, by carrying out the correction of aberration by two negative lens elements, it is possible to suppress a curvature of each negative lens element from becoming large. In this case, it is possible to let a shape of each negative lens element to be a concave shape with a small sag, or in other words, a shape that is easy to manufacture.

The second positive lens element, the third positive lens element, and the image-side positive lens element are disposed on the image side of the image-side negative lens element. A lens diameter of the image-side positive lens element is smaller than a lens diameter of the other positive lens elements. Consequently, in the image-side positive lens element, even when the refractive power is made large, the thickness does not become thick. In this case, it is possible to make large the positive refractive power of the image-side positive lens element efficiently. As a result, it is possible to make the first lens unit small-sized.

In the variable magnification optical system of the first embodiment, it is preferable that the following conditional expression (46) be satisfied:

$$1.10 < fG1/\Delta G2 < 1.60 \quad (46)$$

Where, fG1 denotes the focal length of the first lens unit, and

ΔG2 denotes an amount of movement of the second lens unit from the wide angle end to the telephoto end.

Conditional expression (46) is a conditional expression related to a ratio of the focal length of the first lens unit and the amount of movement of the second lens unit from the wide angle end up to the telephoto end.

By exceeding a lower limit value of conditional expression (46), it is possible to make the focal length of the first lens unit long, or in other words, to make the refractive power of the first lens unit small, with respect to the amount of movement of the second lens unit. As a result, it is possible to suppress an aberration at the telephoto end that occurs in the first lens unit, particularly, the longitudinal chromatic aberration, the chromatic aberration of magnification, and the spherical aberration.

By falling below an upper limit value of conditional expression (46), it is possible to make the focal length of the first lens unit short, or in other words, to make the refractive power of the first lens unit large, with respect to the amount of movement of the second lens unit. In this case, it is possible to suppress the amount of movement of the second lens unit at the time of zooming. As a result, it is possible to shorten the overall length of the optical system.

It is more preferable that the following conditional expression (46') be satisfied instead of conditional expression (46).

$$1.20 < fG1/\Delta G2 < 1.50 \qquad (46')$$

Moreover, it is even more preferable that the following conditional expression (46") be satisfied instead of conditional expression (46).

$$1.25 < fG1/\Delta G2 < 1.45 \qquad (46'')$$

In the variable magnification optical system of the first embodiment, it is preferable that the following conditional expression (47) be satisfied:

$$0.80 < (\beta 2t/\beta 2w)/(ft/fw) < 1.60 \qquad (47)$$

where,

β2t denotes a lateral magnification of the second lens unit at the time of infinite object point focusing, at the telephoto end, β2w denotes a lateral magnification of the second lens unit at the time of infinite object point focusing, at the wide angle end, ft denotes the focal length of the overall variable magnification optical system at the telephoto end, and fw denotes the focal length of the overall variable magnification optical system at the wide angle end.

Conditional expression (47) is a conditional expression related to a zoom ratio of the second lens unit with respect to a zoom ratio of the overall variable magnification optical system. The zoom ratio of the second lens unit is expressed as a zooming load rate of the second lens unit.

By exceeding a lower limit value of conditional expression (47), it is possible to make the zoom ratio of the second lens unit large with respect to the zoom ratio of the overall variable magnification optical system. In this case, since it is possible to let the second lens unit have a large zooming effect, it is possible to reduce a zooming load on the other lens units.

Accordingly, it is possible to suppress an amount of movement at the time of zooming in a lens unit (hereinafter, referred to as 'third predetermined lens unit') which includes the second lens unit and a lens unit positioned on the image side of the second lens unit. Consequently, it is possible to make small a space in which the third predetermined lens unit moves. As a result, it is possible to shorten the overall length of the optical system.

By falling below an upper limit value of conditional expression (47), it is possible to make the zoom ratio of the second lens unit small with respect to the zoom ratio of the overall variable magnification optical system. In this case, since it is possible to suppress the zooming load of the second lens unit, it is possible to suppress an increase in an amount of movement of the second lens unit from the wide angle end up to the telephoto end.

Accordingly, it is possible to suppress a fluctuation in an aberration that occur in the second lens unit near the wide angle end, particularly, a fluctuation in the distortion, a fluctuation in the astigmatism, and a fluctuation in the chromatic aberration of magnification. As a result, it is possible to carry out zooming while a favorable imaging performance is maintained.

It is more preferable that the following conditional expression (47') be satisfied instead of conditional expression (47).

$$0.85 < (\beta 2t/\beta 2w)/(ft/fw) < 1.50 \qquad (47')$$

Moreover, it is even more preferable that the following conditional expression (47") be satisfied instead of conditional expression (47).

$$0.90 < (\beta 2t/\beta 2w)/(ft/fw) < 1.45 \qquad (47'')$$

In the variable magnification optical system of the first embodiment, it is preferable that the following conditional expression (48) be satisfied:

$$1.30 < |fG2/fw| < 2.00 \qquad (48)$$

where, fG2 denotes the focal length of the second lens unit, and fw denotes the focal length of the overall variable magnification optical system at the wide angle end.

Conditional expression (48) is a conditional expression related to a ratio of the focal length of the second lens unit and the focal length of the overall variable magnification optical system at the wide angle end.

By exceeding a lower limit value of conditional expression (48), it is possible to make the focal length of the second lens unit long with respect to the focal length of the overall variable magnification optical system at the wide angle end, or to make the refractive power of the second lens unit small. In this case, it is possible to suppress an aberration that occur in the second lens unit at the wide angle end, particularly, the distortion, the astigmatism, and the chromatic aberration of magnification. As a result, it is possible to maintain a favorable imaging performance.

By falling below an upper limit value of conditional expression (48), it is possible to make the focal length of the second lens unit short with respect to the focal length of the overall variable magnification optical system at the wide angle end, or in other words, to make the refractive power of the second lens unit large. In this case, it is possible to position the entrance-pupil at the wide angle end, on the object side. As a result, it is possible to make the front-lens diameter small-sized.

It is more preferable that the following conditional expression (48') be satisfied instead of conditional expression (48).

$$1.35 < |fG2/fw| < 1.90 \qquad (48')$$

Moreover, it is even more preferable that the following conditional expression (48") be satisfied instead of conditional expression (48).

$$1.40 < |fG2/fw| < 1.85 \qquad (48'')$$

In the variable magnification optical system of the first embodiment, it is preferable that the following conditional expression (49) be satisfied:

$$0.015 < |fG2/ft| < 0.070 \qquad (49)$$

where, fG2 denotes the focal length of the second lens unit, and ft denotes the focal length of the overall variable magnification optical system at the telephoto end.

Conditional expression (49) is a conditional expression related to a ratio of the focal length of the second lens unit and the focal length of the variable magnification optical system at the telephoto end.

By exceeding a lower limit value of conditional expression (49), it is possible to make the focal length of the second lens unit long with respect to the focal length of the variable magnification optical system at the telephoto end, or in other words, to make the refractive power of the second lens unit small. In this case, it is possible to suppress an occurrence of the astigmatism near the telephoto end. As a result, it is possible to maintain a favorable imaging performance.

With the positive refractive power of the first lens unit and the negative refractive power of the second lens unit, an effect peculiar to a telephoto optical system (hereinafter, referred to as 'telephoto effect') is achieved.

By falling below an upper limit value of conditional expression (49), it is possible to make the focal length of the second lens unit short with respect to the focal length of the overall variable magnification optical system at the telephoto end, or in other words, to make the refractive power of the second lens unit large. Consequently, it is possible to enhance the telephoto effect. As a result, it is possible to shorten the overall length of the optical system.

It is more preferable that the following conditional expression (49') be satisfied instead of conditional expression (49).

$$0.020 < |fG2/ft| < 0.060 \tag{49'}$$

Moreover, it is even more preferable that the following conditional expression (49") be satisfied instead of conditional expression (49).

$$0.025 < |fG2/ft| < 0.055 \tag{49''}$$

In the variable magnification optical system of the first embodiment, it is preferable that the second lens unit include an object-side lens element which is positioned nearest to object, and the following conditional expression (50) be satisfied:

$$0.90 < fG2L1/fG2 < 2.00 \tag{50}$$

where, fG2L1 denotes a focal length of the object-side lens element in the second lens unit, and fG2 denotes the focal length of the second lens unit. Conditional expression (50) is a conditional expression related to a ratio of the focal length of the second lens unit and the focal length of the object-side lens element in the second lens unit (hereinafter, referred to as 'object-side lens element LG2o'). The object-side lens element LG2o is a lens element positioned nearest to object, in the second lens unit.

The object-side lens element LG2o is farthest from the aperture stop, in the second lens unit. At a position of the object-side lens element LG2o, a height of an off-axis light ray is high. Consequently, the astigmatism, the distortion, and the chromatic aberration of magnification are susceptible to occur in the object-side lens element LG2o.

By exceeding a lower limit value of conditional expression (50), it is possible to make the focal length of the object-side lens element LG2o long with respect to the focal length of the second lens unit, or in other words, to make a refractive power of the object-side lens element small. Consequently, it is possible to suppress the astigmatism, the distortion, and the chromatic aberration of magnification that occur in the object-side lens element LG2o.

By falling below an upper limit value of conditional expression (50), it is possible to make the focal length of the object-side lens element LG2o short with respect to the focal length of the second lens unit, or in other words, to make the refractive power of the object-side lens element LG2o large. In this case, it is possible to position an entrance-pupil at the wide angle end, on the object side. As a result, it is possible to make the front-lens diameter small-sized.

It is more preferable that the following conditional expression (50') be satisfied instead of conditional expression (50).

$$1.10 < fG2L1/fG2 < 1.90 \tag{50'}$$

Moreover, it is more preferable that the following conditional expression (50") be satisfied instead of conditional expression (50).

$$1.15 < fG2L1/fG2 < 1.80 \tag{50''}$$

In the variable magnification optical system of the first embodiment, it is preferable that the following conditional expression (51) be satisfied:

$$0.100 < |\beta 2w| < 0.250 \tag{51}$$

where,

β2w denotes the lateral magnification of the second lens unit at the time of infinite object point focusing, at the wide angle end.

Conditional expression (51) is a conditional expression related to the lateral magnification of the second lens unit at the time of infinite object point focusing at the wide angle end.

By exceeding a lower limit value of conditional expression (51), it is possible to suppress an increase in the refractive power of the second lens unit. As a result, it is possible to suppress the chromatic aberration of magnification that occurs in the second lens unit. By falling below an upper limit value of conditional expression (51), it is possible to position the entrance-pupil at the wide angle end, on the object side. As a result, it is possible to make the front-lens diameter small-sized.

It is more preferable that the following conditional expression (51') be satisfied instead of conditional expression (51).

$$0.120 < |\beta 2w| < 0.200 \tag{51'}$$

Moreover, it is even more preferable that the following conditional expression (51") be satisfied instead of conditional expression (51).

$$0.130 < |\beta 2w| < 0.185 \tag{51''}$$

In the variable magnification optical system of the first embodiment, it is preferable that the following conditional expression (52) be satisfied:

$$3.0 < |\beta 2t| < 20 \tag{52}$$

where,

β2t denotes the lateral magnification of the second lens unit at the time of infinite object point focusing, at the telephoto end.

Conditional expression (52) is a conditional expression related to the lateral magnification of the second lens unit at the time of infinite object point focusing at the telephoto end.

By exceeding a lower limit value of conditional expression (52), since it is possible to let the second lens unit have a large zooming effect, it is possible to reduce the zooming load on other lens units. Accordingly, it is possible to suppress an amount of movement at the time of zooming, of the third predetermined lens unit. Consequently, it is possible to make small the space in which the third predetermined lens unit moves. As a result, it is possible to shorten the overall length of the optical system.

By falling below an upper limit value of conditional expression (52), it is possible to suppress an outspreading of aberration occurred in the first lens unit, in the second lens unit.

It is more preferable that the following conditional expression (52') be satisfied instead of conditional expression (52).

$$4.0 < |\beta 2t| < 15 \tag{52'}$$

Moreover, it is even more preferable that the following conditional expression (52″) be satisfied instead of conditional expression (52).

$$5.0<|\beta 2t|<12 \qquad (52″)$$

In the variable magnification optical system of the first embodiment, it is preferable that the second lens unit include four lens elements, and the four lens elements include in order from the object side, a negative lens element, a negative lens element, a positive lens element, and a negative lens element.

By disposing three negative lens elements in the second lens unit, it is possible carry out correction of the astigmatism and correction of the distortion upon letting to be shared by the negative lens elements, while making the focal length of the second lens unit short, or in other words, while making the refractive power of the second lens unit large. Consequently, it is possible to maintain a favorable imaging performance while making the front-lens diameter small-sized.

Moreover, by disposing one positive lens element in the second lens unit, it is possible to suppress the chromatic aberration of magnification that occurs in the second lens unit on the wide angle end side.

In the variable magnification optical system of the first embodiment, it is preferable that an image-side lens unit include the third lens unit, and a lens unit positioned on an image side of the third lens unit, and the following conditional expression (53) be satisfied:

$$0<(\beta Lt/\beta Lw)/(ft/fw)<0.10 \qquad (53)$$

where,

βLt denotes a lateral magnification of the image-side lens unit at the time of infinite object point focusing, at the telephoto end, βLw denotes a lateral magnification of the image-side lens unit at the time of infinite object point focusing, at the wide angle end, ft denotes the focal length of the overall variable magnification optical system at the telephoto end, and fw denotes the focal length of the overall variable magnification optical system at the wide angle end.

Conditional expression (53) is a conditional expression related to a zoom ratio of the image-side lens unit with respect to the zoom ratio of the variable magnification optical system.

By exceeding a lower limit value of conditional expression (53), it is possible to make the zoom ratio of the image-side lens unit large with respect to the zoom ratio of the overall variable magnification optical system. In this case, since it is possible to let the image-side lens unit to have a large zooming effect, it is possible to reduce the zooming load on the other lens units.

Accordingly, it is possible to suppress an amount of movement at the time of zooming in the other lens units. Consequently, it is possible to make small a space in which the other lens units move. As a result, it is possible to shorten the overall length of the optical system.

By falling below an upper limit value of conditional expression (53), it is possible to make the zoom ratio of the image-side lens unit small with respect to the zoom ratio of the overall variable magnification optical system. In this case, since it is possible to suppress the zooming load on the image-side lens unit, it is possible to suppress an increase in the amount of movement of the image-side lens unit from the wide angle end up to the telephoto end.

Accordingly, it is possible to suppress a fluctuation in an aberration, particularly, a fluctuation in the spherical aberration in the image-side lens unit at the time of zooming, a fluctuation in the astigmatism, and a fluctuation in the chromatic aberration of magnification.

It is more preferable that the following conditional expression (53′) be satisfied instead of conditional expression (53).

$$0.010<(\beta Lt/\beta Lw)/(ft/fw)<0.050 \qquad (53′)$$

Moreover, it is even more preferable that the following conditional expression (53″) be satisfied instead of conditional expression (53).

$$0.013<(\beta Lt/\beta Lw)/(ft/fw)<0.035 \qquad (53″)$$

In the variable magnification optical system of the first embodiment, it is preferable that the following conditional expression (54) be satisfied:

$$0.001<(\beta 3t/\beta 3w)/(ft/fw)<0.80 \qquad (54)$$

where,

β3t denotes a lateral magnification of the third lens unit at the time of infinite object point focusing, at the telephoto end, β3w denotes a lateral magnification of the third lens unit at the time of infinite object point focusing, at the wide angle end, ft denotes the focal length of the overall variable magnification optical system at the telephoto end, and fw denotes the focal length of the overall variable magnification optical system at the wide angle end.

Conditional expression (54) is a conditional expression related to a zoom ratio of the third lens unit with respect to the zoom ratio of the overall variable magnification optical system.

By exceeding a lower limit value of conditional expression (54), it is possible to make the zoom ratio of the third lens unit large with respect to the zoom ratio of the overall variable magnification optical system. In this case, since it is possible to let the third lens unit to have a large zooming effect, it is possible to reduce the zooming load on the other lens units.

Accordingly, it is possible to suppress an amount of movement at the time of zooming in the other lens units. Consequently, it is possible to make small a space in which the other lens units move. As a result, it is possible to shorten the overall length of the optical system.

By falling below an upper limit value of conditional expression (54), it is possible to make the zoom ratio of the third lens unit small with respect to the zoom ratio of the overall variable magnification optical system. In this case, since it is possible to suppress the zooming load on the third lens unit, it is possible to suppress an increase in the amount of movement of the third lens unit from the wide angle end up to the telephoto end. Accordingly, it is possible to suppress a fluctuation in the spherical aberration that occurs in the third lens unit at the time of zooming.

It is more preferable that the following conditional expression (54′) be satisfied instead of conditional expression (54).

$$0.002<(\beta 3t/\beta 3w)/(ft/fw)<0.050 \qquad (54′)$$

Moreover, it is even more preferable that the following conditional expression (54″) be satisfied instead of conditional expression (54).

$$0.004<(\beta 3t/\beta 3w)/(ft/fw)<0.040 \qquad (54″)$$

In the variable magnification optical system of the first embodiment, it is preferable that the following conditional expression (55) be satisfied:

$$2.5 < fG3/fw < 11.0 \quad (55)$$

where, fG3 denotes a focal length of the third lens unit, and fw denotes the focal length of the overall variable magnification optical system at the wide angle end.

Conditional expression (55) is a conditional expression related to a ratio of the focal length of the third lens unit and the focal length of the overall variable magnification optical system at the wide angle end.

By exceeding a lower limit value of conditional expression (55), it is possible to make the focal length of the third lens unit long with respect to the focal length of the overall variable magnification optical system at the wide angle end, or in other words, to make the refractive power of the third lens unit small. In this case, it is possible to suppress the spherical aberration that occurs in the third lens unit at the wide angle end. As a result, it is possible to maintain a favorable imaging performance.

By falling below an upper limit value of conditional expression (55), it is possible to make the focal length of the third lens unit short with respect to the focal length of the overall variable magnification optical system at the wide angle end, or in other words, to make the refractive power of the third lens unit large. As a result, it is possible to shorten the overall length of the image-side lens unit.

It is more preferable that the following conditional expression (55') be satisfied instead of conditional expression (55).

$$3.0 < fG3/fw < 10.0 \quad (55')$$

Moreover, it is even more preferable that the following conditional expression (55") be satisfied instead of conditional expression (55).

$$3.5 < fG3/fw < 9.5 \quad (55'')$$

In the variable magnification optical system of the first embodiment, it is preferable that the following conditional expression (56) be satisfied:

$$0.040 < fG3/ft < 0.40 \quad (56)$$

where, fG3 denotes the focal length of the third lens unit, and ft denotes the focal length of the overall variable magnification optical system at the telephoto end.

Conditional expression (56) is a conditional expression related to a ratio of the focal length of the third lens unit and the focal length of the overall variable magnification optical system at the telephoto end.

By exceeding a lower limit value of conditional expression (56), it is possible to make the focal length of the third lens unit long with respect to the focal length of the overall variable magnification optical system at the telephoto end, or in other words, to make the refractive power of the third lens unit small. In this case, it is possible to suppress the spherical aberration that occurs in the third lens unit at the telephoto end. As a result, it is possible to maintain a favorable imaging performance.

By falling below an upper limit value of conditional expression (56), it is possible to make the focal length of the third lens unit short with respect to the focal length of the overall variable magnification optical system at the telephoto end, or in other words, to make the refractive power of the third lens unit large. As a result, it is possible to shorten the overall length of the image-side lens unit.

It is more preferable that the following conditional expression (56') be satisfied instead of conditional expression (56).

$$0.060 < fG3/ft < 0.30 \quad (56')$$

Moreover, it is even more preferable that the following conditional expression (56") be satisfied instead of conditional expression (56).

$$0.065 < fG3/ft < 0.27 \quad (56'')$$

In the variable magnification optical system of the first embodiment, it is preferable that the following conditional expression (57) be satisfied:

$$2.0 < |fG3/fG2| < 6.0 \quad (57)$$

where, fG2 denotes the focal length of the second lens unit, and fG3 denotes the focal length of the third lens unit.

Conditional expression (57) is a conditional expression related to a ratio of the focal length of the second lens unit and the focal length of the third lens unit.

By exceeding a lower limit value of conditional expression (57), it is possible to make the focal length of the third lens unit long with respect to the focal length of the second lens unit, or in other words, to make the refractive power of the third lens unit small. In this case, it is possible to suppress the spherical aberration that occurs in the third lens unit. As a result, it is possible to maintain a favorable imaging performance.

By falling below an upper limit value of conditional expression (57), it is possible to make the focal length of the third lens unit short with respect to the focal length of the second lens unit, or in other words, to make the refractive power of the third lens unit large. As a result, it is possible to shorten the overall length of the image-side lens unit.

It is more preferable that the following conditional expression (57') be satisfied instead of conditional expression (57).

$$2.40 < |fG3/fG2| < 5.7 \quad (57')$$

It is even more preferable that the following conditional expression (57") be satisfied instead of conditional expression (57).

$$2.50 < |fG3/fG2| < 5.5 \quad (57'')$$

In the variable magnification optical system of the first embodiment, it is preferable that the third lens unit include an object-side lens element which is positioned nearest to object, and the following conditional expression (58) be satisfied:

$$0.40 < fG3L1/fG3 < 1.60 \quad (58)$$

where, fG3L1 denotes a focal length of the object-side lens element in the third lens unit, and fG3 denotes the focal length of the third lens unit.

Conditional expression (58) is a conditional expression related to a ratio of the focal length of the third lens unit and the focal length of the object-side lens element in the third lens unit (hereinafter, referred to as 'object-side lens element LG3o').

By exceeding a lower limit value of conditional expression (58), it is possible to make the focal length of the object-side lens element LG3o long with respect to the focal length of the third lens unit, or in other words, to make a refractive power of the object-side lens element LG3o small.

Consequently, it is possible to suppress the spherical aberration that occurs in the object-side lens element LG3o. As a result, it is possible to maintain a favorable imaging performance.

By falling below an upper limit value of conditional expression (58), it is possible to make the focal length of the object-side lens element LG3o short with respect to the focal length of the third lens unit, or in other words, to make the refractive power of the object-side lens element large.

In this case, it is possible to position a front principal point of the third lens unit further on the object side. In other words, it is possible to bring the front principal point closer to a rear principal point of the second lens unit. Consequently, it is possible to secure a high zoom ratio while securing a distance necessary for holding mechanically the second lens unit and the third lens unit.

It is more preferable that the following conditional expression (58') be satisfied instead of conditional expression (58).

$$0.50 < fG3L1/fG3 < 1.50 \tag{58'}$$

Moreover, it is even more preferable that the following conditional expression (58") be satisfied instead of conditional expression (58).

$$0.55 < fG3L1/fG3 < 1.35 \tag{58"}$$

In the variable magnification optical system of the first embodiment, it is preferable that the third lens unit include a negative lens element, and an object-side lens element which is positioned nearest to object, and the object-side lens element have a positive refractive power, and the following conditional expression (59) be satisfied:

$$0.50 < |fG3n/fG3L1| < 3.0 \tag{59}$$

where, fG3L1 denotes the focal length of the object-side lens element in the third lens unit, and fG3n denotes a focal length of the negative lens element in the third lens unit.

Conditional expression (59) is a conditional expression related to the focal length of the object-side lens element LG3o and the focal length of the negative lens element in the third lens unit. In a case of having a plurality of negative lens elements, fG3n is a focal length of an arbitrary negative lens element.

By exceeding a lower limit value of conditional expression (59), it is possible to make the focal length of the negative lens element long with respect to the focal length of the object-side lens element LG3o, or in other words, to make a refractive power of the negative lens element small. Consequently, it is possible to suppress a coma that occurs in the negative lens near the wide angle end. As a result, it is possible to maintain a favorable imaging performance.

By falling below an upper limit value of conditional expression (59), it is possible to make the focal length of the negative lens element short with respect to the focal length of the object-side lens element LG3o, or in other words, to make the refractive power of the negative lens element large. In this case, it is possible to correct the spherical aberration that has occurred in the object-side lens element LG3o near the wide angle end, in the negative lens. As a result, it is possible to maintain a favorable imaging performance.

It is more preferable that the following conditional expression (59') be satisfied instead of conditional expression (59).

$$0.60 < |fG3n/fG3L1| < 2.0 \tag{59'}$$

Moreover, it is even more preferable that the following conditional expression (59") be satisfied instead of conditional expression (59).

$$0.80 < |fG3n/fG3L1| < 1.5 \tag{59"}$$

In the variable magnification optical system of the first embodiment, it is preferable that the following conditional expressions (60) and (61) be satisfied:

$$70 < vdG3p\max < 100 \tag{60},$$

and $$0.5200 < (\theta g, F)G3p\min < 0.5500 \tag{61}$$

where, vdG3pmax denotes a maximum Abbe number from among Abbe numbers for positive lens elements in the third lens unit, and (θg, F)G3pmin denotes a minimum partial dispersion ratio form among partial dispersion ratio of the positive lens elements in the third lens unit.

Conditional expression (60) is a conditional expression related to Abbe number for the positive lens element in the third lens unit. Conditional expression (61) is a conditional expression related to the partial dispersion ratio of the positive lens element in the third lens unit.

By exceeding a lower limit value of conditional expression (60), it is possible to suppress the chromatic aberration that occurs in the third lens unit. As a result, it is possible to maintain a favorable imaging performance. By falling below an upper limit value of conditional expression (60), it is possible to select a glass material which is manufacturable.

By exceeding a lower limit value of conditional expression (61), it is possible to select a glass material which is manufacturable. By falling below an upper limit value of conditional expression (61), it is possible to suppress the chromatic aberration for the g-line with respect to the F-line that occurs in the third lens unit. As a result, it is possible to maintain a favorable imaging performance.

It is more preferable that the following conditional expression (60') be satisfied instead of conditional expression (60).

$$75 < vdG3p\max < 97 \tag{60'}$$

Moreover, it is even more preferable that the following conditional expression (60") be satisfied instead of conditional expression (60).

$$80 < vdG3p\max < 95 \tag{60"}$$

It is more preferable that the following conditional expression (61') be satisfied instead of conditional expression (61).

$$0.5300 < (\theta g, F)G3p\min < 0.5400 \tag{61'}$$

Moreover, it is even more preferable that the following conditional expression (61") be satisfied instead of conditional expression (61).

$$0.5340 < (\theta g, F)G3p\min < 0.5380 \tag{61"}$$

In the variable magnification optical system of the first embodiment, it is preferable that the third lens unit include in order from the object side, an aperture stop, a positive lens element, a negative lens element, a positive lens element, and a negative lens element.

In the variable magnification optical system of the first embodiment, it is preferable that the third lens unit include in order from the object side, an aperture stop, a positive lens element, a negative lens element, a positive lens element, and a positive lens element.

By disposing the aperture stop nearest to object side of the third lens unit, and integrating the third lens unit and the aperture stop, it is possible to simplify the mechanical arrangement.

The positive lens element (hereinafter, referred to as 'positive lens element LG3p') is disposed immediately adjacent to the aperture stop. By making such arrangement, it is possible to suppress a height of a light ray emerged from the positive lens element LG3p. The negative lens element, the positive lens element, and the negative lens element are disposed on the image side of the positive lens element LG3p. Since it is possible to lower a height of a light ray that passes through these lens elements, it is possible to make small a lens diameter of these lens elements.

By disposing the negative lens element immediately adjacent to the positive lens element LG3p, it is possible to correct the spherical aberration occurred in the positive lens element LG3p.

In the variable magnification optical system of the first embodiment, it is preferable that the third lens unit be fixed at the time of zooming.

By making such arrangement, the third lens unit is in a state of being fixed all the time with respect to an image plane. As a result, it is possible to reduce a manufacturing error and to simplify the mechanical arrangement. Moreover, by keeping the third lens unit fixed at the time of zooming, it is possible to suppress a fluctuation in the spherical aberration that occurs in the third lens unit at the time of zooming.

In the variable magnification optical system of the first embodiment, it is preferable that the third lens unit include a correcting lens unit, and an image be stabilized by moving the correcting lens unit in a direction perpendicular to an optical axis.

By moving a lens or a lens unit in a direction perpendicular to the optical axis, it is possible to correct a movement of an image-forming position which occurs due to motion-blur, or in other words, to stabilize image.

In the variable magnification optical system of the first embodiment, the aperture stop is disposed either between the second lens unit and the third lens unit, or in the third lens unit. In such manner, since the third lens unit is positioned near the aperture stop, the third lens unit becomes a lens unit where a height of an off-axis light ray is low in all zoom areas from the wide angle end up to the telephoto end. For such reason, in the third lens unit, even when a lens is moved in a direction perpendicular to the optical axis, a fluctuation in aberration is small.

Therefore, a lens unit which stabilizes image, or in other words, the correcting lens unit is disposed in the third lens unit. By making such arrangement, it is possible to suppress a fluctuation in an off-axis aberration due to a movement of the correcting lens unit, particularly, a fluctuation in the astigmatism and a fluctuation in the coma. As a result, even at the time of image stabilization, it is possible to maintain a favorable imaging performance.

In the variable magnification optical system of the first embodiment, it is preferable that the fourth lens unit include at least one positive lens element and at least one negative lens element.

By making such arrangement, it is possible to suppress a fluctuation in the longitudinal chromatic aberration, a fluctuation in the chromatic aberration of magnification, and a fluctuation in the astigmatism at the time of zooming.

In the variable magnification optical system of the first embodiment, it is preferable that only the fourth lens unit move at the time of focusing.

By making such arrangement, it is possible to simplify a focusing mechanism. As a result, it is possible to make the focusing mechanism small-sized.

In the variable magnification optical system of the first embodiment, it is preferable that the fifth lens unit include two lens elements, and the two lens elements include a negative lens element and a positive lens element.

By making such arrangement, it is possible to correct the astigmatism that has occurred at the wide angle end side, while small-sizing the fifth lens unit.

In the variable magnification optical system of the first embodiment, it is preferable that the fifth lens unit include in order from the object side, a negative lens element and a positive lens element, and the following conditional expressions (62) and (63) be satisfied:

$$3 < \nu dG5p\max - \nu dG5n\min < 60 \tag{62}$$

and $$0.20 < ndG5n\max - ndG5p\min < 0.45 \tag{63}$$

where, $\nu dG5p\max$ denotes a maximum Abbe number from among Abbe numbers for the positive lens elements in the fifth lens unit, $\nu dG5n\min$ denotes a minimum Abbe number from among Abbe numbers for the negative lens elements in the fifth lens unit, ndG5pmin denotes a minimum refractive index from among refractive indices of the positive lens elements in the fifth lens unit, and ndG5nmax denotes a maximum refractive index from among refractive indices of the negative lens elements in the fifth lens unit.

By exceeding a lower limit value of conditional expression (62), it is possible to make large a difference in Abbe number for the positive lens element and Abbe number for the negative lens element. Consequently, it is possible to correct the longitudinal chromatic aberration and the chromatic aberration of magnification that occur in the fifth lens unit.

By falling below an upper limit value of conditional expression (62), it is possible to prevent a dispersion of the negative lens element from becoming excessively large, or in other words, to prevent Abbe number from becoming excessively small. Moreover, it is possible to prevent a dispersion of the positive lens element from becoming excessively small, or in other words, to prevent Abbe number from becoming excessively large. In this case, it is possible to increase a degree of freedom of selecting a glass material. As a result, it is possible to select a glass material of an appropriate refractive index.

By exceeding a lower limit value of conditional expression (63), it is possible to make the refractive index of the negative lens element larger than the refractive index of the positive lens element. In this case, it is possible to correct the spherical aberration that has occurred in the positive lens element, in the negative lens element. Consequently, it is possible to suppress the spherical aberration that occurs in the fifth lens unit.

By falling below an upper limit value of conditional expression (63), it is possible to make small a difference in the refractive index of the negative lens component and the refractive index of the positive lens component. Consequently, it is possible to suppress a curvature of field that occurs in the fifth lens unit.

It is more preferable that the following conditional expression (62') be satisfied instead of conditional expression (62).

$$5 < vdG5p\max - vdG5n\min < 55 \quad (62')$$

Moreover, it is even more preferable that the following conditional expression (62") be satisfied instead of conditional expression (62).

$$7 < vdG5p\max - vdG5n\min < 50 \quad (62'')$$

It is more preferable that the following conditional expression (63') be satisfied instead of conditional expression (63).

$$0.24 < ndG5n\max - ndG5p\min < 0.44 \quad (63')$$

Moreover, it is even more preferable that the following conditional expression (63") be satisfied instead of conditional expression (63).

$$0.26 < ndG5n\max - ndG5p\min < 0.43 \quad (63'')$$

In the variable magnification optical system of the first embodiment, it is preferable that lens units positioned on an image side of the aperture stop include a fourth lens unit having a positive refractive power, and a fifth lens unit.

By making such arrangement, it is possible to shorten a total length from the fourth lens unit up to the fifth lens unit.

Moreover, a refractive power of the fifth lens unit may be a positive refractive power or may be a negative refractive power. By disposing the fifth lens unit, it is possible to correct more favorably, the astigmatism and the chromatic aberration of magnification that has occurred from the first lens unit up to the fourth lens unit.

In the variable magnification optical system of the first embodiment, it is preferable that the following conditional expression (64A) be satisfied:

$$3.5 < fG4/fw < 7.0 \quad (64A)$$

where, fG4 denotes a focal length of the fourth lens unit, and fw denotes the focal length of the overall variable magnification optical system at the wide angle end.

Conditional expression (64A) is a conditional expression related to a ratio of the focal length of the fourth lens unit and the focal length of the overall variable magnification optical system at the wide angle end.

By exceeding a lower limit value of conditional expression (64A), it is possible to make the focal length of the fourth lens unit long with respect to the focal length of the overall variable magnification optical system at the wide angle end, or in other words, to make the refractive power of the fourth lens unit small. As a result, it is possible to suppress the astigmatism that occurs in the fourth lens unit.

By falling below an upper limit value of conditional expression (64A), it is possible to make the focal length of the fourth lens unit short with respect to the focal length of the overall variable magnification optical system at the wide angle end, or in other words, to make the refractive power of the fourth lens unit large. As a result, it is possible to shorten a predetermined total length. The predetermined total length is an overall length of lens units including the fourth lens unit and lens units positioned on the image side of the fourth lens unit.

It is more preferable that the following conditional expression (64A') be satisfied instead of conditional expression (64A).

$$4.0 < fG4/fw < 6.5 \quad (64A')$$

Moreover, it is even more preferable that the following conditional expression (64A") be satisfied instead of conditional expression (64A).

$$4.3 < fG4/fw < 6.0 \quad (64A'')$$

In the variable magnification optical system of the first embodiment, it is preferable that the following conditional expression (65A) be satisfied:

$$0.060 < fG4/ft < 0.250 \quad (65A)$$

where, fG4 denotes the focal length of the fourth lens unit, and ft denotes the focal length of the overall variable magnification optical system at the telephoto end.

Conditional expression (65A) is a conditional expression related to a ratio of the focal length of the fourth lens unit and the focal length of the overall variable magnification optical system at the telephoto end.

By exceeding a lower limit value of conditional expression (65A), it is possible to make the focal length of the fourth lens unit long with respect to the focal length of the overall variable magnification optical system at the telephoto end, or in other words, to make the refractive power of the fourth lens unit small. As a result, it is possible to suppress the astigmatism that occurs in the fourth lens unit.

By falling below an upper limit value of conditional expression (65A), it is possible to make the focal length of the fourth lens unit short with respect to the focal length of the overall variable magnification optical system at the telephoto end, or in other words, to make the refractive power of the fourth lens unit large. As a result, it is possible to shorten the predetermined total length.

It is more preferable that the following conditional expression (65A') be satisfied instead of conditional expression (65A).

$$0.070 < fG4/ft < 0.200 \quad (65A')$$

Moreover, it is even more preferable that the following conditional expression (65A") be satisfied instead of conditional expression (65A).

$$0.080 < fG4/ft < 0.170 \quad (65A'')$$

In the variable magnification optical system of the first embodiment, it is preferable that the following conditional expression (66) be satisfied:

$$1 \neq \beta 4z/\beta 4w \quad (66)$$

where, $\beta 4z$ denotes a lateral magnification of the fourth lens unit at the time of infinite object point focusing in a predetermined state, $\beta 4w$ denotes a lateral magnification of the fourth lens unit at the time of infinite object point focusing, at the wide angle end, and the predetermined state is a state in which the fourth lens unit is positioned nearest to object, at the time of zooming.

At the wide angle end side, the distortion, the astigmatism, and the chromatic aberration of magnification occur in the first lens unit and the second lens unit. A lens unit positioned of on the image side of the aperture stop, such as the fourth lens unit, is to be moved at the time of zooming. By making such arrangement, it is possible to correct the abovementioned aberrations that have occurred in the first lens unit and the second lens unit, in the fourth lens unit.

Even in a case in which the refractive power of the fourth lens unit is a negative refractive power as described later, it is preferable to satisfy conditional expression (66). Even in this case, it is possible to achieve the abovementioned action and effect.

In the variable magnification optical system of the first embodiment, it is preferable that lens units positioned on the image side of the aperture stop include a movable lens unit, and the movable lens unit move from the image side to the object side at the time of start of zooming from the wide angle end, and move from the object side to the image side from an arbitrary intermediate state up to the telephoto end.

By making such arrangement, the space for movement is made more efficient as compared to a case in which the lens unit is moved in one direction. Consequently, it is possible to shorten the overall length of the optical system.

In the variable magnification optical system of the first embodiment, it is preferable that the following conditional expressions (67) and (68) be satisfied:

$$75 < vdG4pmax < 100 \quad (67),$$

and $$0.5200 < (\theta g, F)G4pmin < 0.5500 \quad (68)$$

where, vdG4pmax denotes a maximum Abbe number from among Abbe numbers for positive lens elements in the fourth lens unit, and $(\theta g, F)G4pmin$ denotes a minimum partial dispersion ratio from among the partial dispersion ratio of the positive lens elements in the fourth lens unit.

Conditional expression (67) is a conditional expression related to Abbe number for the positive lens element in the fourth lens unit. Conditional expression (68) is a conditional expression related to the partial dispersion of the positive lens element in the fourth lens unit.

By exceeding a lower limit value of conditional expression (67), it is possible to suppress the chromatic aberration that occurs in the fourth lens unit. As a result, it is possible to maintain a favorable imaging performance. By falling below an upper limit value of conditional expression (67), it is possible to select a glass material which is manufacturable.

By exceeding a lower limit value of conditional expression (68), it is possible to select a glass material which is manufacturable. By falling below an upper limit value of conditional expression (68), it is possible to suppress the chromatic aberration for the g-line with respect to the F-line which occurs in the fourth lens unit. As a result, it is possible to maintain a favorable imaging performance.

It is more preferable that the following conditional expression (67') be satisfied instead of conditional expression (67).

$$80 < vdG4pmax < 97 \quad (67')$$

Moreover, it is even more preferable that the following conditional expression (67") be satisfied instead of conditional expression (67).

$$90 < vdG4pmax < 95 \quad (67")$$

It is more preferable that the following conditional expression (68') be satisfied instead of conditional expression (68).

$$0.5300 < (\theta g, F)G4pmin < 0.5400 \quad (68')$$

Moreover, it is even more preferable that the following conditional expression (68") be satisfied instead of conditional expression (68).

$$0.5335 < (\theta g, F)G4pmin < 0.5345 \quad (68")$$

It is preferable that the variable magnification optical system of the first embodiment include a focusing unit on an image side of the second lens unit, and the following conditional expression (69A) be satisfied:

$$0.70 < |FSw| < 1.20 \quad (69A)$$

where, $FSw = (1 - \beta fow \times (\beta fow) \times \beta imgw \times \beta imgw$, $\beta fow$ denotes a lateral magnification of the focusing unit at the wide angle end, $\beta imgw$ denotes a lateral magnification of a predetermined optical system at the wide angle end, and the predetermined optical system is an optical system which includes all lens units positioned on the image side of the focusing unit.

Conditional expression (69A) is a conditional expression related to a focusing sensitivity at the wide angle end. The focusing sensitivity indicates an amount of movement of image plane with respect to an amount of movement of the focusing unit on the optical axis.

BY exceeding a lower limit value of conditional expression (69A), it is possible to suppress the amount of movement of the focusing unit at the time of focusing. As a result, it is possible to suppress a fluctuation in the astigmatism at the time of focusing. Moreover, since it is possible to suppress the amount of movement of the focusing unit, it is possible to make small a space in which the focusing unit moves. As a result, it is possible to make the optical system small-sized.

By falling below an upper limit value of conditional expression (69A), it is possible to suppress the astigmatism that occurs in the focusing unit.

It is more preferable that the following conditional expression (69A') be satisfied instead of conditional expression (69A).

$$0.80 < |FSw| < 1.05 \quad (69A')$$

Moreover, it is even more preferable that the following conditional expression (69A") be satisfied instead of conditional expression (69A).

$$0.85 < |FSw| < 1.00 \quad (69A")$$

It is preferable that the variable magnification optical system of the first embodiment include a focusing unit on an image side of the second lens unit, and the following conditional expression (70A) be satisfied:

$$0.50 < |FSt| < 1.20 \quad (70A)$$

where, $FSt = (1 - \beta fot \times (\beta fot) \times \beta imgt \times \beta imgt$, $\beta fot$ denotes a lateral magnification of the focusing unit at the telephoto end, $\beta imgt$ denotes a lateral magnification of a predetermined optical system at the telephoto end, and the predetermined optical system is an optical system which includes all lens units positioned on the image side of the focusing unit.

Conditional expression (70A) is a conditional expression related to a focusing sensitivity at the telephoto end. Technical significance of conditional expression (70A) is same as the technical significance of conditional expression (69A).

It is more preferable that the following conditional expression (70A') be satisfied instead of conditional expression (70A).

$$0.65 < |FSt| < 1.00 \quad (70A')$$

Moreover, it is even more preferable that the following conditional expression (70A") be satisfied instead of conditional expression (70A).

$$0.70 < |FSt| < 0.950 \quad (70A'')$$

In the variable magnification optical system of the first embodiment, it is preferable that the fifth lens unit be fixed at the time of zooming, and the following conditional expression (71A) be satisfied:

$$0.80 < \beta G5 < 1.2 \quad (71A)$$

where,

βG5 denotes a lateral magnification of the fifth lens unit at the time of infinite object point focusing in an arbitrary zoom state.

Conditional expression (71A) is the lateral magnification of the fifth lens unit at the time of infinite object point focusing in the arbitrary zoom state. The arbitrary zoom state is an arbitrary state between the wide angle end and the telephoto end.

By exceeding a lower limit value of conditional expression (71A), it is possible to keep an image point of the fifth lens unit same as an object-point direction of the fifth lens unit. In this case, it is possible to reduce a change in a position of image forming by the fifth lens unit. As a result, it is possible to suppress the spherical aberration that occurs in the fifth lens unit.

The meaning of to keep the image point of the fifth lens unit same as the object-point direction of the fifth lens unit is as follows. The fifth lens unit is let to be a reference for example. It is assumed that an image point formed by a lens unit from the first lens unit up to the fourth lens unit is positioned on a left side (object side) of the fifth lens unit. In this state, a fact that the image point of the fifth lens unit also is positioned on the left side (object side) of the fifth lens unit is same as the image point of the fifth lens unit is same as the object-point direction of the fifth lens unit.

The object point of the fifth lens unit is an image point for all lens units positioned on the object side of the fifth lens unit.

By falling below an upper limit value of conditional expression (71A), there is no outspreading of an aberration that has occurred in all the lens units positioned on the object side of the fifth lens unit. Consequently, it is possible to maintain a favorable imaging performance.

It is more preferable that the following conditional expression (71A') be satisfied instead of conditional expression (71A).

$$0.90 < \beta G5 < 1.1 \quad (71A')$$

Moreover, it is even more preferable that the following conditional expression (71A") be satisfied instead of conditional expression (71A).

$$0.95 < \beta G5 < 1.05 \quad (71A'')$$

In the variable magnification optical system of the first embodiment, it is preferable that lens units positioned on the image side of the aperture stop include a fourth lens unit having a negative refractive power, and a fifth lens unit.

By making such arrangement, it is possible to correct the chromatic aberration of magnification and the astigmatism occurred in the second lens unit.

Moreover, a refractive power of the fifth lens unit may be a positive refractive power or may be a negative refractive power. By disposing the fifth lens unit, it is possible to correct more favorably, the astigmatism and the chromatic aberration of magnification that have occurred from the first lens unit up to the fourth lens unit.

In the variable magnification optical system of the first embodiment, it is preferable that the following conditional expression (64B) be satisfied:

$$2.0 < |fG4/fw| < 4.0 \quad (64B)$$

where, fG4 denotes a focal length of the fourth lens unit, and fw denotes the focal length of the overall variable magnification optical system at the wide angle end.

Conditional expression (64B) is a conditional expression related to a ratio of the focal length of the fourth lens unit and the focal length of the overall variable magnification optical system at the wide angle end.

By exceeding a lower limit value of conditional expression (64B), it is possible to make the focal length of the fourth lens unit long with respect to the focal length of the overall variable magnification optical system at the wide angle end, or in other words, to make the refractive power of the fourth lens unit small. As a result, it is possible to suppress the astigmatism that occurs in the fourth lens unit.

By falling below an upper limit value of conditional expression (64B), it is possible to make the focal length of the fourth lens unit short with respect to the focal length of the overall variable magnification optical system at the wide angle end, or in other words, to make the refractive power of the fourth lens unit large. As a result, it is possible to correct the spherical aberration that has occurred in the third lens unit.

It is more preferable that the following conditional expression (64B') be satisfied instead of conditional expression (64B).

$$2.5 < |fG4/fw| < 3.80 \quad (64B')$$

Moreover, it is even more preferable that the following conditional expression (64B") be satisfied instead of conditional expression (64B).

$$2.70 < |fG4/fw| < 3.50 \quad (64B'')$$

In the variable magnification optical system of the first embodiment, it is preferable that the following conditional expression (65B) be satisfied:

$$0.040 < |fG4/ft| < 0.110 \quad (65B)$$

where, fG4 denotes the focal length of the fourth lens unit, and ft denotes the focal length of the overall variable magnification optical system at the telephoto end.

Conditional expression (65B) is a conditional expression related to a ratio of the focal length of the fourth lens unit and the focal length of the overall variable magnification optical system at the telephoto end.

By exceeding a lower limit value of conditional expression (65B), it is possible to make the focal length of the fourth lens unit long with respect to the focal length of the overall variable magnification optical system at the telephoto end, or in other words, to make the refractive power of the fourth lens unit small. As a result, it is possible to suppress the astigmatism that occurs in the fourth lens unit.

By falling below an upper limit value of conditional expression (65B), it is possible to make the focal length of the fourth lens unit short with respect to the focal length of the overall variable magnification optical system at the telephoto end, or in other words, to make the refractive power of the fourth lens unit large. As a result, it is possible to correct the spherical aberration that has occurred in the third lens unit.

It is more preferable that the following conditional expression (65B') be satisfied instead of conditional expression (65B).

$$0.045<|fG4/ft|<0.10 \quad (65B')$$

Moreover, it is even more preferable that the following conditional expression (65B") be satisfied instead of conditional expression (65B).

$$0.050<|fG4/ft|<0.090 \quad (65B'')$$

In the variable magnification optical system of the first embodiment, it is preferable that lens units positioned on the image side of the aperture stop include a movable lens unit, and the movable lens unit move from the object side to the image side at the time of start of zooming from the wide angle end, and move from the image side to the object side from an arbitrary intermediate state up to the telephoto end.

By making such arrangement, the space for movement is made more efficient as compared to a case in which the lens unit is moved in one direction. Consequently, it is possible to shorten the overall length of the optical system.

In the variable magnification optical system of the first embodiment, it is preferable that the following conditional expressions (72) and (73) be satisfied:

$$45<vdG4nmax<70 \quad (72),$$

and $$0.5200<(\theta g,F)G4nmin<0.570 \quad (73)$$

where, vdG4nmax denotes a maximum Abbe number from among Abbe numbers for negative lens elements in the fourth lens unit, and $(\theta g, F)G4nmin$ denotes a minimum partial dispersion ratio from among the partial dispersion ratio of the negative lens elements in the fourth lens unit.

Conditional expression (72) is a conditional expression related to Abbe number for the negative lens element in the fourth lens unit. Conditional expression (73) is a conditional expression related to the partial dispersion of the negative lens element in the fourth lens unit.

Technical significance of conditional expression (72) is same as the technical significance of conditional expression (67). Technical significance of conditional expression (73) is same as the technical significance of conditional expression (68)

It is more preferable that the following conditional expression (72') be satisfied instead of conditional expression (72).

$$50<vdG4nmax<67 \quad (72')$$

Moreover, it is even more preferable that the following conditional expression (72") be satisfied instead of conditional expression (72).

$$55<vdG4nmax<66 \quad (72'')$$

It is more preferable that the following conditional expression (73') be satisfied instead of conditional expression (73).

$$0.530<(\theta g,F)G4nmin<0.560 \quad (73')$$

Moreover, it is even more preferable that the following conditional expression (73") be satisfied instead of conditional expression (73).

$$0.540<(\theta g,F)G4nmin<0.550 \quad (73'')$$

It is preferable that the variable magnification optical system of the first embodiment include a focusing unit on an image side of the second lens unit, and the following conditional expression (69B) be satisfied:

$$1.5<|FSw|<3.5 \quad (69B)$$

where, $FSw=(1-\beta fow\times(\beta fow)\times\beta imgw\times\beta imgw$,

βfow denotes a lateral magnification of the focusing unit at the wide angle end, βimgw denotes a lateral magnification of a predetermined optical system at the wide angle end, and the predetermined optical system is an optical system which includes all lens units positioned on the image side of the focusing unit.

Conditional expression (69B) is a conditional expression related to a focusing sensitivity at the wide angle end. Technical significance of conditional expression (69B) is same as the technical significance of conditional expression (69A).

It is more preferable that the following conditional expression (69B') be satisfied instead of conditional expression (69B).

$$1.70<|FSw|<3.0 \quad (69B')$$

Moreover, it is even more preferable that the following conditional expression (69B") be satisfied instead of conditional expression (69B).

$$1.90<|FSw|<2.7 \quad (69B'')$$

It is preferable that the variable magnification optical system of the first embodiment include a focusing unit on an image side of the second lens unit, and the following conditional expression (70B) be satisfied:

$$1.5<|FSt|<3.5 \quad (70B)$$

where, $FSt=(1-\beta fot\times(\beta fot)\times\beta imgt\times\beta imgt$,

βfot denotes a lateral magnification of the focusing unit at the telephoto end,

βimgt denotes a lateral magnification of a predetermined optical system at the telephoto end, and the predetermined optical system is an optical system which includes all lens units positioned on the image side of the focusing unit.

Conditional expression (70B) is a conditional expression related to a focusing sensitivity at the telephoto end. Technical significance of conditional expression (70B) is same as the technical significance of conditional expression (70A).

It is more preferable that the following conditional expression (70B') be satisfied instead of conditional expression (70B).

$$1.70<|FSt|<3.0 \quad (70B')$$

Moreover, it is even more preferable that the following conditional expression (70B") be satisfied instead of conditional expression (70B).

$$1.90<|FSt|<2.6 \quad (70B'')$$

In the variable magnification optical system of the first embodiment, it is preferable that the fifth lens unit be fixed at the time of zooming, and the following conditional expression (71B) be satisfied:

$$0.32 < \beta G5 < 0.55 \quad (71B)$$

where,

βG5 denotes a lateral magnification of the fifth lens unit at the time of infinite object point focusing in an arbitrary zoom state.

Conditional expression (71B) is the lateral magnification of the fifth lens unit at the time of infinite object point focusing in the arbitrary zoom state. Technical significance of conditional expression (71B) is same as the technical significance of conditional expression (71A).

It is more preferable that the following conditional expression (71B') be satisfied instead of conditional expression (71B).

$$0.35 < \beta G5 < 0.52 \quad (71B')$$

Moreover, it is even more preferable that the following conditional expression (71BA") be satisfied instead of conditional expression (71B).

$$0.40 < \beta G5 < 0.49 \quad (71B'')$$

An image pickup apparatus of the present embodiment includes an optical system, and an image pickup element which has an image pickup surface, and which converts an image formed on the image pickups surface by the optical system, to an electric signal, wherein the optical system is the variable magnification optical system of the present embodiment.

It is possible to provide an image pickup apparatus which is small-sized, and which enables to achieve an image of a high quality.

Embodiments and examples of a variable magnification optical system will be described below in detail by referring to the accompanying diagrams. However, the present invention is not restricted to the embodiments and the examples described below.

Lens cross-sectional views of each example will be described below. In lens cross-sectional views, (a) shows a lens cross-sectional view at a wide angle end, (b) shows a lens cross-sectional view in an intermediate focal length state, and (c) shows a lens cross-sectional view at a telephoto end.

Aberration diagrams of each example will be described below. In aberration diagrams, (a) shows a spherical aberration (SA) at the wide angle end, (b) shows an astigmatism (AS) at the wide angle end, (c) shows a distortion (DT) at the wide angle end, and (d) shows a chromatic aberration of magnification (CC) at the wide angle end.

Moreover, (e) shows a spherical aberration (SA) in the intermediate focal length state, (f) shows an astigmatism (AS) in the intermediate focal length state, (g) shows a distortion (DT) in the intermediate focal length state, and (h) shows a chromatic aberration of magnification in the intermediate focal length state.

Furthermore, (i) shows a spherical aberration (SA) at the telephoto end, (j) shows an astigmatism (AS) at the telephoto end, (k) shows a distortion (DT) at the telephoto end, and (l) shows a chromatic aberration of magnification (CC) at the telephoto end.

The lens cross-sectional diagrams ar lens cross-sectional diagrams at the time of focusing to an object at infinity (at the time of infinite object point focusing). The aberration diagrams are aberration diagrams at the time of focusing to an object at infinity (at the time of infinite object point focusing).

A first lens unit is denoted by G1, a second lens unit is denoted by G2, a third lens unit is denoted by G3, a fourth lens unit is denoted by G4, a fifth lens unit is denoted by G5, an aperture stop is denoted by S, and an image plane (image pickup surface) is denoted by I. Moreover, a cover glass C of an image pickup element is disposed between the fifth lens unit G5 and the image plane I.

A variable magnification optical system of an example 1 includes in order from an object side, a first lens unit G1 having a positive refractive power, a second lens unit G2 having a negative refractive power, a third lens unit G3 having a positive refractive power, a fourth lens unit G4 having a positive refractive power, and a fifth lens unit G5 having a positive refractive power. An aperture stop (stop) S is disposed between the second lens unit G2 and the third lens unit G3.

The first lens unit G1 includes a negative meniscus lens L1 having a convex surface directed toward the object side, a biconvex positive lens L2, a biconvex positive lens L3, a negative meniscus lens L4 having a convex surface directed toward the object side, a positive meniscus lens L5 having a convex surface directed toward the object side, and a positive meniscus lens L6 having a convex surface directed toward the object side. Here, the negative meniscus lens L1 and the biconvex positive lens L2 are cemented. The negative meniscus lens L4 and the positive meniscus lens L5 are cemented.

A first sub lens unit includes the negative meniscus lens L1 having the convex surface direction toward the object side and the biconvex positive lens L2. A second sub lens unit includes the biconvex positive lens L3, the negative meniscus lens L4, the positive meniscus lens L5, and the positive meniscus lens L6.

The second lens unit G2 includes a negative meniscus lens L7 having a convex surface directed toward the object side, a biconcave negative lens L8, a biconvex positive lens L9, and a biconcave negative lens L10. Here, the biconvex positive lens L9 and the biconcave negative lens L10 are cemented.

The third lens unit G3 includes a biconvex positive lens L11, a negative meniscus lens L12 having a convex surface directed toward the object side, a biconvex positive lens L13, and a negative meniscus lens L14 having a convex surface directed toward the object side. Here, the negative meniscus lens L12 and the biconvex positive lens L13 are cemented.

The fourth lens unit G4 includes a biconvex positive lens L15 and a negative meniscus lens L16 having a convex surface directed toward an image side. Here, the biconvex positive lens L15 and the negative meniscus lens L16 are cemented.

The fifth lens unit G5 includes a negative meniscus lens L17 having a convex surface directed toward the object side and a biconvex positive lens L18. Here, the negative meniscus lens L17 and the biconvex positive lens L18 are cemented.

At the time of zooming from a wide angle end and a telephoto end, the first lens unit G1 is fixed, the second lens unit G2 moves toward the image side, the third lens unit G3 is fixed, the fourth lens unit G4, after moving toward the object side, moves toward the image side, and the fifth lens unit G5 is fixed.

An aspherical surface is provided to a total of five surfaces, which are, an object-side surface of the negative meniscus lens L7, both surfaces of the biconvex positive lens L11, an object-side surface of the biconvex positive lens L15, and an object-side surface of the negative meniscus lens L17.

A variable magnification optical system of an example 2 includes in order from the object side, a first lens unit G1 having a positive refractive power, a second lens unit G2 having a negative refractive power, a third lens unit G3 having a positive refractive power, a fourth lens unit G4 having a positive refractive power, and a fifth lens unit G5 having a positive refractive power. An aperture stop (stop) S is disposed between the second lens unit G2 and the third lens unit G3.

The first lens unit G1 includes a negative meniscus lens L1 having a convex surface directed toward the object side, a biconvex positive lens L2, a negative meniscus lens L3 having a convex surface directed toward the object side, a positive meniscus lens L4 having a convex surface directed toward the object side, a positive meniscus lens L5 having a convex surface directed toward the object side, and a positive meniscus lens L6 having a convex surface directed toward the object side. Here, the negative meniscus lens L1 and the biconvex positive lens L2 are cemented. The negative meniscus lens L3 and the positive meniscus lens L4 are cemented.

A first sub lens unit includes the negative meniscus lens L1 having the convex surface directed toward the object side and the biconvex positive lens L2. A second sub lens unit includes the negative meniscus lens L3, the positive meniscus lens L4, the positive meniscus lens L5, and the positive meniscus lens L6.

The second lens unit G2 includes a negative meniscus lens L7 having a convex surface directed toward the object side, a negative meniscus lens L8 having a convex surface directed toward an image side, a biconvex positive lens L9, and a biconcave negative lens L10. Here, the biconvex positive lens L9 and the biconcave negative lens L10 are cemented.

The third lens unit G3 includes a biconvex positive lens L11, a biconcave negative lens L12, a biconvex positive lens L13, and a negative meniscus lens L14 having a convex surface directed toward the object side. Here, the biconcave negative lens L12 and the biconvex positive lens L13 are cemented.

The fourth lens unit G4 includes a biconvex positive lens L15 and a negative meniscus lens L16 having a convex surface directed toward the image side. Here, the biconvex positive lens L15 and the negative meniscus lens L16 are cemented.

The fifth lens unit G5 includes a negative meniscus lens L17 having a convex surface directed toward the object side and a biconvex positive lens L18. Here, the negative meniscus lens L17 and the biconvex positive lens L18 are cemented.

At the time of zooming from a wide angle end to a telephoto end, the first lens unit G1 is fixed, the second lens unit G2 moves toward the image side, the third lens unit G3 is fixed, the fourth lens unit G4, after moving toward the object side, moves toward the image side, and the fifth lens unit G5 is fixed.

An aspherical surface is provided to a total of five surfaces, which are, an object-side surface of the negative meniscus lens L7, both surfaces of the biconvex positive lens L11, an object-side surface of the biconvex positive lens L15, and an object-side surface of the negative meniscus lens L17.

A variable magnification optical system of an example 3 includes in order from an object side, a first lens unit G1 having a positive refractive power, a second lens unit G2 having a negative refractive power, a third lens unit G3 having a positive refractive power, a fourth lens unit G4 having a positive refractive power, and a fifth lens unit G5 having a positive refractive power. An aperture stop (stop) S is disposed between the second lens unit G2 and the third lens unit G3.

The first lens unit G1 includes a negative meniscus lens L1 having a convex surface directed toward the object side, a biconvex positive lens L2, a negative meniscus lens L3 having a convex surface directed toward the object side, the biconvex positive lens L4, a positive meniscus lens L5 having a convex surface directed toward the object side, and a positive meniscus lens L6 having a convex surface directed toward the object side. Here, the negative meniscus lens L1 and the biconvex positive lens L2 are cemented. The negative meniscus lens L3 and the biconvex positive lens L4 are cemented.

A first sub lens unit includes the negative meniscus lens L1 having the convex surface directed toward the object side and the biconvex positive lens L2. A second sub lens unit includes the negative meniscus lens L3, the biconvex positive lens L4, the positive meniscus lens L5, and the positive meniscus lens L6.

The second lens unit G2 includes a negative meniscus lens L7 having a convex surface directed toward the object side, a biconcave negative lens L8, a biconvex positive lens L9, a negative meniscus lens L10 having a convex surface directed toward an image side, and a positive meniscus lens L11 having a convex surface directed toward the image side. Here, the negative meniscus lens L10 and the positive meniscus lens L11 are cemented.

The third lens unit G3 includes a biconvex positive lens L12, a negative meniscus lens L13 having a convex surface directed toward the object side, a biconvex positive lens L14, and a negative meniscus lens L15 having a convex surface directed toward the object side. Here, the negative meniscus lens L13 and the biconvex positive lens L14 are cemented.

The fourth lens unit G4 includes a biconvex positive lens L16, a biconvex positive lens L17, and a biconcave negative lens L18. Here, the biconvex positive lens L17 and the biconcave negative lens L18.

The fifth lens unit G5 includes a negative meniscus lens L19 having a convex surface directed toward the object side, a biconvex positive lens L20, a negative meniscus lens L21 having a convex surface directed toward the object side, and a positive meniscus lens L22 having a convex surface directed toward the object side. Here, the negative meniscus lens L19 and the biconvex positive lens L20 are cemented. The negative meniscus lens L21 and the positive meniscus lens L22 are cemented.

At the time of zooming from a wide angle end to a telephoto end, the first lens unit G1 is fixed, the second lens unit G2 moves toward the image side, the third lens unit G3 is fixed, the fourth lens unit G4, after moving toward the object side, moves toward the image side, and the fifth lens unit G5 is fixed.

An aspherical surface is provided to a total of three surfaces, which are, an object-side surface of the negative meniscus lens L7, and both surfaces of the biconvex positive lens L12.

A variable magnification optical system of an example 4 includes in order from an object side, a first lens unit G1 having a positive refractive power, a second lens unit G2 having a negative refractive power, a third lens unit G3 having a positive refractive power, a fourth lens unit G4 having a positive refractive power, and a fifth lens unit G5 having a positive refractive power. An aperture stop (stop) S is disposed between the second lens unit G2 and the third lens unit G3.

The first lens unit G1 includes a negative meniscus lens L1 having a convex surface directed toward the object side, a biconvex positive lens L2, a biconcave negative lens L3, a biconvex positive lens L4, a biconvex positive lens L5, and a positive meniscus lens L6 having a convex surface directed toward the object side. Here, the negative meniscus lens L1 and the biconvex positive lens L2 are cemented. The biconcave negative lens L3 and the biconvex positive lens L4 are cemented.

A first sub lens unit includes the negative meniscus lens L1 having the convex surface directed toward the object side and the biconvex positive lens L2. A second sub lens unit includes the biconcave negative lens L3, the biconvex positive lens L4, the biconvex positive lens L5, and the positive meniscus lens L6.

The second lens unit G2 includes a negative meniscus lens L7 having a convex surface directed toward the object side, a negative meniscus lens L8 having a convex surface directed toward an image side, a biconvex positive lens L9, and a biconcave negative lens L10.

The third lens unit G3 includes a biconvex positive lens L11, a negative meniscus lens L12 having a convex surface directed toward the object side, a biconvex positive lens L13, and a biconcave negative lens L14. Here, the negative meniscus lens L12 and the biconvex positive lens L13 are cemented.

The fourth lens unit G4 includes a biconvex positive lens L15, a biconvex positive lens L16, and a biconcave negative lens L17. Here, the biconvex positive lens L16 and the biconcave negative lens L17 are cemented.

The fifth lens unit G5 includes a negative meniscus lens L18 having a convex surface directed toward the object side, a biconvex positive lens L19, a negative meniscus lens L20 having a convex surface directed toward the object side, and a positive meniscus lens L21 having a convex surface directed toward the object side. Here, the negative meniscus lens L18 and the biconvex positive lens L19 are cemented. The negative meniscus lens L20 and the positive meniscus lens L21 are cemented.

At the time of zooming from a wide angle end to a telephoto end, the first lens unit G1 is fixed, the second lens unit G2 moves toward the image side, the third lens unit G3 is fixed, the fourth lens unit G4, after moving toward the object side, moves toward the image side, and the fifth lens unit G5 is fixed.

An aspherical surface is provided to a total of three surfaces, which are, an object-side surface of the negative meniscus lens L7 and both surfaces of the biconvex positive lens L11.

A variable magnification optical system of an example 5 includes in order from an object side, a first lens unit G1 having a positive refractive power, a second lens unit G2 having a negative refractive power, a third lens unit G3 having a positive refractive power, a fourth lens unit G4 having a positive refractive power, and a fifth lens unit G5 having a positive refractive power. An aperture stop (stop) S is disposed between the second lens unit G2 and the third lens unit G3.

The first lens unit G1 includes a negative meniscus lens L1 having a convex surface directed toward the object side, a biconvex positive lens L2, a negative meniscus lens L3 having a convex surface directed toward the object side, a biconvex positive lens L4, a biconvex positive lens L5, and a positive meniscus lens L6 having a convex surface directed toward the object side. Here, the negative meniscus lens L1 and the biconvex positive lens L2 are cemented. The negative meniscus lens L3 and the biconvex positive lens L4 are cemented.

A first sub lens unit includes the negative meniscus lens L1 having the convex surface directed toward the object side and the biconvex positive lens L2. A second sub lens unit includes the negative meniscus lens L3, the biconvex positive lens L4, the biconvex positive lens L5, and the positive meniscus lens L6.

The second lens unit G2 includes a negative meniscus lens L7 having a convex surface directed toward the object side, a biconcave negative lens L8, a biconvex positive lens L9, and a negative meniscus lens L10 having a convex surface directed toward an image side.

The third lens unit G3 includes a biconvex positive lens L11, a negative meniscus lens L12 having a convex surface directed toward the object side, a biconvex positive lens L13, and a biconcave negative lens L14. Here, the negative meniscus lens L12 and the biconvex positive lens L13 are cemented.

The fourth lens unit G4 includes a biconvex positive lens L15, a biconvex positive lens L16, and a negative meniscus lens L17 having a convex surface directed toward the image side. Here, the biconvex positive lens L16 and the negative meniscus lens L17 are cemented.

The fifth lens unit G5 includes a negative meniscus lens L18 having a convex surface directed toward the object side, a positive meniscus lens L19 having a convex surface directed toward the object side, a negative meniscus lens L20 having a convex surface directed toward the object side, and a positive meniscus lens L21 having a convex surface directed toward the object side. Here, the negative meniscus lens L18 and the positive meniscus lens L19 are cemented. The negative meniscus lens L20 and the positive meniscus lens L21 are cemented.

At the time of zooming from a wide angle end to a telephoto end, the first lens unit G1 is fixed, the second lens unit G2 moves toward the image side, the third lens unit G3 moves toward the image side, the fourth lens unit G4, after moving toward the object side, moves toward the image side, and the fifth lens unit G5 is fixed. The aperture stop S moves together with the third lens unit G3.

An aspherical surface is provided to a total of three surfaces, which are, an object-side surface of the negative meniscus lens L7 and both surfaces of the biconvex positive lens L11.

A variable magnification optical system of an example 6 includes in order from an object side, a first lens unit G1 having a positive refractive power, a second lens unit G2 having a negative refractive power, a third lens unit G3 having a positive refractive power, a fourth lens unit G4 having a positive refractive power, and a fifth lens unit G5 having a positive refractive power. An aperture stop (stop) S is disposed in the third lens unit G3.

The first lens unit G1 includes a negative meniscus lens L1 having a convex surface directed toward the object side, a biconvex positive lens L2, a biconvex positive lens L3, a negative meniscus lens L4 having a convex surface directed toward the object side, a positive meniscus lens L5 having a convex surface directed toward the object side, and a positive meniscus lens L6 having a convex surface directed toward the object side. Here, the negative meniscus lens L1 and the biconvex positive lens L2 are cemented. The negative meniscus lens L4 and the positive meniscus lens L5 are cemented.

A first sub lens unit includes the negative meniscus lens L1 having the convex surface directed toward the object side and the biconvex positive lens L2. A second sub lens unit includes the biconvex positive lens L3, the negative meniscus lens L4, the positive meniscus lens L5, and the positive meniscus lens L6.

The second lens unit G2 includes a negative meniscus lens L7 having a convex surface directed toward the object side, a biconcave negative lens L8, a biconvex positive lens L9, and a negative meniscus lens L10 having a convex surface directed toward an image side. Here, the biconvex positive lens L9 and the negative meniscus lens L10 are cemented.

The third lens unit G3 includes a biconvex positive lens L11, a negative meniscus lens L12 having a convex surface directed toward the object side, a biconvex positive lens L13, and a negative meniscus lens L14 having a convex surface directed toward the object side. Here, the negative meniscus lens L12 and the biconvex positive lens L13 are cemented.

The fourth lens unit G4 includes a biconvex positive lens L15 and a negative meniscus lens L16 having a convex surface directed toward the image side. Here, the biconvex positive lens L15 and the negative meniscus lens L16 are cemented.

The fifth lens unit G5 includes a negative meniscus lens L17 having a convex surface directed toward the object side and a biconvex positive lens L18. Here, the negative meniscus lens L17 and the biconvex positive lens L18 are cemented.

At the time of zooming from a wide angle end to a telephoto end, the first lens unit G1 is fixed, the second lens unit G2 moves toward the image side, the third lens unit G3 is fixed, the fourth lens unit G4, after moving toward the object side, moves toward the image side, and the fifth lens unit G5 is fixed.

An aspherical surface is provided to a total of five surfaces, which are, an object-side surface of the negative meniscus lens L7, both surfaces of the biconvex positive lens L11, an object-side surface of the biconvex positive lens L15, and an object-side surface of the negative meniscus lens L17.

A variable magnification optical system of an example 7 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit 5 having a positive refractive power. An aperture stop (stop) S is disposed between the second lens unit G2 and the third lens unit G3.

The first lens unit G1 includes a negative meniscus lens L1 having a convex surface directed toward the object side, a biconvex positive lens L2, a negative meniscus lens L3 having a convex surface directed toward the object side, a positive meniscus lens L4 having a convex surface directed toward the object side, a positive meniscus lens L5 having a convex surface directed toward the object side, and a positive meniscus lens L6 having a convex surface directed toward the object side. Here, the negative meniscus lens L1 and the biconvex positive lens L2 are cemented. The negative meniscus lens L3 and the positive meniscus lens L4 are cemented.

A first sub lens unit includes the negative meniscus lens L1 having the convex surface directed toward the object side and the biconvex positive lens L2. A second sub lens unit includes the negative meniscus lens L3, the positive meniscus lens L4, the positive meniscus lens L5, and the positive meniscus lens L6.

The second lens unit G2 includes a negative meniscus lens L7 having a convex surface directed toward the object side, a biconcave negative lens L8, a biconvex positive lens L9, and a negative meniscus lens L10 having a convex surface directed toward an image side.

The third lens unit G3 includes a biconvex positive lens L11, a negative meniscus lens L12 having a convex surface directed toward the object side, a biconvex positive lens L13, a negative meniscus lens L14 having a convex surface directed toward the image side, and a biconvex positive lens L15. Here, the negative meniscus lens L12 and the biconvex positive lens L13 are cemented.

The fourth lens unit G4 includes a positive meniscus lens L16 having a convex surface directed toward the image side and a biconcave negative lens L17. Here, the positive meniscus lens L16 and the biconcave negative lens L17 are cemented.

The fifth lens unit G5 includes a negative meniscus lens L18 having a convex surface directed toward the object side and a biconvex positive lens L19. Here, the negative meniscus lens L18 and the biconvex positive lens L19 are cemented.

At the time of zooming from a wide angle end to a telephoto end, the first lens unit G1 is fixed, the second lens unit G2 moves toward the image side, the third lens unit G3 is fixed, the fourth lens unit G4, after moving toward the image side, moves toward the object side, and the fifth lens unit G5 is fixed.

An aspherical surface is provided to a total of seven surfaces, which are, both surfaces of the biconcave negative lens L8, both surfaces of the biconvex positive lens L11, both surfaces of the biconvex positive lens L15, and an image-side surface of the biconcave negative lens L17.

A variable magnification optical system of an example 8 includes in order from an object side, a first lens unit G1 having a positive refractive power, a second lens unit G2 having a negative refractive power, a third lens unit G3 having a positive refractive power, a fourth lens unit G4 having a positive refractive power, and a fifth lens unit G5 having a negative refractive power. An aperture stop (stop) S is disposed between the second lens unit G2 and the third lens unit G3.

The first lens unit G1 includes a negative meniscus lens L1 having a convex surface directed toward the object side, a biconvex positive lens L2, a negative meniscus lens L3 having a convex surface directed toward the object side, a positive meniscus lens L4 having a convex surface directed toward the object side, a positive meniscus lens L5 having a convex surface directed toward the object side, and a positive meniscus lens L6 having a convex surface directed toward the object side. Here, the negative meniscus lens L1 and the biconvex positive lens L2 are cemented. The negative meniscus lens L3 and the positive meniscus lens L4 are cemented.

A first sub lens unit includes the negative meniscus lens L1 having the convex surface directed toward the object side and the biconvex positive lens L2. A second sub lens unit includes the negative meniscus lens L3, the positive meniscus lens L4, the positive meniscus lens L5, and the positive meniscus lens L6.

The second lens unit G2 includes a negative meniscus lens L7 having a convex surface directed toward the object side, a biconcave negative lens L8, a biconvex positive lens L9, and a biconcave negative lens L10. Here, the biconvex positive lens L9 and the biconcave negative lens L10 are cemented.

The third lens unit G3 includes a biconvex positive lens L11, a negative meniscus lens L12 having a convex surface directed toward the object side, a biconvex positive lens L13, and a biconcave negative lens L14. Here, the negative meniscus lens L12 and the biconvex positive lens L13 are cemented.

The fourth lens unit G4 includes a biconvex positive lens L15, a biconvex positive lens L16, and a negative meniscus lens L17 having a convex surface directed toward an image side. Here, the biconvex positive lens L16 and the negative meniscus lens L17 are cemented.

The fifth lens unit G5 includes a negative meniscus lens L18 having a convex surface directed toward the object side and a biconvex positive lens L19. Here, the negative meniscus lens L18 and the biconvex positive lens L19 are cemented.

At the time of zooming from a wide angle end to a telephoto end, the first lens unit G1 is fixed, the second lens unit G2 moves toward the image side, the third lens unit G3 is fixed, the fourth lens unit G4, after moving toward the object side, moves toward the image side, and the fifth lens unit G5 is fixed.

An aspherical surface is provided to a total of four surfaces, which are, an object-side surface of the negative meniscus lens L7, both surfaces of the biconvex positive lens L11, and an object-side surface of the negative meniscus lens L18.

Numerical data of each example described above is shown below. In Surface data, r denotes radius of curvature of each lens surface, d denotes a distance between respective lens surfaces, nd denotes a refractive index of each lens for a d-line, vd denotes an Abbe number for each lens and *denotes an aspherical surface.

Moreover, in Zoom data, WE denotes a wide angle end, ST denotes a intermediate focal length state, TE denotes a telephoto end.

Moreover, in Zoom data, f denotes a focal length of the entire system, FNO. denotes an F number, ω denotes a half angle of view, IH denotes an image height, BF denotes a back focus, LTL denotes a lens total length of the optical system. The back focus is a unit which is expressed upon air conversion of a distance from a rearmost lens surface to a paraxial image surface. The lens total length is a distance from a frontmost lens surface to the rearmost lens surface plus back focus.

Moreover, in Unit focal length, each of f1, f2 . . . is a focal length of each lens unit.

Moreover, a shape of an aspherical surface is defined by the following expression where the direction of the optical axis is represented by z, the direction orthogonal to the optical axis is represented by y, a conical coefficient is represented by K, aspherical surface coefficients are represented by A4, A6, A8, A10, A12 . . .

$$Z=(y^2/r)/[1+\{1-(1+k)(y/r)^2\}^{1/2}]+A4y^4+A6y^6+A8y^8+A10y^{10}+A12y^{12}+$$

Further, in the aspherical surface coefficients, 'e-n' (where, n is an integral number) indicates '$10^{-n}$'. Moreover, these symbols are commonly used in the following numerical data for each example.

EXAMPLE 1

| Unit mm | | | | |
|---|---|---|---|---|
| Surface data | | | | |
| Surface no. | r | d | nd | vd |
| Object plane | ∞ | ∞ | | |
| 1 | 332.115 | 1.46 | 1.78800 | 47.37 |
| 2 | 71.806 | 11.06 | 1.43875 | 94.93 |
| 3 | −226.752 | 0.20 | | |
| 4 | 93.546 | 6.39 | 1.43875 | 94.93 |
| 5 | −15000.000 | 0.10 | | |
| 6 | 68.619 | 1.00 | 1.69350 | 53.21 |
| 7 | 45.383 | 7.25 | 1.43875 | 94.93 |
| 8 | 199.249 | 0.10 | | |
| 9 | 39.454 | 5.81 | 1.43875 | 94.93 |
| 10 | 198.187 | Variable | | |
| 11* | 169.894 | 1.10 | 1.76450 | 49.09 |
| 12 | 7.316 | 4.50 | | |
| 13 | −13.223 | 0.50 | 1.77250 | 49.60 |
| 14 | 819.769 | 0.54 | | |
| 15 | 26.168 | 3.00 | 1.84666 | 23.78 |
| 16 | −29.385 | 0.50 | 1.72916 | 54.68 |
| 17 | 523.792 | Variable | | |
| 18 (Stop) | ∞ | 1.20 | | |
| 19* | 18.843 | 5.00 | 1.49700 | 81.54 |
| 20* | −72.173 | 0.66 | | |
| 21 | 195.234 | 0.70 | 1.90043 | 37.37 |
| 22 | 70.000 | 3.70 | 1.49700 | 81.61 |
| 23 | −24.090 | 0.20 | | |
| 24 | 97.562 | 0.60 | 1.77250 | 49.60 |
| 25 | 22.000 | Variable | | |
| 26* | 19.240 | 5.30 | 1.43875 | 94.93 |
| 27 | −17.690 | 0.60 | 1.84666 | 23.78 |
| 28 | −22.901 | Variable | | |
| 29* | 50.730 | 0.70 | 1.88300 | 40.76 |
| 30 | 8.671 | 3.39 | 1.53172 | 48.84 |
| 31 | −19.941 | Variable | | |
| 32 | ∞ | 2.10 | 1.51633 | 64.14 |
| 33 | ∞ | 1.60 | | |
| Image plane | ∞ | | | |

Aspherical surface data

11th surface k = 0.000
A4 = 5.49956e−05, A6 = −3.47660e−07, A8 = 5.13183e−10

19th surface k = 0.000
A4 = −2.24450e−05, A6 = 1.50738e−07

20th surface k = 0.000
A4 = 4.37691e−05, A6 = 2.13570e−07

26th surface k = 0.000
A4 = −2.90968e−05

29th surface k = 0.000
A4 = −3.96199e−05

| Zoom data Zoom ratio 35.84 | | | |
|---|---|---|---|
| | WE | ST | TE |
| f | 4.85 | 28.45 | 173.88 |
| FNO. | 1.67 | 2.85 | 3.93 |
| 2ω | 65.39 | 12.34 | 2.05 |
| IH | 3.20 | 3.20 | 3.20 |
| BF (in air) | 8.20 | 8.20 | 8.19 |
| LTL (in air) | 147.09 | 147.09 | 147.08 |
| d10 | 0.60 | 32.65 | 46.79 |

-continued

Unit mm

| | | | |
|---|---|---|---|
| d17 | 47.36 | 15.31 | 1.17 |
| d25 | 19.09 | 7.67 | 17.59 |
| d28 | 6.28 | 17.70 | 7.77 |
| d31 | 5.21 | 5.21 | 5.21 |

Unit focal length f1 = 65.35  f2 = −7.74  f3 = 36.53  f4 = 28.15  f5 = 200.09

EXAMPLE 2

Unit mm

Surface data

| Surface no. | r | d | nd | vd |
|---|---|---|---|---|
| Object plane | ∞ | ∞ | | |
| 1 | 457.432 | 1.46 | 1.77250 | 49.60 |
| 2 | 72.501 | 11.41 | 1.43875 | 94.93 |
| 3 | −186.335 | 1.28 | | |
| 4 | 104.633 | 1.00 | 1.74100 | 52.64 |
| 5 | 56.694 | 7.97 | 1.43875 | 94.93 |
| 6 | 2211.340 | 0.10 | | |
| 7 | 54.546 | 7.35 | 1.43875 | 94.93 |
| 8 | 533.939 | 0.10 | | |
| 9 | 45.012 | 5.99 | 1.43875 | 94.93 |
| 10 | 181.373 | Variable | | |
| 11* | 83.775 | 1.10 | 1.75501 | 51.16 |
| 12 | 7.250 | 4.50 | | |
| 13 | −11.897 | 0.52 | 1.77250 | 49.60 |
| 14 | −127.637 | 0.46 | | |
| 15 | 27.639 | 3.00 | 1.84666 | 23.78 |
| 16 | −28.203 | 0.50 | 1.72916 | 54.68 |
| 17 | 265.802 | Variable | | |
| 18 (Stop) | ∞ | 1.20 | | |
| 19* | 18.408 | 5.00 | 1.49700 | 81.54 |
| 20* | −74.837 | 0.66 | | |
| 21 | −1482.452 | 0.70 | 1.90043 | 37.37 |
| 22 | 144.876 | 3.70 | 1.49700 | 81.61 |
| 23 | −22.817 | 0.20 | | |
| 24 | 102.675 | 0.60 | 1.77250 | 49.60 |
| 25 | 22.345 | Variable | | |
| 26* | 19.296 | 5.30 | 1.43875 | 94.93 |
| 27 | −17.975 | 0.60 | 1.84666 | 23.78 |
| 28 | −23.522 | Variable | | |
| 29* | 36.510 | 0.70 | 1.88300 | 40.76 |
| 30 | 8.416 | 3.39 | 1.53172 | 48.84 |
| 31 | −26.527 | Variable | | |
| 32 | ∞ | 2.10 | 1.51633 | 64.14 |
| 33 | ∞ | 1.60 | | |
| Image plane | ∞ | | | |

Aspherical surface data

11th surface k = 0.000
A4 = 5.52808e−05, A6 = −3.98573e−07, A8 = 3.41394e−10
19th surface k = 0.000
A4 = −1.92794e−05, A6 = 1.64334e−07
20th surface k = 0.000
A4 = 5.13923e−05, A6 = 2.41278e−07
26th surface k = 0.000
A4 = −2.62052e−05

-continued

Unit mm

29th surface k = 0.000
A4 = −1.80810e−05

Zoom data
Zoom ratio 35.77

| | WE | ST | TE |
|---|---|---|---|
| f | 4.85 | 28.43 | 173.47 |
| FNO. | 1.67 | 2.89 | 3.99 |
| 2ω | 65.39 | 12.34 | 2.05 |
| IH | 3.20 | 3.20 | 3.20 |
| BF (in air) | 9.09 | 9.09 | 9.09 |
| LTL (in air) | 150.70 | 150.70 | 150.70 |
| d10 | 0.61 | 32.21 | 46.16 |
| d17 | 47.76 | 16.15 | 2.20 |
| d25 | 18.49 | 7.28 | 18.44 |
| d28 | 5.96 | 17.17 | 6.01 |
| d31 | 6.11 | 6.11 | 6.11 |

Unit focal length f1 = 63.75  f2 = −7.83  f3 = 37.42  f4 = 28.65  f5 = 289.87

EXAMPLE 3

Unit mm

Surface data

| Surface no. | r | d | nd | vd |
|---|---|---|---|---|
| Object plane | ∞ | ∞ | | |
| 1 | 277.846 | 1.46 | 1.78590 | 44.20 |
| 2 | 82.632 | 9.25 | 1.43875 | 94.93 |
| 3 | −347.885 | 0.20 | | |
| 4 | 131.947 | 1.00 | 1.74100 | 52.64 |
| 5 | 62.076 | 9.63 | 1.43875 | 94.93 |
| 6 | −875.388 | 0.10 | | |
| 7 | 59.692 | 6.93 | 1.43875 | 94.93 |
| 8 | 1028.236 | 0.10 | | |
| 9 | 43.728 | 5.57 | 1.43875 | 94.93 |
| 10 | 154.196 | Variable | | |
| 11* | 916.021 | 1.10 | 1.75501 | 51.16 |
| 12 | 8.116 | 4.43 | | |
| 13 | −17.561 | 0.52 | 1.72916 | 54.68 |
| 14 | 29.316 | 0.20 | | |
| 15 | 19.601 | 2.40 | 1.85478 | 24.80 |
| 16 | −68.006 | 0.88 | | |
| 17 | −21.262 | 0.50 | 1.43875 | 94.93 |
| 18 | −80.000 | 1.20 | 1.83400 | 37.16 |
| 19 | −53.703 | Variable | | |
| 20 (Stop) | ∞ | 1.10 | | |
| 21* | 25.879 | 5.00 | 1.49700 | 81.54 |
| 22* | −52.192 | 0.20 | | |
| 23 | 116.915 | 0.70 | 1.77250 | 49.60 |
| 24 | 55.851 | 4.30 | 1.43875 | 94.93 |
| 25 | −23.726 | 0.20 | | |
| 26 | −237.208 | 0.60 | 1.72916 | 54.68 |
| 27 | 29.828 | Variable | | |
| 28 | 30.623 | 3.50 | 1.43875 | 94.93 |
| 29 | −27.129 | 0.10 | | |
| 30 | 20.645 | 3.15 | 1.43875 | 94.93 |
| 31 | −37.135 | 0.60 | 1.80440 | 39.59 |
| 32 | 120.000 | Variable | | |
| 33 | 26.106 | 0.70 | 1.81600 | 46.62 |
| 34 | 7.055 | 3.39 | 1.53172 | 48.84 |
| 35 | −88.316 | 0.80 | | |
| 36 | 13.780 | 0.80 | 1.72916 | 54.68 |
| 37 | 7.200 | 2.50 | 1.43875 | 94.93 |
| 38 | 38.667 | Variable | | |

|  | Unit mm | | | |
|---|---|---|---|---|
| 39 | ∞ | 2.12 | 1.51633 | 64.14 |
| 40 | ∞ | 0.40 | | |
| Image plane | ∞ | | | |

Aspherical surface data

11th surface k = 0.000
A4 = 3.47269e−05, A6 = −2.00109e−07, A8 = 3.97844e−10

21th surface k = 0.000
A4 = −1.53766e−05, A6 = 9.66591e−09

22th surface k = 0.000
A4 = 3.31032e−05, A6 = 3.04919e−08

Zoom data
Zoom ratio 35.77

|  | WE | ST | TE |
|---|---|---|---|
| f | 4.85 | 28.43 | 173.44 |
| FNO. | 1.58 | 2.75 | 3.93 |
| 2ω | 66.09 | 12.31 | 2.03 |
| IH | 3.20 | 3.20 | 3.20 |
| BF (in air) | 5.29 | 5.30 | 5.30 |
| LTL (in air) | 154.67 | 154.68 | 154.67 |
| d10 | 0.60 | 33.33 | 47.72 |
| d19 | 48.36 | 15.62 | 1.23 |
| d27 | 20.69 | 10.83 | 23.74 |
| d32 | 6.63 | 16.48 | 3.58 |
| d38 | 3.50 | 3.50 | 3.50 |

Unit focal length

| f1 = 65.88 | f2 = −8.58 | f3 = 45.70 | f4 = 27.49 | f5 = 5266.15 |

EXAMPLE 4

Unit mm

Surface data

| Surface no. | r | d | nd | vd |
|---|---|---|---|---|
| Object plane | ∞ | ∞ | | |
| 1 | 303.491 | 1.46 | 1.77250 | 49.60 |
| 2 | 68.178 | 11.95 | 1.43875 | 94.93 |
| 3 | −120.201 | 0.20 | | |
| 4 | −412.807 | 1.00 | 1.73400 | 51.47 |
| 5 | 64.262 | 8.54 | 1.43875 | 94.93 |
| 6 | −183.839 | 0.10 | | |
| 7 | 60.295 | 7.61 | 1.43875 | 94.93 |
| 8 | −221.602 | 0.10 | | |
| 9 | 46.329 | 6.34 | 1.72916 | 54.68 |
| 10 | 87.257 | Variable | | |
| 11* | 130.500 | 1.10 | 1.80139 | 45.45 |
| 12 | 9.885 | 4.59 | | |
| 13 | −12.135 | 0.52 | 1.72916 | 54.68 |
| 14 | −197.219 | 0.20 | | |
| 15 | 53.722 | 2.40 | 1.92119 | 23.96 |
| 16 | −25.559 | 0.82 | | |
| 17 | −15.814 | 0.50 | 1.43875 | 94.93 |
| 18 | 1866.840 | Variable | | |
| 19 (Stop) | ∞ | 1.10 | | |
| 20* | 27.319 | 5.00 | 1.49700 | 81.54 |
| 21* | −79.395 | 1.41 | | |
| 22 | 60.427 | 0.70 | 1.77250 | 49.60 |
| 23 | 41.717 | 4.30 | 1.43875 | 94.93 |
| 24 | −23.433 | 0.20 | | |
| 25 | −208.826 | 0.60 | 1.72916 | 54.68 |
| 26 | 31.122 | Variable | | |
| 27 | 30.089 | 3.50 | 1.43875 | 94.93 |
| 28 | −28.858 | 0.10 | | |
| 29 | 21.149 | 3.15 | 1.43875 | 94.93 |
| 30 | −37.098 | 0.60 | 1.80440 | 39.59 |
| 31 | 120.000 | Variable | | |
| 32 | 31.728 | 0.70 | 1.81600 | 46.62 |
| 33 | 7.957 | 3.39 | 1.53172 | 48.84 |
| 34 | −114.251 | 0.80 | | |
| 35 | 13.892 | 0.80 | 1.72916 | 54.68 |
| 36 | 7.000 | 2.50 | 1.43875 | 94.93 |
| 37 | 76.080 | Variable | | |
| 38 | ∞ | 2.12 | 1.51633 | 64.14 |
| 39 | ∞ | 0.40 | | |
| Image plane | ∞ | | | |

Aspherical surface data

11th surface k = 0.000
A4 = 3.73016e−05, A6 = −2.44611e−07, A8 = 1.05667e−09

20th surface k = 0.000
A4 = −5.41756e−06, A6 = −2.01787e−09

21th surface k = 0.000
A4 = 3.81261e−05, A6 = 3.24222e−08

Zoom data
Zoom ratio 35.77

|  | WE | ST | TE |
|---|---|---|---|
| f | 4.85 | 28.43 | 173.44 |
| FNO. | 1.63 | 2.87 | 4.00 |
| 2ω | 67.65 | 12.33 | 2.03 |
| IH | 3.20 | 3.20 | 3.20 |
| BF (in air) | 6.24 | 6.24 | 6.24 |
| LTL (in air) | 158.81 | 158.81 | 158.80 |
| d10 | 0.60 | 34.01 | 49.49 |
| d18 | 50.04 | 16.63 | 1.15 |
| d26 | 19.82 | 8.86 | 22.11 |
| d31 | 5.81 | 16.78 | 3.52 |
| d37 | 4.45 | 4.45 | 4.45 |

Unit focal length

| f1 = 65.44 | f2 = −8.73 | f3 = 44.49 | f4 = 28.45 | f5 = 667.51 |

EXAMPLE 5

Unit mm

Surface data

| Surface no. | r | d | nd | vd |
|---|---|---|---|---|
| Object plane | ∞ | ∞ | | |
| 1 | 149.483 | 1.46 | 1.77250 | 49.60 |
| 2 | 64.203 | 9.00 | 1.43875 | 94.93 |
| 3 | −547.013 | 0.20 | | |
| 4 | 1220.090 | 1.00 | 1.74100 | 52.64 |
| 5 | 70.964 | 8.00 | 1.43875 | 94.93 |
| 6 | −267.202 | 0.10 | | |
| 7 | 64.797 | 6.61 | 1.43875 | 94.93 |
| 8 | −455.598 | 0.10 | | |
| 9 | 46.412 | 5.17 | 1.55032 | 75.50 |
| 10 | 132.392 | Variable | | |

-continued

Unit mm

| | | | | |
|---|---|---|---|---|
| 11* | 900.702 | 1.10 | 1.85135 | 40.10 |
| 12 | 8.116 | 4.62 | | |
| 13 | −11.997 | 0.52 | 1.64000 | 60.08 |
| 14 | 71.545 | 0.20 | | |
| 15 | 30.965 | 2.40 | 1.92119 | 23.96 |
| 16 | −28.834 | 1.02 | | |
| 17 | −14.153 | 0.50 | 1.43875 | 94.93 |
| 18 | −32.035 | Variable | | |
| 19 (Stop) | ∞ | 1.10 | | |
| 20* | 26.308 | 5.00 | 1.49700 | 81.54 |
| 21* | −25.546 | 0.20 | | |
| 22 | 120.000 | 0.70 | 1.77250 | 49.60 |
| 23 | 40.000 | 4.20 | 1.43875 | 94.93 |
| 24 | −24.600 | 0.40 | | |
| 25 | −41.272 | 0.60 | 1.72916 | 54.68 |
| 26 | 55.656 | Variable | | |
| 27 | 32.169 | 3.50 | 1.43875 | 94.93 |
| 28 | −27.075 | 0.10 | | |
| 29 | 21.518 | 3.15 | 1.43875 | 94.93 |
| 30 | −26.046 | 0.60 | 1.83400 | 37.16 |
| 31 | −230.434 | Variable | | |
| 32 | 27.145 | 0.70 | 1.81600 | 46.62 |
| 33 | 7.000 | 3.39 | 1.53172 | 48.84 |
| 34 | 357.399 | 0.80 | | |
| 35 | 12.107 | 0.80 | 1.72916 | 54.68 |
| 36 | 7.000 | 2.50 | 1.43875 | 94.93 |
| 37 | 57.152 | Variable | | |
| 38 | ∞ | 2.12 | 1.51633 | 64.14 |
| 39 | ∞ | 0.40 | | |
| Image plane | ∞ | | | |

Aspherical surface data

11th surface $k = 0.000$
$A4 = 5.94401e-05, A6 = -3.08338e-07, A8 = 2.85261e-10$ 20th surface $k = 0.000$
$A4 = -1.84266e-05, A6 = -1.20098e-08$ 21th surface $k = 0.000$
$A4 = 3.02711e-05, A6 = -9.09733e-09$ Zoom data
Zoom ratio 35.76

| | WE | ST | TE |
|---|---|---|---|
| f | 4.85 | 28.43 | 173.42 |
| FNO. | 1.66 | 2.84 | 4.00 |
| 2ω | 68.70 | 12.41 | 2.04 |
| IH | 3.20 | 3.20 | 3.20 |
| BF (in air) | 3.97 | 3.97 | 3.97 |
| LTL (in air) | 149.21 | 149.21 | 149.20 |
| d10 | 0.60 | 38.06 | 53.86 |
| d18 | 42.45 | 12.07 | 1.15 |
| d26 | 26.80 | 8.65 | 16.92 |
| d31 | 5.63 | 16.70 | 3.56 |
| d37 | 2.17 | 2.17 | 2.17 |

Unit focal length

| | | | | |
|---|---|---|---|---|
| f1 = 69.25 | f2 = −8.01 | f3 = 38.75 | f4 = 25.63 | f5 = 1057.78 |

EXAMPLE 6

Unit mm

Surface data

| Surface no. | r | d | nd | vd |
|---|---|---|---|---|
| Object plane | ∞ | ∞ | | |
| 1 | 385.818 | 1.46 | 1.78800 | 47.37 |
| 2 | 76.258 | 10.38 | 1.43875 | 94.93 |
| 3 | −217.829 | 0.20 | | |
| 4 | 98.941 | 6.19 | 1.43875 | 94.93 |
| 5 | −1648.864 | 0.10 | | |
| 6 | 69.961 | 1.00 | 1.69350 | 53.21 |
| 7 | 44.871 | 7.07 | 1.43875 | 94.93 |
| 8 | 221.583 | 0.10 | | |
| 9 | 38.722 | 5.64 | 1.43875 | 94.93 |
| 10 | 177.036 | Variable | | |
| 11* | 378.469 | 1.10 | 1.76450 | 49.09 |
| 12 | 7.450 | 4.50 | | |
| 13 | −13.500 | 0.50 | 1.77250 | 49.60 |
| 14 | 160.541 | 0.20 | | |
| 15 | 25.091 | 3.00 | 1.84666 | 23.78 |
| 16 | −29.311 | 0.50 | 1.72916 | 54.68 |
| 17 | −346.301 | Variable | | |
| 18* | 21.945 | 3.50 | 1.49700 | 81.54 |
| 19* | −54.859 | 1.00 | | |
| 20 (Stop) | ∞ | 1.00 | | |
| 21 | 387.318 | 0.70 | 1.90043 | 37.37 |
| 22 | 91.656 | 3.50 | 1.49700 | 81.61 |
| 23 | −21.820 | 0.20 | | |
| 24 | 180.198 | 0.60 | 1.77250 | 49.60 |
| 25 | 24.656 | Variable | | |
| 26* | 19.626 | 5.30 | 1.43875 | 94.93 |
| 27 | −17.321 | 0.60 | 1.84666 | 23.78 |
| 28 | −22.368 | Variable | | |
| 29* | 37.289 | 0.70 | 1.88300 | 40.76 |
| 30 | 8.661 | 3.39 | 1.53172 | 48.84 |
| 31 | −25.317 | Variable | | |
| 32 | ∞ | 2.10 | 1.51633 | 64.14 |
| 33 | ∞ | 1.60 | | |
| Image plane | ∞ | | | |

Aspherical surface data

11th surface $k = 0.000$
$A4 = 5.16202e-05, A6 = -3.52156e-07, A8 = 7.43368e-10$ 18th surface $k = 0.000$
$A4 = -2.27726e-05, A6 = 2.25580e-07$ 19th surface $k = 0.000$
$A4 = 3.84649e-05, A6 = 2.78712e-07$ 26th surface $k = 0.000$
$A4 = -2.89721e-05$ 29th surface $k = 0.000$
$A4 = -3.38952e-05$ Zoom data
Zoom ratio 35.77

| | WE | ST | TE |
|---|---|---|---|
| f | 4.85 | 28.43 | 173.47 |
| FNO. | 1.69 | 2.98 | 3.94 |
| 2ω | 66.23 | 12.38 | 2.05 |
| IH | 3.20 | 3.20 | 3.20 |
| BF (in air) | 8.03 | 8.04 | 8.03 |
| LTL (in air) | 145.89 | 145.90 | 145.90 |

-continued

Unit mm

|  |  |  |  |
|---|---|---|---|
| d10 | 0.60 | 32.84 | 47.23 |
| d17 | 48.30 | 16.06 | 1.67 |
| d25 | 19.90 | 8.14 | 18.37 |
| d28 | 6.62 | 18.39 | 8.16 |
| d31 | 5.05 | 5.05 | 5.05 |

Unit focal length

| f1 = 65.57 | f2 = −7.82 | f3 = 37.29 | f4 = 28.19 | f5 = 197.40 |
|---|---|---|---|---|

EXAMPLE 7

Unit mm

Surface data

| Surface no. | r | d | nd | vd |
|---|---|---|---|---|
| Object plane | ∞ | ∞ |  |  |
| 1 | 138.101 | 1.20 | 1.77250 | 49.60 |
| 2 | 70.040 | 6.83 | 1.43875 | 94.93 |
| 3 | −234.969 | 0.10 |  |  |
| 4 | 170.536 | 1.20 | 1.69680 | 55.53 |
| 5 | 52.362 | 6.51 | 1.43875 | 94.93 |
| 6 | 1000.293 | 0.08 |  |  |
| 7 | 50.457 | 5.92 | 1.43875 | 94.93 |
| 8 | 279.343 | 0.08 |  |  |
| 9 | 48.644 | 4.62 | 1.43875 | 94.93 |
| 10 | 133.734 | Variable |  |  |
| 11 | 32.333 | 0.40 | 2.00100 | 29.13 |
| 12 | 8.555 | 3.23 |  |  |
| 13* | −21.075 | 0.89 | 1.85135 | 40.10 |
| 14* | 14.304 | 0.24 |  |  |
| 15 | 12.577 | 2.95 | 1.84666 | 23.78 |
| 16 | −13.891 | 0.81 |  |  |
| 17 | −9.769 | 0.40 | 1.67790 | 55.34 |
| 18 | 575.921 | Variable |  |  |
| 19 (Stop) | ∞ | 0.97 |  |  |
| 20* | 20.415 | 4.04 | 1.58313 | 59.38 |
| 21* | −38.932 | 4.70 |  |  |
| 22 | 48.500 | 0.81 | 1.90043 | 37.37 |
| 23 | 13.660 | 5.88 | 1.43875 | 94.93 |
| 24 | −13.840 | 0.10 |  |  |
| 25 | −13.608 | 0.57 | 1.83481 | 42.73 |
| 26 | −28.664 | 0.08 |  |  |
| 27* | 26.752 | 3.76 | 1.49710 | 81.56 |
| 28* | −17.976 | Variable |  |  |
| 29 | −68.232 | 1.40 | 1.84666 | 23.78 |
| 30 | −20.926 | 0.40 | 1.58313 | 59.38 |
| 31* | 8.467 | Variable |  |  |
| 32 | 9.962 | 0.81 | 2.00069 | 25.46 |
| 33 | 7.143 | 3.23 | 1.58313 | 59.38 |
| 34 | −34.684 | Variable |  |  |
| 35 | ∞ | 1.21 | 1.51633 | 64.14 |
| 36 | ∞ | 5.77 |  |  |
| Image plane | ∞ |  |  |  |

Aspherical surface data

13th surface k = 0.000
A4 = −1.97798e−04, A6 = 1.37448e−05, A8 = −1.71575e−07

14th surface k = 0.000
A4 = −2.20070e−04, A6 = 1.39515e−05, A8 = −2.09947e−07

20th surface k = 0.000
A4 = −1.78859e−05, A6 = 4.45750e−08

21th surface k = 0.000
A4 = 3.06858e−05, A6 = 1.18572e−08

27th surface k = 0.000
A4 = 1.68928e−06, A6 = 4.70097e−08

28th surface k = 0.000
A4 = 3.40371e−05, A6 = 5.21061e−08

31th surface k = 0.000
A4 = −4.94952e−05, A6 = −9.36973e−07

Zoom data
Zoom ratio 54.98

|  | WE | ST | TE |
|---|---|---|---|
| f | 4.85 | 35.96 | 266.49 |
| FNO. | 1.81 | 3.09 | 5.59 |
| 2ω | 56.53 | 8.08 | 1.11 |
| IH | 2.59 | 2.59 | 2.59 |
| BF (in air) | 7.39 | 7.39 | 7.40 |
| LTL (in air) | 143.97 | 143.97 | 143.98 |
| d10 | 0.57 | 38.90 | 53.09 |
| d18 | 53.52 | 15.18 | 0.99 |
| d28 | 2.37 | 11.87 | 2.71 |
| d31 | 17.90 | 8.40 | 17.56 |
| d34 | 0.81 | 0.81 | 0.81 |

Unit focal length

| f1 = 71.18 | f2 = −7.17 | f3 = 18.24 | f4 = −14.45 | f5 = 16.96 |
|---|---|---|---|---|

EXAMPLE 8

Unit mm

Surface data

| Surface no. | r | d | nd | vd |
|---|---|---|---|---|
| Object plane | ∞ | ∞ |  |  |
| 1 | 569.979 | 1.46 | 1.77250 | 49.60 |
| 2 | 75.985 | 10.73 | 1.43875 | 94.93 |
| 3 | −187.012 | 0.60 |  |  |
| 4 | 104.241 | 1.00 | 1.72916 | 54.68 |
| 5 | 51.286 | 8.25 | 1.43875 | 94.93 |
| 6 | 1012.541 | 0.10 |  |  |
| 7 | 54.835 | 7.33 | 1.43875 | 94.93 |
| 8 | 1331.770 | 0.10 |  |  |
| 9 | 40.745 | 5.79 | 1.43875 | 94.93 |
| 10 | 150.235 | Variable |  |  |
| 11* | 46.740 | 1.10 | 1.76802 | 49.24 |
| 12 | 7.127 | 4.50 |  |  |
| 13 | −14.834 | 0.52 | 1.75500 | 52.32 |
| 14 | 38.247 | 0.46 |  |  |
| 15 | 19.906 | 3.00 | 1.85478 | 24.80 |
| 16 | −33.296 | 0.50 | 1.72916 | 54.68 |
| 17 | 160.360 | Variable |  |  |
| 18 (Stop) | ∞ | 1.20 |  |  |
| 19* | 19.988 | 4.00 | 1.55332 | 71.68 |
| 20* | −34.874 | 0.20 |  |  |
| 21 | 2525.427 | 0.70 | 1.83481 | 42.71 |
| 22 | 42.994 | 3.50 | 1.43875 | 94.93 |
| 23 | −22.122 | 3.91 |  |  |
| 24 | −74.625 | 0.60 | 1.77250 | 49.60 |
| 25 | 25.494 | Variable |  |  |

-continued

Unit mm

| | | | | |
|---|---|---|---|---|
| 26 | 45.576 | 2.60 | 1.43875 | 94.93 |
| 27 | −26.761 | 0.10 | | |
| 28 | 20.252 | 2.50 | 1.43875 | 94.93 |
| 29 | −28.566 | 0.60 | 1.85025 | 30.05 |
| 30 | −59.700 | Variable | | |
| 31* | 23.830 | 0.70 | 1.88300 | 40.76 |
| 32 | 7.220 | 3.00 | 1.53172 | 48.84 |
| 33 | −73.609 | Variable | | |
| 34 | ∞ | 2.12 | 1.51633 | 64.14 |
| 35 | ∞ | 0.40 | | |
| Image plane | ∞ | | | |

Aspherical surface data

11th surface k = 0.000
A4 = 2.84705e−05, A6 = −3.53782e−07, A8 = 5.86186e−10

19th surface k = 0.000
A4 = −1.99519e−05, A6 = 1.14949e−07

20th surface k = 0.000
A4 = 4.73315e−05, A6 = 1.07728e−07

31th surface k = 0.000
A4 = −2.34219e−04

Zoom data
Zoom ratio 49.99

| | WE | ST | TE |
|---|---|---|---|
| f | 4.85 | 28.43 | 242.44 |
| FNO. | 1.64 | 2.64 | 5.03 |
| 2ω | 64.88 | 12.36 | 1.45 |
| IH | 3.20 | 3.20 | 3.20 |
| BF (in air) | 2.00 | 2.01 | 2.01 |
| LTL (in air) | 149.26 | 149.26 | 149.26 |
| d10 | 0.60 | 32.70 | 46.07 |
| d17 | 47.61 | 15.51 | 2.14 |
| d25 | 19.13 | 9.54 | 26.46 |
| d30 | 10.86 | 20.45 | 3.53 |
| d33 | 0.20 | 0.20 | 0.20 |

Unit focal length f1 = 62.77  f2 = −7.97  f3 = 38.73  f4 = 21.43  f5 = −273.72

Next, values of conditional expressions in each example are given below. '-' (hyphen) indicates that there is no corresponding arrangement.

| | Example1 | Example2 |
|---|---|---|
| (4)υds1pmax-υds1nmin | 47.6 | 45.3 |
| (5)υds2pmax-υds2nmin | 41.7 | 42.3 |
| (6)(θg, F)s1pmin-(θg, F)s1nmax | −0.02185 | −0.01795 |
| (7)(θg, F)s2pmin-(θg, F)s2nmax | −0.01323 | −0.01261 |
| (8)(SFp2 + SFp3) × 0.5 | −1.29 | −1.14 |
| (9)SFp1 | −0.52 | −0.44 |
| (10)SFpL | −1.50 | −1.66 |
| (11)|SFp1/SFPL| | 0.35 | 0.26 |
| (12)SFp2 | −0.99 | −1.05 |
| (13)|SFp2/SFpL| | 0.66 | 0.63 |
| (14)SFp3 | −1.59 | −1.23 |
| (15)|SFp3/SFpL| | 1.06 | 0.74 |
| (16)SFn1 | 1.55 | 1.38 |
| (17)SFn2 | 4.91 | 3.37 |
| (18)SFn1/SFnL | 0.32 | 0.41 |
| (19)SFc1/SFc4 | −0.126 | −0.254 |
| (20)SFc2/SFc4 | 0.66 | 0.66 |
| (21)SFc3/SFc4 | 1.37 | 0.74 |
| (22)Rce1/dce1 | 5.7 | 5.6 |
| (23)Rce2/dce2 | 5.5 | 6.3 |
| (24)|(θg, F)ce1p-(θg, F)ce1n)|/ (υdce1p-υdce1n) | 0.00045942 | 0.00039605 |
| (25)|(θg, F)ce2p-(θg, F)ce2n)|/ (υdce2p-υdce2n) | 0.00031714 | 0.00029808 |
| (26)1/(fce1p × υdce1p) + 1/(fce1n × υdce1n) | −0.000097 | −0.000093 |
| (27)1/(fce2p × υdce2p) + 1/(fce2n × υdce2n) | −0.000016 | −0.000033 |
| (28)dc1/dc4 | 2.155 | 2.148 |
| (29)dc2/dc4 | 1.100 | 1.496 |
| (30)dc3/dc4 | 1.420 | 1.226 |
| (31)dc4/dG1 | 0.174 | 0.163 |
| (32)fp1/fpL | 1.132 | 0.896 |
| (33)fp2/fpL | 1.909 | 0.984 |
| (34)fp3/fpL | 1.189 | 1.024 |
| (35)|fn1/fnL| | 0.592 | 0.663 |
| (36)fc4/fc1 | −0.057 | −0.068 |
| (37)fc4/fc2 | 0.524 | 0.212 |
| (38)|fc4/fc3| | 0.265 | 0.977 |
| (39)RpLo/dpL | 6.793 | 7.510 |
| (40)υdni | 53.21000 | 52.64000 |
| (1B)(θg, F)ni | 0.55591 | 0.55201 |
| (41)υdpj | 94.93000 | 94.93000 |
| (42)(θg, F)pj | 0.53406 | 0.53406 |
| (43)fG1/fw | 13.469 | 13.146 |
| (44)fG1/ft | 0.376 | 0.368 |
| (45)|fG1/fG2| | 8.44 | 8.14 |
| (46)fG1/ΔG2 | 1.415 | 1.399 |
| (47)(β2t/β2w)/(ft/fw) | 0.92 | 1.00 |
| (48)|fG2/fw| | 1.595 | 1.615 |
| (49)|fG2/ft| | 0.045 | 0.045 |
| (50)fG2L1/fG2 | 1.296 | 1.351 |
| (51)|β2w| | 0.162 | 0.167 |
| (52)|β2t| | 5.351 | 5.958 |
| (53)(βLt/βLw)/(ft/fw) | 0.030 | 0.028 |
| (54)(β3t/β3w)/(ft/fw) | 0.036 | 0.028 |
| (55)fG3/fw | 7.529 | 7.716 |
| (56)fG3/ft | 0.210 | 0.216 |
| (57)|fG3/fG2| | 4.719 | 4.779 |
| (58)fG3L1/fG3 | 0.838 | 0.809 |
| (59)|fG3n/fG3L1| | | |
| Negative lens1 | 3.968 | 4.842 |
| Negative lens2 | 1.205 | 1.226 |
| (60)υdG3pmax | 81.610 | 81.610 |
| (61)(θg, F)G3pmin | 0.53745 | 0.53745 |
| (62)υdG5pmax-υdG5nmin | 8.080 | 8.080 |
| (63)ndG5nmax-ndG5pmin | 0.351 | 0.351 |
| (64A)fG4/fw | 5.802 | 5.908 |
| (64B)|fG4/fw| | — | — |
| (65A)fG4/ft | 0.162 | 0.165 |
| (65B)|fG4/ft| | — | — |
| (66)β4z/β4w | | |
| (67)υdG4pmax | 94.930 | 94.930 |
| (68)(θg, F)G4pmin | 0.534 | 0.534 |
| (69A)|FSw| | 0.900 | 0.900 |
| (69B)|FSw| | — | — |
| (70A)|FSt| | 0.932 | 0.901 |
| (70B)|FSt| | — | — |
| (71A)βG5 | 1.003 | 0.998 |
| (71B)βG5 | — | — |
| (72)υdG4nmax | — | — |
| (73)(θg, F)G4nmin | — | — |

| | Example3 | Example4 |
|---|---|---|
| (4)υds1pmax-υds1nmin | 50.7 | 45.3 |
| (5)υds2pmax-υds2nmin | 42.3 | 43.5 |
| (6)(θg, F)s1pmin-(θg, F)s1nmax | −0.02903 | −0.01795 |
| (7)(θg, F)s2pmin-(θg, F)s2nmax | −0.01261 | −0.01458 |
| (8)(SFp2 + SFp3) × 0.5 | −1.00 | −0.53 |
| (9)SFp1 | −0.62 | −0.28 |
| (10)SFpL | −1.79 | −3.26 |
| (11)|SFp1/SFpL| | 0.34 | 0.085 |
| (12)SFp2 | −0.87 | −0.48 |
| (13)|SFp2/SFpL| | 0.48 | 0.15 |
| (14)SFp3 | −1.12 | −0.57 |

-continued

| | | |
|---|---|---|
| (15)|SFp3/SFpL| | 0.63 | 0.18 |
| (16)SFn1 | 1.85 | 1.58 |
| (17)SFn2 | 2.78 | 0.73 |
| (18)SFn1/SFnL | 0.66 | 2.16 |
| (19)SFc1/SFc4 | 0.062 | −0.133 |
| (20)SFc2/SFc4 | 0.41 | −0.80 |
| (21)SFc3/SFc4 | 0.63 | 0.18 |
| (22)Rce1/dce1 | 7.7 | 5.1 |
| (23)Rce2/dce2 | 5.8 | 6.7 |
| (24)|($\theta g$, F)ce1p-($\theta g$, F)ce1n|/($\upsilon$dce1p-$\upsilon$dce1n) | 0.00057226 | 0.00039605 |
| (25)|($\theta g$, F)ce2p-($\theta g$, F)ce2n|/($\upsilon$dce2p-$\upsilon$dce2n) | 0.00029808 | 0.00033550 |
| (26)1/(fce1p × $\upsilon$dce1p) + 1/(fce1n × $\upsilon$dce1n) | −0.000082 | −0.000072 |
| (27)1/(fce2p × $\upsilon$dce2p) + 1/(fce2n × $\upsilon$dce2n) | −0.000040 | −0.000161 |
| (28)dc1/dc4 | 1.924 | 2.115 |
| (29)dc2/dc4 | 1.910 | 1.504 |
| (30)dc3/dc4 | 1.245 | 1.200 |
| (31)dc4/dG1 | 0.163 | 0.170 |
| (32)fp1/fpL | 1.118 | 0.795 |
| (33)fp2/fpL | 0.967 | 0.863 |
| (34)fp3/fpL | 1.052 | 0.857 |
| (35)|fn1/fnL| | 0.943 | 1.508 |
| (36)fc4/fc1 | −0.013 | 0.175 |
| (37)fc4/fc2 | 0.173 | −0.496 |
| (38)|fc4/fc3| | 0.951 | 1.167 |
| (39)RpLo/dpL | 7.857 | 7.305 |
| (40)$\upsilon$dni | 52.64000 | 51.47000 |
| (1B)($\theta g$, F)ni | 0.56309 | 0.55201 |
| (41)$\upsilon$dpj | 94.93000 | 94.93000 |
| (42)($\theta g$, F)pj | 0.53406 | 0.54446 |
| (43)fG1/fw | 13.587 | 13.494 |
| (44)fG1/ft | 0.380 | 0.377 |
| (45)|fG1/fG2| | 7.68 | 7.50 |
| (46)fG1/$\Delta$G2 | 1.398 | 1.338 |
| (47)($\beta$2t/$\beta$2w)/(ft/fw) | 1.25 | 1.17 |
| (48)|fG2/fw| | 1.770 | 1.800 |
| (49)|fG2/ft| | 0.049 | 0.050 |
| (50)fG2L1/fG2 | 1.264 | 1.536 |
| (51)|$\beta$2w| | 0.178 | 0.174 |
| (52)|$\beta$2t| | 7.950 | 7.287 |
| (53)($\beta$Lt/$\beta$Lw)/(ft/fw) | 0.022 | 0.024 |
| (54)($\beta$3t/$\beta$3w)/(ft/fw) | 0.014 | 0.017 |
| (55)fG3/fw | 9.424 | 9.175 |
| (56)fG3/ft | 0.263 | 0.257 |
| (57)|fG3/fG2| | 5.324 | 5.099 |
| (58)fG3L1/fG3 | 0.778 | 0.934 |
| (59)|fG3n/fG3L1| | | |
| Negative lens1 | 3.912 | 4.268 |
| Negative lens2 | 1.021 | 0.893 |
| (60)$\upsilon$dG3pmax | 94.930 | 94.930 |
| (61)($\theta g$, F)G3pmin | 0.53406 | 0.53406 |
| (62)$\upsilon$dG5pmax-$\upsilon$dG5nmin | 48.310 | 48.310 |
| (63)ndG5nmax-ndG5pmin | 0.377 | 0.377 |
| (64A)fG4/fw | 5.669 | 5.868 |
| (64B)|fG4/fw| | — | — |
| (65A)fG4/ft | 0.158 | 0.164 |
| (65B)|fG4/ft| | — | — |
| (66)$\beta$4z/$\beta$4w | | |
| (67)$\upsilon$dG4pmax | 94.930 | 94.930 |
| (68)($\theta g$, F)G4pmin | 0.534 | 0.534 |
| (69A)|FSw| | 0.900 | 0.903 |
| (69B)|FSw| | — | — |
| (70A)|FSt| | 0.851 | 0.865 |
| (70B)|FSt| | — | — |
| (71A)$\beta$G5 | 0.965 | 0.971 |
| (71B)$\beta$G5 | — | — |
| (72)$\upsilon$dG4nmax | — | — |
| (73)($\theta g$, F)G4nmin | — | — |

| | Example5 | Example6 |
|---|---|---|
| (4)$\upsilon$ds1pmax-$\upsilon$ds1nmin | 45.3 | 47.6 |
| (5)$\upsilon$ds2pmax-$\upsilon$ds2nmin | 42.3 | 41.7 |
| (6)($\theta g$, F)s1pmin-($\theta g$, F)s1nmax | −0.01795 | −0.02185 |
| (7)($\theta g$, F)s2pmin-($\theta g$, F)s2nmax | −0.01261 | −0.01323 |
| (8)(SFp2 + SFp3) × 0.5 | −0.67 | −1.20 |

-continued

| | | |
|---|---|---|
| (9)SFp1 | −0.79 | −0.48 |
| (10)SFpL | −2.08 | −1.56 |
| (11)|SFp1/SFPL| | 0.38 | 0.31 |
| (12)SFp2 | −0.58 | −0.89 |
| (13)|SFp2/SFPL| | 0.28 | 0.57 |
| (14)SFp3 | −0.75 | −1.51 |
| (15)|SFp3/SFpL| | 0.36 | 0.97 |
| (16)SFn1 | 2.51 | 1.49 |
| (17)SFn2 | 1.12 | 4.58 |
| (18)SFn1/SFnL | 2.23 | 0.33 |
| (19)SFc1/SFc4 | 0.274 | −0.178 |
| (20)SFc2/SFc4 | −0.31 | 0.57 |
| (21)SFc3/SFc4 | 0.36 | 1.23 |
| (22)Rce1/dce1 | 6.1 | 6.4 |
| (23)Rce2/dce2 | 7.9 | 5.6 |
| (24)|($\theta g$, F)ce1p-($\theta g$, F)ce1n|/($\upsilon$dce1p-$\upsilon$dce1n) | 0.00039605 | 0.00045942 |
| (25)|($\theta g$, F)ce2p-($\theta g$, F)ce2n|/($\upsilon$dce2p-$\upsilon$dce2n) | 0.00029808 | 0.00031714 |
| (26)1/(fce1p × $\upsilon$dce1p) + 1/(fce1n × $\upsilon$dce1n) | −0.000057 | −0.000094 |
| (27)1/(fce2p × $\upsilon$dce2p) + 1/(fce2n × $\upsilon$dce2n) | −0.000105 | −0.000019 |
| (28)dc1/dc4 | 2.023 | 2.099 |
| (29)dc2/dc4 | 1.741 | 1.098 |
| (30)dc3/dc4 | 1.279 | 1.431 |
| (31)dc4/dG1 | 0.163 | 0.175 |
| (32)fp1/fpL | 1.035 | 1.166 |
| (33)fp2/fpL | 1.012 | 1.909 |
| (34)fp3/fpL | 1.021 | 1.135 |
| (35)|fn1/fnL| | 1.443 | 0.659 |
| (36)fc4/fc1 | 0.100 | −0.054 |
| (37)fc4/fc2 | −0.251 | 0.524 |
| (38)|fc4/fc3| | 0.980 | 0.261 |
| (39)RpLo/dpL | 8.978 | 6.866 |
| (40)$\upsilon$dni | 52.64000 | 53.21000 |
| (1B)($\theta g$, F)ni | 0.55201 | 0.55591 |
| (41)$\upsilon$dpj | 94.93000 | 94.93000 |
| (42)($\theta g$, F)pj | 0.54000 | 0.53406 |
| (43)fG1/fw | 14.281 | 13.521 |
| (44)fG1/ft | 0.399 | 0.378 |
| (45)|fG1/fG2| | 8.64 | 8.38 |
| (46)fG1/$\Delta$G2 | 1.300 | 1.406 |
| (47)($\beta$2t/$\beta$2w)/(ft/fw) | 1.41 | 0.92 |
| (48)|fG2/fw| | 1.653 | 1.613 |
| (49)|fG2/ft| | 0.046 | 0.045 |
| (50)fG2L1/fG2 | 1.201 | 1.273 |
| (51)|$\beta$2w| | 0.147 | 0.163 |
| (52)|$\beta$2t| | 7.448 | 5.339 |
| (53)($\beta$Lt/$\beta$Lw)/(ft/fw) | 0.020 | 0.030 |
| (54)($\beta$3t/$\beta$3w)/(ft/fw) | 0.015 | 0.037 |
| (55)fG3/fw | 7.991 | 7.690 |
| (56)fG3/ft | 0.223 | 0.215 |
| (57)|fG3/fG2| | 4.835 | 4.768 |
| (58)fG3L1/fG3 | 0.695 | 0.859 |
| (59)|fG3n/fG3L1| | | |
| Negative lens1 | 2.894 | 4.169 |
| Negative lens2 | 1.203 | 1.157 |
| (60)$\upsilon$dG3pmax | 94.930 | 81.610 |
| (61)($\theta g$, F)G3pmin | 0.53406 | 0.53745 |
| (62)$\upsilon$dG5pmax-$\upsilon$dG5nmin | 48.310 | 8.080 |
| (63)ndG5nmax-ndG5pmin | 0.377 | 0.351 |
| (64A)fG4/fw | 5.285 | 5.814 |
| (64B)|fG4/fw| | — | — |
| (65A)fG4/ft | 0.148 | 0.163 |
| (65B)|fG4/ft| | — | — |
| (66)$\beta$4z/$\beta$4w | | |
| (67)$\upsilon$dG4pmax | 94.930 | 94.930 |
| (68)($\theta g$, F)G4pmin | 0.534 | 0.534 |
| (69A)|FSw| | 0.900 | 0.880 |
| (69B)|FSw| | — | — |
| (70A)|FSt| | 0.856 | 0.910 |
| (70B)|FSt| | — | — |
| (71A)$\beta$G5 | 0.978 | 0.987 |
| (71B)$\beta$G5 | — | — |
| (72)$\upsilon$dG4nmax | — | — |
| (73)($\theta g$, F)G4nmin | — | — |

| | Example7 | Example8 |
|---|---|---|

-continued

| | | |
|---|---|---|
| (4)υds1pmax-υds1nmin | 45.3 | 45.3 |
| (5)υds2pmax-υds2nmin | 39.4 | 40.3 |
| (6)(θg, F)s1pmin-(θg, F)s1nmax | −0.01795 | −0.01795 |
| (7)(θg, F)s2pmin-(θg, F)s2nmax | −0.00926 | −0.01040 |
| (8)(SFp2 + SFp3) × 0.5 | −1.28 | −1.10 |
| (9)SFp1 | −0.54 | −0.42 |
| (10)SFpL | −2.14 | −1.74 |
| (11)|SFp1/SFPL| | 0.25 | 0.24 |
| (12)SFp2 | −1.11 | −1.11 |
| (13)|SFp2/SFPL| | 0.52 | 0.63 |
| (14)SFp3 | −1.44 | −1.09 |
| (15)|SFp3/SFpL| | 0.67 | 0.62 |
| (16)SFn1 | 3.06 | 1.31 |
| (17)SFn2 | 1.89 | 2.94 |
| (18)SFn1/SFnL | 1.621 | 0.45 |
| (19)SFc1/SFc4 | 0.121 | −0.290 |
| (20)SFc2/SFc4 | 0.66 | 0.70 |
| (21)SFc3/SFc4 | 0.67 | 0.62 |
| (22)Rce1/dce1 | 8.7 | 6.2 |
| (23)Rce2/dce2 | 6.8 | 5.5 |
| (24)|(θg, F)ce1p-(θg, F)ce1n)|/(υdce1p-υdce1n) | 0.00039605 | 0.00039605 |
| (25)|(θg, F)ce2p-(θg, F)ce2n)|/(υdce2p-υdce2n) | 0.00023490 | 0.00025839 |
| (26)1/(fce1p × υdce1p) + 1/(fce1n × υdce1n) | −0.000024 | −0.000093 |
| (27)1/(fce2p × υdce2p) + 1/(fce2n × υdce2n) | −0.000082 | −0.000045 |
| (28)dc1/dc4 | 1.739 | 2.106 |
| (29)dc2/dc4 | 1.669 | 1.598 |
| (30)dc3/dc4 | 1.281 | 1.267 |
| (31)dc4/dG1 | 0.174 | 0.164 |
| (32)fp1/fpL | 0.722 | 0.994 |
| (33)fp2/fpL | 0.733 | 0.979 |
| (34)fp3/fpL | 0.812 | 1.038 |
| (35)|fn1/fnL| | 1.702 | 0.814 |
| (36)fc4/fc1 | 0.463 | −0.080 |
| (37)fc4/fc2 | −0.217 | 0.116 |
| (38)|fc4/fc3| | 1.231 | 0.964 |
| (39)RpLo/dpL | 10.531 | 7.038 |
| (40)υdni | 55.53000 | 54.68000 |
| (1B)(θg, F)ni | 0.55201 | 0.55201 |
| (41)υdpj | 94.93000 | 94.93000 |
| (42)(θg, F)pj | 0.53406 | 0.53406 |
| (43)fG1/fw | 14.686 | 12.943 |
| (44)fG1/ft | 0.267 | 0.259 |
| (45)|fG1/fG2| | 9.92 | 7.88 |
| (46)fG1/ΔG2 | 1.355 | 1.381 |
| (47)(β2t/β2w)/(ft/fw) | 0.95 | 1.35 |
| (48)|fG2/fw| | 1.480 | 1.643 |
| (49)|fG2/ft| | 0.027 | 0.033 |
| (50)fG2L1/fG2 | 1.634 | 1.391 |
| (51)|β2w| | 0.134 | 0.173 |
| (52)|β2t| | 7.015 | 11.672 |
| (53)(βLt/βLw)/(ft/fw) | 0.019 | 0.015 |
| (54)(β3t/β3w)/(ft/fw) | 0.019 | 0.005 |
| (55)fG3/fw | 3.762 | 7.985 |
| (56)fG3/ft | 0.068 | 0.160 |
| (57)|fG3/fG2| | 2.542 | 4.861 |
| (58)fG3L1/fG3 | 1.292 | 0.609 |
| (59)|fG3n/fG3L1| | | |
| Negative lens1 | 0.906 | 2.223 |
| Negative lens2 | 1.340 | 1.041 |
| (60)υdG3pmax | 94.930 | 94.930 |
| (61)(θg, F)G3pmin | 0.53406 | 0.53406 |
| (62)υdG5pmax-υdG5nmin | 33.920 | 8.080 |
| (63)ndG5nmax-ndG5pmin | 0.418 | 0.351 |
| (64A)fG4/fw | — | 4.419 |
| (64B)|fG4/fw| | 2.981 | — |
| (65A)fG4/ft | — | 0.088 |
| (65B)|fG4/ft| | 0.054 | — |
| (66)β4z/β4w | | |
| (67)υdG4pmax | — | 94.930 |
| (68)(θg, F)G4pmin | — | 0.534 |
| (69A)|FSw| | — | 0.997 |
| (69B)|FSw| | 2.529 | — |
| (70A)|FSt| | — | 0.750 |
| (70B)|FSt| | 2.494 | — |
| (71A)βG5 | — | 1.015 |
| (71B)βG5 | 0.433 | — |
| (72)υdG4nmax | 59.3800 | — |
| (73)(θg, F)G4nmin | 0.5434 | — |

The variable magnification optical system of the present embodiment is especially suitable for an optical system for security camera. However, the variable magnification optical system of the present embodiment can be used for an optical system for a car-mounted camera, an optical system for a single-lens mirrorless camera, or an optical system for a compact digital camera.

Figure 17:
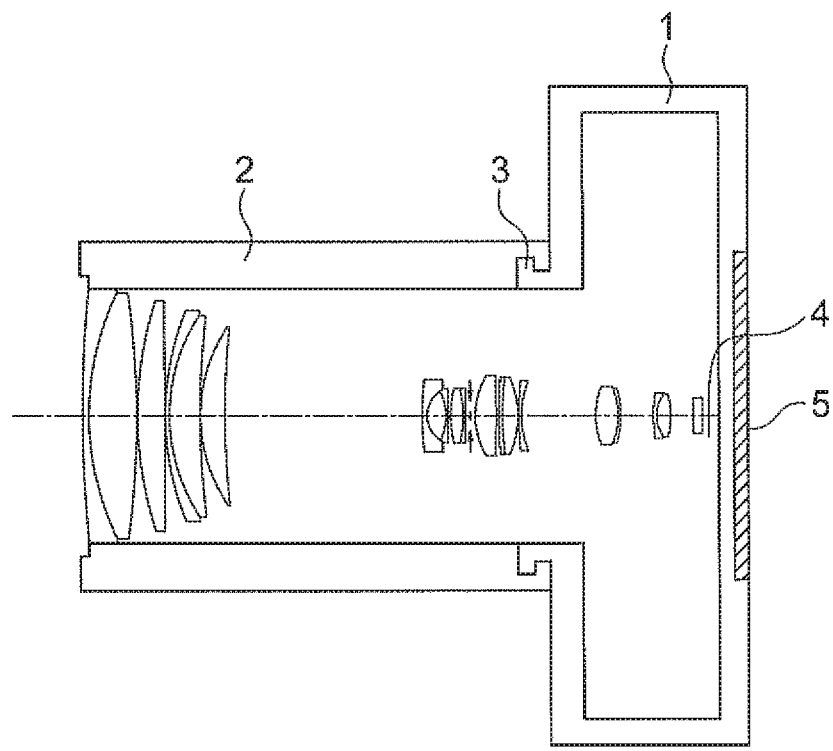
FIG. 17 is a cross-sectional view of an image pickup apparatus.

FIG. 17 is a cross-sectional view of a single-lens mirrorless camera as an electronic image pickup apparatus. In FIG. 17, a photographic optical system 2 is disposed inside a lens barrel of a single-lens mirrorless camera 1. A mount portion 3 enables the photographic optical system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the photographic optical system 2 of the single-lens mirrorless camera 1, the variable magnification optical system described in any one of the examples from the first example to the eight example is to be used.

Figure 18:
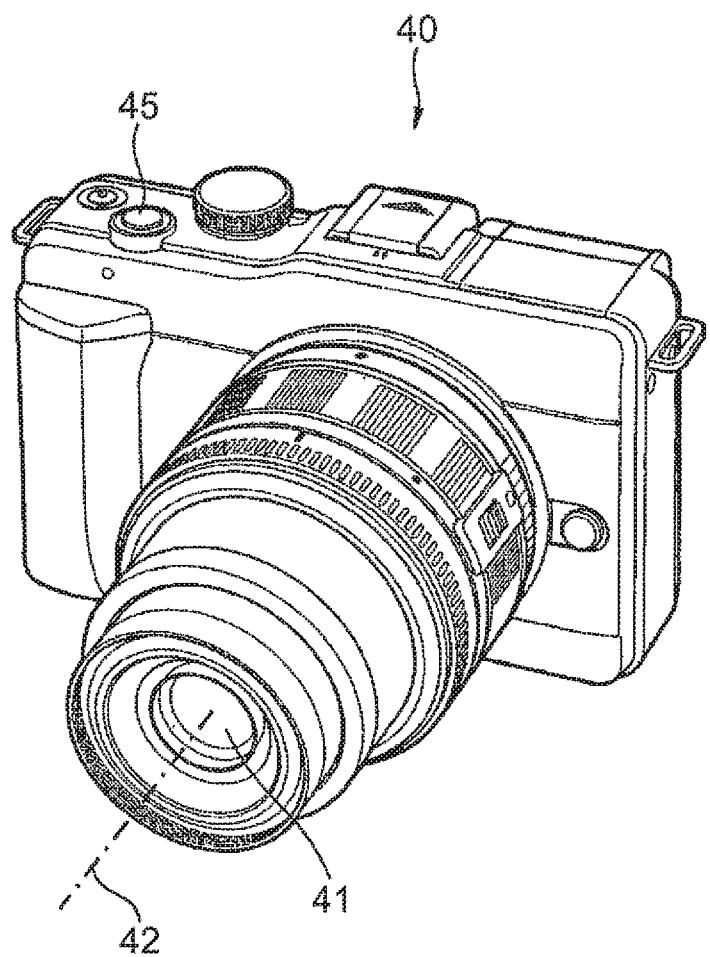
FIG. 18 is a front perspective view of the image pickup apparatus.
Figure 19:
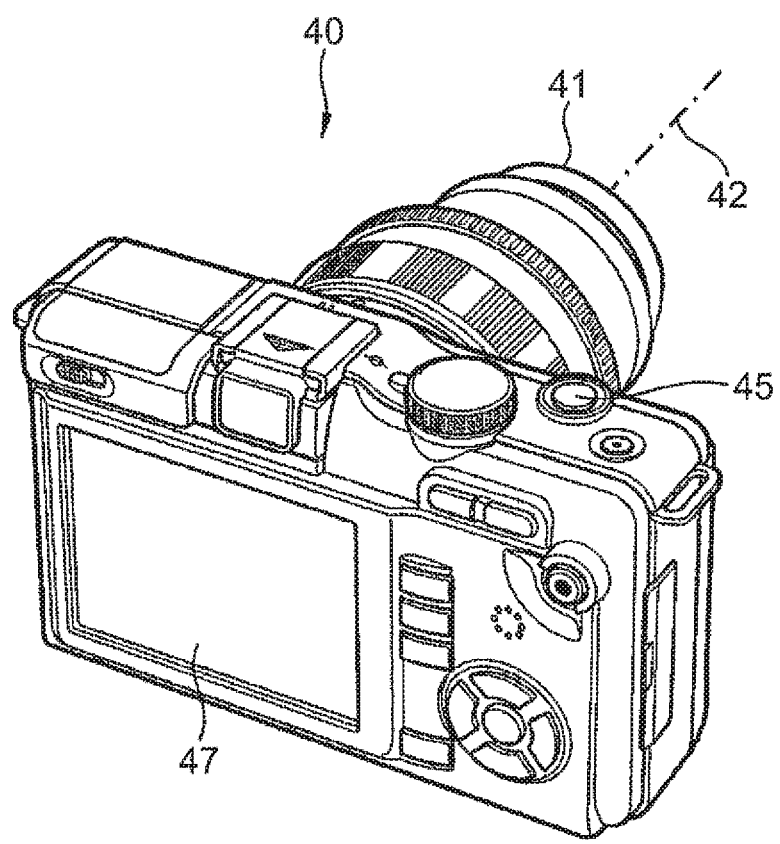
FIG. 19 is a rear perspective view of the image pickup apparatus.

FIG. 18 and FIG. 19 are conceptual diagrams of an arrangement of the image pickup apparatus. FIG. 18 is a front perspective view of a digital camera 40 as the image pickup apparatus, and FIG. 19 is a rear perspective view of the digital camera 40. The variable magnification optical system according to the present example is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the variable magnification optical system according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a storage means.

Figure 20:
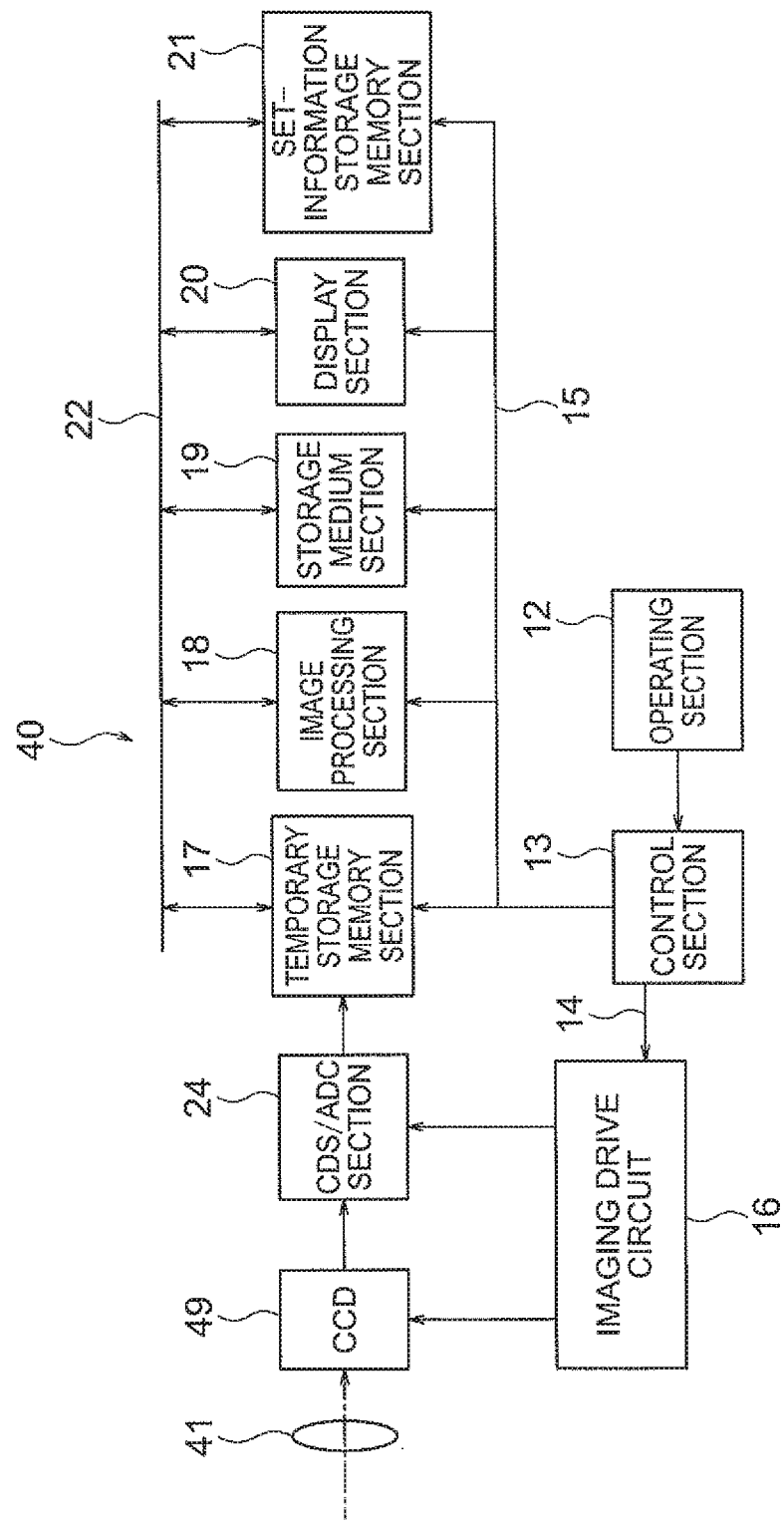
FIG. 20 is a block diagram of an internal circuit of main components of the image pickup apparatus.

FIG. 20 is a structural block diagram of an internal circuit of main components of the digital camera 40. In the following description, the processing means described above includes for instance, a CDS/ADC section 24, a temporary storage memory 117, and an image processing section 18, and a storage means consists of a storage medium section 19 for example.

As shown in FIG. 20, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image formed by the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays photographed RAW data, image data and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

By using the variable magnification optical system according to the example as the photographic optical system. 41, it is possible to let the digital camera 40 configured in such manner to be an image pickup apparatus which is a small size and able to obtain an image with high quality.

The present invention can have various modified examples without departing from the scope of the invention. Moreover, shapes of lenses and the number of lenses are not necessarily restricted to the shapes and the number of lenses indicated in the examples. In the examples described heretofore, the cover glass C may not be disposed necessarily. A lens that is not shown in the diagrams of the examples described above, and that does not have a refractive power practically may be disposed in a lens unit or outside the lens unit.

According to the present invention, it is possible to provide a variable magnification optical system having a small size and a high imaging performance, in which the chromatic aberration is corrected favorably, while having a small front-lens diameter, and while shortening the overall length of the optical system, and an image pickup apparatus using the same.

The present invention is suitable for a variable magnification optical system having a small size and a high imaging performance, in which the chromatic aberration is corrected favorably, while having a small front-lens diameter, and while shortening the overall length of the optical system, and for an image pickup apparatus using the same.

What is claimed is:

1. A variable magnification optical system which includes a plurality of lens elements, the variable magnification optical system comprising in order from an object side:
    a first lens unit having a positive refractive power;
    a second lens unit having a negative refractive power;
    a third lens unit having a positive refractive power; and
    at least one other lens unit,
    wherein:
    an aperture stop is either positioned between the second lens unit and the third lens unit, or positioned in the third lens unit,
    at a time of zooming from a wide angle end to a telephoto end, the first lens unit is fixed, the second lens unit moves toward an image-plane side, and at least one lens unit positioned on an image side of the aperture stop moves,
    the first lens unit includes at least four positive lens elements and N negative lens elements,
    all the negative lens elements in the first lens unit satisfy the following conditional expression (1A),
    a first positive lens element, among all the positive lens elements in the first lens unit, is positioned nearest to object, and satisfies the following conditional expression (2A),
    a second positive lens element, among the positive lens elements in the first lens unit, is positioned nearest to the first positive lens element, and satisfies the following conditional expression (2B),
    a third positive lens element, among the positive lens elements in the first lens unit, is positioned nearest to the second positive lens element, and satisfies the following conditional expression (2C),
    an image-side positive lens element, among all the positive lens elements in the first lens unit, is positioned nearest to image, and satisfies the following conditional expression (3):

$$0.5200 < (\theta g, F)ni < 0.5640 \tag{1A},$$

$$0.5200 < (\theta g, F)p1 < 0.5460 \tag{2A},$$

$$0.5200 < (\theta g, F)p2 < 0.5460 \tag{2B},$$

$$0.5200 < (\theta g, F)p3 < 0.5460 \tag{2C},$$

and $$0.5200 < (\theta g, F)pL < 0.5600 \tag{3},$$

where:

2≤N, (θg, F)ni denotes a partial dispersion ratio of an i$^{th}$ negative lens element (i=1~N), (θg, F)p1 denotes a partial dispersion ratio of the first positive lens element, (θg, F)p2 denotes a partial dispersion ratio of the second positive lens element, (θg, F)p3 denotes a partial dispersion ratio of the third positive lens element, (θg, F)pL denotes a partial dispersion ratio of the image-side positive lens element, (θg, F)=(ng−nF)/(nF−nC), ng denotes a refractive index for a g-line, nF denotes a refractive index for an F-line, nC denotes a refractive index for a C-line, and each of the plurality of lens elements is a lens having a medium of a refractive index higher than 1 filled between an object-side surface and an image-side surface, and not having a refracting surface between the object-side surface and the image-side surface.

2. The variable magnification optical system according to claim 1, wherein the following conditional expression (8) is satisfied:

$$SFpL<(SFp2+SFp3)\times 0.5<SFp1<0 \qquad (8),$$

where:

SFp1=(Rp1o+Rp1i)/(Rp1o−Rp1i),

SFp2=(Rp2o+Rp2i)/(Rp2o−Rp2i),

SFp3=(Rp3o+Rp3i)/(Rp3o−Rp3i),

SFpL=(RpLo+RpLi)/(RpLo−RpLi),

Rp1o denotes a radius of curvature of an object-side surface of the first positive lens element, Rp1i denotes a radius of curvature of an image-side surface of the first positive lens element, Rp2o denotes a radius of curvature of an object-side surface of the second positive lens element, Rp2i denotes a radius of curvature of an image-side surface of the second positive lens element, Rp3o denotes a radius of curvature of an object-side surface of the third positive lens element, Rp3i denotes a radius of curvature of an image-side surface of the third positive lens element, RpLo denotes a radius of curvature of an object-side surface of the image-side positive lens element, and RpLi denotes a radius of curvature of an image-side surface of the image-side positive lens element.

3. The variable magnification optical system according to claim 1, wherein the following conditional expressions (9), (10), and (11) are satisfied:

$$SFp1<0 \qquad (9),$$

$$SFpL<0 \qquad (10),$$

and $$0.05<|SFp1/SFpL|<0.60 \qquad (11),$$

where:

SFp1=(Rp1o+Rp1i)/(Rp1o−Rp1i),

SFpL=(RpLo+RpLi)/(RpLo−RpLi),

Rp1o denotes a radius of curvature of an object-side surface of the first positive lens element, Rp1i denotes a radius of curvature of an image-side surface of the first positive lens element, RpLo denotes a radius of curvature of an object-side surface of the image-side positive lens element, and RpLi denotes a radius of curvature of an image-side surface of the image-side positive lens element.

4. The variable magnification optical system according to claim 1, wherein the following conditional expressions (10), (12), and (13) are satisfied:

$$SFpL<0 \qquad (10),$$

$$SFp2<0 \qquad (12),$$

and $$0.05<|SFp2/SFpL|<0.95 \qquad (13),$$

where:

SFp2=(Rp2o+Rp2i)/(Rp2o−Rp2i),

SFpL=(RpLo+RpLi)/(RpLo−RpLi),

Rp2o denotes a radius of curvature of an object-side surface of the second positive lens element, Rp2i denotes a radius of curvature of an image-side surface of the second positive lens element, RpLo denotes a radius of curvature of an object-side surface of the image-side positive lens element, and RpLi denotes a radius of curvature of an image-side surface of the image-side positive lens element.

5. The variable magnification optical system according to claim 1, wherein the following conditional expressions (10), (14), and (15) are satisfied:

$$SFpL<0 \qquad (10),$$

$$SFp3<0 \qquad (14),$$

and $$0.05<|SFp3/SFpL|<1.4 \qquad (15),$$

where:

SFp3=(Rp3o+Rp3i)/(Rp3o−Rp3i),

SFpL=(RpLo+RpLi)/(RpLo−RpLi),

Rp3o denotes a radius of curvature of an object-side surface of the third positive lens element, Rp3i denotes a radius of curvature of an image-side surface of the third positive lens element, RpLo denotes a radius of curvature of an object-side surface of the image-side positive lens element, and RpLi denotes a radius of curvature of an image-side surface of the image-side positive lens element.

6. The variable magnification optical system according to claim 1, wherein:

the first lens unit includes a first negative lens element and an image-side negative lens element, the first negative lens element is positioned nearest to object, among all the negative lens elements in the first lens unit, the image-side negative lens element is positioned nearest to image, among all the negative lens elements in the first lens unit, and the following conditional expressions (16), (17), and (18) are satisfied:

$$0<SFn1 \qquad (16),$$

$$0<SFnL \qquad (17),$$

and $$0.2<SFn1/SFnL<2.5 \qquad (18),$$

where:

SFn1=(Rn1o+Rn1i)/(Rn1o−Rn1i),

SFnL=(RnLo+RnLi)/(RnLo−RnLi),

Rp1o denotes a radius of curvature of an object-side surface of the first negative lens element, Rn1i denotes a radius of curvature of an image-side surface of the first negative lens element, RnLo denotes a radius of curvature of an object-side surface of the image-side negative lens element, and RnLi denotes a radius of curvature of an image-side surface of the image-side negative lens element.

7. The variable magnification optical system according to claim 1, wherein:

the first lens unit includes a plurality of lens components, and includes in order from the object side, a first lens component, a second lens component, a third lens component, and a fourth lens component, the first lens component includes one of the negative lens elements and the first positive lens element, the second lens component either includes the second positive lens element or includes another one of the negative lens elements and the second positive lens element, the third lens component either includes the third positive lens element or includes said another one of the negative lens elements and the third positive lens element, the fourth lens component includes the image-side positive lens element, and the following conditional expression (19) is satisfied:

$$-0.5 < SFc1/SFc4 < 0.4 \quad (19),$$

where:
$SFc1 = (Rc1o + Rc1i)/(Rc1o - Rc1i)$,
$SFc4 = (Rc4o + Rc4i)/(Rc4o - Rc4i)$, Rc1o denotes a radius of curvature of an object-side surface of the first lens component, Rc1i denotes a radius of curvature of an image-side surface of the first lens component, Rc4o denotes a radius of curvature of an object-side surface of the fourth lens component, Rc4i denotes a radius of curvature of an image-side surface of the fourth lens component, and each of the plurality of the lens components is one of a single lens and a cemented lens.

8. The variable magnification optical system according to claim 1, wherein:

the first lens unit includes a plurality of lens components, and includes in order from the object side, a first lens component, a second lens component, a third lens component, and a fourth lens component, the first lens component includes one of the negative lens elements and the first positive lens element, the second lens component either includes the second positive lens element or includes another one of the negative lens elements and the second positive lens element, the third lens component either includes the third positive lens element or includes said another one of the negative lens elements and the third positive lens element, the fourth lens component includes the image-side positive lens element, and the following conditional expression (20) is satisfied:

$$-0.90 < SFc2/SFc4 < 0.95 \quad (20),$$

where:
$SFc2 = (Rc2o + Rc2i)/(Rc2o - Rc2i)$,
$SFc4 = (Rc4o + Rc4i)/(Rc4o - Rc4i)$, Rc2o denotes a radius of curvature of an object-side surface of the second lens component, Rc2i denotes a radius of curvature of an image-side surface of the second lens component, Rc4o denotes a radius of curvature of an object-side surface of the fourth lens component, Rc4i denotes a radius of curvature of an image-side surface of the fourth lens component, and each of the plurality of the lens components is one of a single lens and a cemented lens.

9. The variable magnification optical system according to claim 1, wherein:

the first lens unit includes a plurality of lens components, and includes in order from the object side, a first lens component, a second lens component, a third lens component, and a fourth lens component, the first lens component includes one of the negative lens elements and the first positive lens element, the second lens component either includes the second positive lens element or includes another one of the negative lens elements and the second positive lens element, the third lens component either includes the third positive lens element or includes said another one of the negative lens elements and the third positive lens element, the fourth lens component includes the image-side positive lens element, and the following conditional expression (21) is satisfied:

$$0.10 < SFc3/SFc4 < 1.60 \quad (21),$$

where:
$SFc3 = (Rc3o + Rc3i)/(Rc3o - Rc3i)$,
$SFc4 = (Rc4o + Rc4i)/(Rc4o - Rc4i)$, Rc3o denotes a radius of curvature of an object-side surface of the third lens component, Rc3i denotes a radius of curvature of an image-side surface of the third lens component, Rc4o denotes a radius of curvature of an object-side surface of the fourth lens component, Rc4i denotes a radius of curvature of an image-side surface of the fourth lens component, and each of the plurality of the lens components is one of a single lens and a cemented lens.

10. The variable magnification optical system according to claim 1, wherein:

the first lens unit consists of a first sub lens unit and a second sub lens unit, the first sub lens unit includes a cemented lens of one of the negative lens elements and one of the positive lens elements, and the second sub lens unit includes a cemented lens of another one of the negative lens elements and another one positive lens elements.

11. The variable magnification optical system according to claim 1, wherein:

the first lens unit includes a first cemented lens and a second cemented lens, the first cemented lens includes one of the negative lens elements and one of the positive lens elements, the second cemented lens includes another one of the negative lens elements and another one of the positive lens elements, and the following conditional expressions (22) and (23) are satisfied:

$$4.0 < Rce1/dce1 < 9.5 \quad (22),$$

and $$4.0 < Rce2/dce2 < 9.0 \quad (23),$$

where:
Rce1 denotes a radius of curvature of a cemented surface of the first cemented lens,
Rce2 denotes a radius of curvature of a cemented surface of the second cemented lens,
dce1 denotes an axial thickness of the first cemented lens, and
dce2 denotes an axial thickness of the second cemented lens.

12. The variable magnification optical system according to claim 1, wherein:
the first lens unit includes a first cemented lens and a second cemented lens,
the first cemented lens includes one of the negative lens elements and one of the positive lens elements,
the second cemented lens includes another one of the negative lens elements and another one of the positive lens elements, and
the following conditional expressions (24) and (25) are satisfied:

$$0.000200 < |(\theta g, F)\ ce1p - (\theta g, F)\ ce1n|/(vdce1p - vdce1n) < 0.000700 \quad (24),$$

and $$0.000200 < |(\theta g, F)\ ce2p - (\theta g, F)\ ce2n|/(vdce2p - vdce2n) < 0.000700 \quad (25),$$

where:
($\theta g$, F)ce1p denotes a partial dispersion ratio of the positive lens element in the first cemented lens,
($\theta g$, F)ce1n denotes a partial dispersion ratio of the negative lens element in the first cemented lens,
vdce1p denotes an Abbe number for the positive lens element in the first cemented lens,
vdce1n denotes an Abbe number for the negative lens element in the first cemented lens,
($\theta g$, F)ce2p denotes a partial dispersion ratio of the positive lens element in the second cemented lens,
($\theta g$, F)ce2n denotes a partial dispersion ratio of the negative lens element in the second cemented lens,
vdce2p denotes an Abbe number for the positive lens element in the second cemented lens, and
vdce2n denotes an Abbe number for the negative lens element in the second cemented lens.

13. The variable magnification optical system according to claim 1, wherein:
the first lens unit includes a first cemented lens and a second cemented lens,
the first cemented lens includes one of the negative lens elements and one of the positive lens elements,
the second cemented lens includes another one of the negative lens elements and another one of the positive lens elements, and
the following conditional expressions (26) and (27) are satisfied:

$$-0.00030 < 1/(fce1p \times vdce1p) + 1/(fce1n \times vdce1n) < -0.000010 \quad (26),$$

and $$-0.00030 < 1/(fce2p \times vdce2p) + 1/(fce2n \times vdce2n) < -0.000005 \quad (27),$$

where:
fce1p denotes a focal length of the positive lens element in the first cemented lens,
fce1n denotes a focal length of the negative lens element in the first cemented lens,
vdce1p denotes an Abbe number for the positive lens element in the first cemented lens,
vdce1n denotes an Abbe number for the negative lens element in the first cemented lens,
fce2p denotes a focal length of the positive lens element in the second cemented lens,
fce2n denotes a focal length of the negative lens element in the second cemented lens,
vdce2p denotes an Abbe number for the positive lens element in the second cemented lens, and
vdce2n denotes an Abbe number for the negative lens element in the second cemented lens.

14. The variable magnification optical system according to claim 1, wherein:
the first lens unit includes a plurality of lens components, and includes in order from the object side, a first lens component, a second lens component, a third lens component, and a fourth lens component,
the first lens component includes one of negative lens elements and the first positive lens element,
the second lens component either includes the second positive lens element or includes another one of the negative lens elements and the second positive lens element,
the third lens component either includes the third positive lens element or includes said another one of the negative lens elements and the third positive lens element,
the fourth lens component includes the image-side positive lens element, and
the following conditional expressions (28), (29), (30), and (31) are satisfied:

$$1.5 < dc1/dc4 < 2.5 \quad (28),$$

$$0.8 < dc2/dc4 < 2.5 \quad (29),$$

$$0.8 < dc3/dc4 < 2.0 \quad (30),$$

and $$0.10 < dc4/dG1 < 0.22 \quad (31),$$

where:
dc1 denotes a thickness on an optical axis of the first lens component,
dc2 denotes a thickness on the optical axis of the second lens component,
dc3 denotes a thickness on the optical axis of the third lens component,
dc4 denotes a thickness on the optical axis of the fourth lens component,
dG1 denotes a thickness on the optical axis of the first lens unit, and
each of the plurality of lens components is one of a single lens and a cemented lens.

15. The variable magnification optical system according to claim 1, wherein the following conditional expressions (32), (33), and (34) are satisfied:

$$0.60 < fp1/fpL < 1.60 \quad (32),$$

$$0.60 < fp2/fpL < 2.4 \quad (33),$$

and $$0.70 < fp3/fpL < 1.60 \quad (34),$$

where:
fp1 denotes a focal length of the first positive lens element, fp2 denotes a focal length of the second positive lens element,
fp3 denotes a focal length of the third positive lens element, and
fpL denotes a focal length of the image-side positive lens element.

16. The variable magnification optical system according to claim 1, wherein:
the first lens unit includes a first negative lens element and an image-side negative lens element,
the first negative lens element is positioned nearest to object, among all the negative lens elements in the first lens unit,
the image-side negative lens element is positioned nearest to image, among all the negative lens elements in the first lens unit, and
the following conditional expression (35) is satisfied:

$$0.40<|fn1/fnL|<1.9 \qquad (35),$$

where:
fn1 denotes a focal length of the first negative lens element, and
fnL denotes a focal length of the image-side negative lens element.

17. The variable magnification optical system according to claim 1, wherein:
the first lens unit includes a plurality of lens components, and includes in order from the object side, a first lens component, a second lens component, a third lens component, and a fourth lens component,
the first lens component includes one of the negative lens elements and the first positive lens element,
the second lens component either includes the second positive lens element or includes another one of the negative lens elements and the second positive lens element,
the third lens component either includes the third positive lens element or includes said another one of the negative lens elements and the third positive lens element,
the fourth lens component includes the image-side positive lens element, and
the following conditional expressions (36), (37), and (38) are satisfied:

$$-0.30<fc4/fc1<0.40 \qquad (36),$$

$$-0.70<fc4/fc2<0.80 \qquad (37),$$

and $$0.10<|fc4/fc3|<1.40 \qquad (38),$$

where:
fc1 denotes a focal length of the first lens component,
fc2 denotes a focal length of the second lens component,
fc3 denotes a focal length of the third lens component,
fc4 denotes a focal length of the fourth lens component, and
each of the plurality of lens components is one of a single lens and a cemented lens.

18. The variable magnification optical system according to claim 1, wherein the following conditional expression (39) is satisfied:

$$5<RpLo/dpL<12 \qquad (39),$$

where:
RpLo denotes a radius of curvature of an object-side surface of the image-side positive lens element, and
dpL denotes a thickness on an optical axis of the image-side positive lens element.

19. The variable magnification optical system according to claim 1, wherein the first lens unit includes at least M number of positive lens elements,
all the negative lens elements in the first lens unit satisfy the following conditional expression (40), and
all the positive lens elements in the first lens unit satisfy the following conditional expressions (41) and (42):

$$43<vdni<65 \qquad (40),$$

$$50<vdpj<100 \qquad (41),$$

and $$0.520<(\theta g,F)pj<0.5500 \qquad (42),$$

where:
4<M,
vdni denotes an Abbe number for the ith negative lens element (i=1~N),
vdpj denotes an Abbe number for a jth positive lens element (i=1~M), and (θg, F)pj denotes a partial dispersion ratio of the jth positive lens element (j =1~M).

20. The variable magnification optical system according to claim 1, wherein the following conditional expression (43) is satisfied:

$$11<fG1/fw<16 \qquad (43),$$

where:
fG1 denotes a focal length of the first lens unit, and
fw denotes a focal length of the overall variable magnification optical system at the wide angle end.

21. The variable magnification optical system according to claim 1, wherein the following conditional expression (44) is satisfied:

$$0.1<fG1/ft<0.6 \qquad (44),$$

where:
fG1 denotes a focal length of the first lens unit, and
ft denotes a focal length of the overall variable magnification optical system at the telephoto end.

22. The variable magnification optical system according to claim 1, wherein the following conditional expression (45) is satisfied:

$$6.0<|fG1/fG2|<11 \qquad (45),$$

where:
fG1 denotes a focal length of the first lens unit, and
fG2 denotes a focal length of the second lens unit.

23. The variable magnification optical system according to claim 1, wherein:
the first lens unit consists of a first negative lens element, the first positive lens element, an image-side negative lens element, the second positive lens element, the third positive lens element, and the image-side positive lens element, in order from the object side,
the first negative lens element is cemented to the first positive lens element, and
the image-side negative lens element is cemented to the second positive lens element.

24. The variable magnification optical system according to claim 1, wherein the following conditional expression (46) is satisfied:

$$1.10<fG1/\Delta G2<1.60 \qquad (46),$$

where:

fG1 denotes a focal length of the first lens unit, and

ΔG2 denotes an amount of movement of the second lens unit from the wide angle end to the telephoto end.

25. The variable magnification optical system according to claim 1, wherein the following conditional expression (47) is satisfied:

$$0.80 < (\beta 2t/\beta 2w)/(ft/fw) < 1.60 \quad (47),$$

where:

β2t denotes a lateral magnification of the second lens unit at a time of infinite object point focusing, at the telephoto end, β2w denotes a lateral magnification of the second lens unit at the time of infinite object point focusing, at the wide angle end, ft denotes a focal length of the overall variable magnification optical system at the telephoto end, and fw denotes a focal length of the overall variable magnification optical system at the wide angle end.

26. The variable magnification optical system according to claim 1, wherein the following conditional expression (48) is satisfied:

$$1.30 < |fG2/fw| < 2.00 \quad (48),$$

where:

fG2 denotes a focal length of the second lens unit, and fw denotes a focal length of the overall variable magnification optical system at the wide angle end.

27. The variable magnification optical system according to claim 1, wherein the following conditional expression (49) is satisfied:

$$0.015 < |fG2/ft| < 0.070 \quad (49),$$

where:

fG2 denotes a focal length of the second lens unit, and ft denotes a focal length of the overall variable magnification optical system at the telephoto end.

28. The variable magnification optical system according to claim 1, wherein:

the second lens unit includes an object-side lens element which is positioned nearest to object, and the following conditional expression (50) is satisfied:

$$0.90 < fG2L1/fG2 < 2.00 \quad (50),$$

where:

fG2L1 denotes a focal length of the object-side lens element in the second lens unit, and fG2 denotes a focal length of the second lens unit.

29. The variable magnification optical system according to claim 1, wherein the following conditional expression (51) is satisfied:

$$0.100 < |\beta 2w| < 0.250 \quad (51),$$

where:

β2w denotes a lateral magnification of the second lens unit at a time of infinite object point focusing, at the wide angle end.

30. The variable magnification optical system according to claim 1, wherein the following conditional expression (52) is satisfied:

$$3.0 < |\beta 2t| < 20 \quad (52),$$

where:

β2t denotes a lateral magnification of the second lens unit at a time of infinite object point focusing, at the telephoto end.

31. The variable magnification optical system according to claim 1, wherein:

the second lens unit consists of four lens elements, and the four lens elements include in order from the object side, a negative lens element, a negative lens element, a positive lens element, and a negative lens element.

32. The variable magnification optical system according to claim 1, wherein:

an image-side lens unit includes the third lens unit and a lens unit positioned on an image side of the third lens unit, and the following conditional expression (53) is satisfied:

$$0 < (\beta Lt/\beta Lw)/(ft/fw) < 0.10 \quad (53),$$

where:

βLt denotes a lateral magnification of the image-side lens unit at a time of infinite object point focusing, at the telephoto end, βLw denotes a lateral magnification of the image-side lens unit at the time of infinite object point focusing, at the wide angle end, ft denotes a focal length of the overall variable magnification optical system at the telephoto end, and fw denotes a focal length of the overall variable magnification optical system at the wide angle end.

33. The variable magnification optical system according to claim 1, wherein the following conditional expression (54) is satisfied:

$$0.001 < (\beta 3t/\beta 3w)/(ft/fw) < 0.80 \quad (54),$$

where:

β3t denotes a lateral magnification of the third lens unit at a time of infinite object point focusing, at the telephoto end, β3w denotes a lateral magnification of the third lens unit at the time of infinite object point focusing, at the wide angle end, ft denotes a focal length of the overall variable magnification optical system at the telephoto end, and fw denotes a focal length of the overall variable magnification optical system at the wide angle end.

34. The variable magnification optical system according to claim 1, wherein the following conditional expression (55) is satisfied:

$$2.5 < fG3/fw < 11.0 \quad (55),$$

where:

fG3 denotes a focal length of the third lens unit, and fw denotes a focal length of the overall variable magnification optical system at the wide angle end.

35. The variable magnification optical system according to claim 1, wherein the following conditional expression (56) is satisfied:

$$0.040 < fG3/ft < 0.40 \quad (56),$$

where:

fG3 denotes a focal length of the third lens unit, and ft denotes a focal length of the overall variable magnification optical system at the telephoto end.

36. The variable magnification optical system according to claim 1, wherein the following conditional expression (57) is satisfied:

$$2.0 < |fG3/fG2| < 6.0 \quad (57),$$

where:

fG2 denotes a focal length of the second lens unit, and fG3 denotes a focal length of the third lens unit.

37. The variable magnification optical system according to claim 1, wherein:
the third lens unit includes an object-side lens element which is positioned nearest to object, and
the following conditional expression (58) is satisfied:

$$0.40<fG3L1/fG3<1.60 \quad (58),$$

where:
fG3L1 denotes a focal length of the object-side lens element in the third lens unit, and
fG3 denotes a focal length of the third lens unit.

38. The variable magnification optical system according to claim 1, wherein:
the third lens unit includes a negative lens element and an object-side lens element which is positioned nearest to object,
the object-side lens element has a positive refractive power, and
the following conditional expression (59) is satisfied:

$$0.50<|fG3n/fG3L1|<3.0 \quad (59),$$

where:
fG3L1 denotes a focal length of the object-side lens element in the third lens unit, and
fG3n denotes a focal length of the negative lens element in the third lens unit.

39. The variable magnification optical system according to claim 1, wherein the following conditional expressions (60) and (61) are satisfied:

$$70<vdG3pmax<100 \quad (60),$$

and $$0.5200<(\theta g,F)\,G3pmin<0.5500 \quad (61),$$

where:
vdG3pmax denotes a maximum Abbe number from among Abbe numbers for positive lens elements in the third lens unit, and
(θg, F)G3pmin denotes a minimum partial dispersion ratio form among partial dispersion ratio of the positive lens elements in the third lens unit.

40. The variable magnification optical system according to claim 1, wherein the third lens unit consists of the aperture stop, a positive lens element, a negative lens element, a positive lens element, and a negative element, in order from the object side.

41. The variable magnification optical system according to claim 1, wherein the third lens unit consists of the aperture stop, a positive lens element, a negative lens element, a positive lens element, and a positive lens element, in order from the object side.

42. The variable magnification optical system according to claim 1, wherein the third lens unit is fixed at the time of zooming.

43. The variable magnification optical system according to claim 1, wherein:
the third lens unit includes a correcting lens unit, and
an image is stabilized by moving the correcting lens unit in a direction perpendicular to an optical axis.

44. The variable magnification optical system according to claim 1, wherein:
the at least one other lens unit includes a fourth lens unit, and
the fourth lens unit includes at least one positive lens element and at least one negative lens element.

45. The variable magnification optical system according to claim 1, wherein:
the at least one other lens unit includes a fourth lens unit, and
only the fourth lens unit moves at the time of focusing.

46. The variable magnification optical system according to claim 1, wherein:
the at least one other lens unit includes a fourth lens unit and a fifth lens unit,
the fifth lens unit consists of two lens elements, and
the two lens elements include a negative lens element and a positive lens element.

47. The variable magnification optical system according to claim 1, wherein:
the at least one other lens unit includes a fourth lens unit and a fifth lens unit,
the fifth lens unit includes in order from the object side, a negative lens element and a positive lens element, and
the following conditional expressions (62) and (63) are satisfied:

$$3<vdG5pmax-vdgG5nmin<60 \quad (62),$$

and $$0.20<ndG5nmax-ndG5pmin<0.45 \quad (63),$$

where:
vdG5pmax denotes a maximum Abbe number from among each Abbe number for each positive lens element in the fifth lens unit,
vdG5nmin denotes a minimum Abbe number from among each Abbe number for each negative lens element in the fifth lens unit,
ndG5pmin denotes a minimum refractive index from among each refractive index of each positive lens elements in the fifth lens unit, and
ndG5nmax denotes a maximum refractive index from among each refractive index of each negative lens elements in the fifth lens unit.

48. The variable magnification optical system according to claim 1, wherein the at least one lens unit positioned on the image side of the aperture stop includes a fourth lens unit having a positive refractive power and a fifth lens unit.

49. The variable magnification optical system according to claim 48, wherein the following conditional expression (64A) is satisfied:

$$3.5<fG4/fw<7.0 \quad (64A),$$

where:
fG4 denotes a focal length of the fourth lens unit, and
fw denotes a focal length of the overall variable magnification optical system at the wide angle end.

50. The variable magnification optical system according to claim 48, wherein the following conditional expression (65A) is satisfied:

$$0.060<fG4/ft<0.250 \quad (65A),$$

where:
fG4 denotes a focal length of the fourth lens unit, and
ft denotes a focal length of the overall variable magnification optical system at the telephoto end.

51. The variable magnification optical system according to claim 48, wherein the following conditional expression (66) is satisfied:

$$1 \neq \beta 4z/\beta 4w \quad (66),$$

where:
β4z denotes a lateral magnification of the fourth lens unit at a time of infinite object point focusing in a predetermined state, β4w denotes a lateral magnification of the fourth lens unit at the time of infinite object point focusing, at the wide angle end, and the predetermined state is a state in which the fourth lens unit is positioned nearest to object, at the time of zooming.

52. The variable magnification optical system according to claim 48, wherein:

the at least one lens unit positioned on the image side of the aperture stop includes a movable lens unit, and the movable lens unit moves toward the object side at a time of start of zooming from the wide angle end, and moves toward the image-plane side from an arbitrary intermediate state to the telephoto end.

53. The variable magnification optical system according to claim 48, wherein the following conditional expressions (67) and (68) are satisfied:

$$75 < \nu dG4pmax < 100 \quad (67),$$

and $$0.5200 < (\theta g, F)\ G4pmin < 0.5500 \quad (68),$$

where:

νdG4pmax denotes a maximum Abbe number from among Abbe numbers for positive lens elements in the fourth lens unit, and (θg, F)G4pmin denotes a minimum partial dispersion ratio from among partial dispersion ratios of the positive lens elements in the fourth lens unit.

54. The variable magnification optical system according to claim 48, comprising:

a focusing unit on an image side of the second lens unit, wherein:

the following conditional expression (69A) is satisfied:

$$0.70 < |FSw| < 1.20 \quad (69A),$$

where:

FSw=(1−βfow×βfow)×βimgw×βimgw,

βfow denotes a lateral magnification of the focusing unit at the wide angle end, βimgw denotes a lateral magnification of a predetermined optical system at the wide angle end, and the predetermined optical system is an optical system which includes all lens units positioned on an image side of the focusing unit.

55. The variable magnification optical system according to claim 48, comprising:

a focusing unit on an image side of the second lens unit, wherein:

the following conditional expression (70A) is satisfied:

$$0.50 < |FSt| < 1.20 \quad (70A),$$

where:

FSt=(1−βfot×βfot)×βimgt×βimgt,

βfot denotes a lateral magnification of the focusing unit at the telephoto end,

βimgt denotes a lateral magnification of a predetermined optical system at the telephoto end, and the predetermined optical system is an optical system which includes all lens units positioned on an image side of the focusing unit.

56. The variable magnification optical system according to claim 48, wherein:

the fifth lens unit is fixed at the time of zooming, and the following conditional expression (71A) is satisfied:

$$0.80 < \beta G5 < 1.2 \quad (71A),$$

where:

βG5 denotes a lateral magnification of the fifth lens unit at a time of infinite object point focusing in an arbitrary zoom state.

57. The variable magnification optical system according to claim 1, wherein the at least one lens unit positioned on the image side of the aperture stop includes a fourth lens unit having a negative refractive power, and a fifth lens unit.

58. The variable magnification optical system according to claim 57, wherein the following conditional expression (64B) is satisfied:

$$2.0 < |fG4/fw| < 4.0 \quad (64B),$$

where:

fG4 denotes a focal length of the fourth lens unit, and fw denotes a focal length of the overall variable magnification optical system at the wide angle end.

59. The variable magnification optical system according to claim 57, wherein the following conditional expression (65B) is satisfied:

$$0.040 < |fG4/ft| < 0.110 \quad (65B),$$

where:

fG4 denotes a focal length of the fourth lens unit, and ft denotes a focal length of the overall variable magnification optical system at the telephoto end.

60. The variable magnification optical system according to claim 57, wherein the following conditional expression (66) is satisfied:

$$1 \neq \beta 4z/\beta 4w \quad (66),$$

where:

β4z denotes a lateral magnification of the fourth lens unit at a time of infinite object point focusing in a predetermined state, β4w denotes a lateral magnification of the fourth lens unit at the time of infinite object point focusing, at the wide angle end, and the predetermined state is a state in which the fourth lens unit is positioned nearest to object, at the time of zooming.

61. The variable magnification optical system according to claim 57, wherein:

the at least one lens unit positioned on the image side of the aperture stop includes a movable lens unit, and the movable lens unit moves toward the image-plane side at a time of start of zooming from the wide angle end, and moves toward the object side from an arbitrary intermediate state to the telephoto end.

62. The variable magnification optical system according to claim 57, wherein the following conditional expressions (72) and (73) are satisfied:

$$45 < \nu dG4nmax < 70 \quad (72),$$

and $$0.520 < (\theta g, F)G4nmin < 0.570 \quad (73),$$

where:

νdG4nmax denotes a maximum Abbe number from among Abbe numbers for negative lens elements in the fourth lens unit, and (θg, F)G4nmin denotes a minimum partial dispersion ratio from among partial dispersion ratios of the negative lens elements in the fourth lens unit.

63. The variable magnification optical system according to claim 57, comprising:
a focusing unit on an image side of the second lens unit, wherein:
the following conditional expression (69B) is satisfied:

$$1.5 < |FSw| < 3.5 \tag{69B}$$

where:
FSw=(1−βfow×βfow)×βimgw×βimgw,
βfow denotes a lateral magnification of the focusing unit at the wide angle end,
βimgw denotes a lateral magnification of a predetermined optical system at the wide angle end, and
the predetermined optical system is an optical system which includes all lens units positioned on an image side of the focusing unit.

64. The variable magnification optical system according to claim 57, comprising:
a focusing unit on an image side of the second lens unit, wherein:
the following conditional expression (70B) is satisfied:

$$1.5 < |FSt| < 3.5 \tag{70B}$$

where:
FSt=(1−βfot×βfot)×βimgt×βimgt,
βfot denotes a lateral magnification of the focusing unit at the telephoto end,
βimgt denotes a lateral magnification of a predetermined optical system at the telephoto end, and
the predetermined optical system is an optical system which includes all lens units positioned on an image side of the focusing unit.

65. The variable magnification optical system according to claim 57, wherein:
the fifth lens unit is fixed at the time of zooming, and
the following conditional expression (71B) is satisfied:

$$0.32 < \beta G5 < 0.55 \tag{71B}$$

where:
βG5 denotes a lateral magnification of the fifth lens unit at a time of infinite object point focusing in an arbitrary zoom state.

66. An image pickup apparatus, comprising:
the variable magnification optical system according to claim 1; and
an image pickup element which has an image pickup surface, and which converts an image formed on the image pickup surface by the optical system, to an electric signal.

67. A variable magnification optical system which includes a plurality of lens elements, the variable magnification optical system comprising in order from an object side:
a first lens unit having a positive refractive power;
a second lens unit having a negative refractive power;
a third lens unit having a positive refractive power; and
at least one other lens unit,
wherein:
an aperture stop is either positioned between the second lens unit and the third lens unit, or positioned in the third lens unit,
at a time of zooming from a wide angle end to a telephoto end, the first lens unit is fixed, the second lens unit moves toward an image-plane side, and at least one lens unit positioned on an image side of the aperture stop moves,
the first lens unit includes at least four positive lens elements and at least two negative lens elements,
the first lens unit consists of a first sub lens unit and a second sub lens unit,
the first sub lens unit includes at least one of the negative lens elements of the first lens unit and at least one of the positive lens elements of the first lens unit,
the second sub lens unit includes at least one of the negative lens elements of the first lens unit and at least one of the positive lens elements of the first lens unit, and
the following conditional expressions (4) and (5) are satisfied:

$$35 < \nu ds1p\text{max} - \nu ds1n\text{min} < 52 \tag{4}$$

and $$35 < \nu ds2p\text{max} - \nu ds2n\text{min} < 52 \tag{5}$$

where:
νds1nmin denotes a minimum Abbe number from among each Abbe number for each negative lens element in the first sub lens unit,
νds1pmax denotes a maximum Abbe number from among each Abbe number for each positive lens element in the first sub lens unit,
νds2nmin denotes a minimum Abbe number from among each Abbe number for each negative lens element in the second sub lens unit,
νds2pmax denotes a maximum Abbe number from among each Abbe number for each positive lens element in the second sub lens unit, and
each of the plurality of lens elements is a lens having a medium of a refractive index higher than 1 filled between an object-side surface and an image-side surface, and not having a refractive surface between the object-side surface and the image-side surface.

68. A variable magnification optical system which includes a plurality of lens elements, the variable magnification optical system comprising in order from an object side:
a first lens unit having a positive refractive power;
a second lens unit having a negative refractive power;
a third lens unit having a positive refractive power, and
at least one other lens unit,
wherein:
an aperture stop is either positioned between the second lens unit and the third lens unit, or positioned in the third lens unit,
at a time of zooming from a wide angle end to a telephoto end, the first lens unit is fixed, the second lens unit moves toward an image-plane side, and at least one lens unit positioned on an image side of the aperture stop moves,
the first lens unit includes at least four positive lens elements and at least two negative lens elements,
the first lens unit consists of a first sub lens unit and a second sub lens unit,
the first sub lens unit includes at least one of the negative lens elements of the first lens unit and at least one of the positive lens elements of the first lens unit,
the second sub lens unit includes at least one of the negative lens elements of the first lens unit and at least one of the positive lens elements of the first lens unit, and
the following conditional expressions (6) and (7) are satisfied:

$$-0.0300 < (\theta g, F)s1p\text{min} - (\theta g, F)s1n\text{max} < -0.0060 \quad (6),$$

and $$-0.0300 < (\theta g, F)s2p\text{min} - (\theta g, F)s2n\text{max} < -0.0060 \quad (7),$$

where:
- $(\theta g, F)s1n\text{max}$ denotes a maximum partial dispersion ratio from among each partial dispersion ratio for each negative lens element in the first sub lens unit,
- $(\theta g, F)s1p\text{min}$ denotes a minimum partial dispersion ratio from among each partial dispersion ratio for each positive lens element in the first sub lens unit,
- $(\theta g, F)s2n\text{max}$ denotes a maximum partial dispersion ratio from among each partial dispersion ratio for each negative lens element in the second sub lens unit,
- $(\theta g, F)s2p\text{min}$ denotes a minimum partial dispersion ratio from among each partial dispersion ratio for each positive lens element in the second sub lens unit, $$(\theta g, F) = (ng - nF)/(nF - nC),$$

ng denotes a refractive index for a g-line,
nF denotes a refractive index for an F-line, and
nC denotes a refractive index for a C-line.

* * * * *